US010663298B2

(12) United States Patent
Ali et al.

(10) Patent No.: US 10,663,298 B2
(45) Date of Patent: May 26, 2020

(54) METHOD AND APPARATUS FOR CHARACTERIZING PLATFORM MOTION

(71) Applicant: InvenSense, Inc., San Jose, CA (US)

(72) Inventors: Abdelrahman Ali, Calgary (CA); Mostafa Elhoushi, Calgary (CA); Jacques Georgy, Calgary (CA); Christopher Goodall, Calgary (CA)

(73) Assignee: InvenSense, Inc., San Jose, CA (US)

( * ) Notice: Subject to any disclaimer, the term of this patent is extended or adjusted under 35 U.S.C. 154(b) by 361 days.

(21) Appl. No.: 15/632,361

(22) Filed: Jun. 25, 2017

(65) Prior Publication Data
US 2018/0372499 A1   Dec. 27, 2018

(51) Int. Cl.
G01C 21/16 (2006.01)
G06T 7/246 (2017.01)
G06N 20/00 (2019.01)
G06T 7/20 (2017.01)

(52) U.S. Cl.
CPC .......... G01C 21/165 (2013.01); G06N 20/00 (2019.01); G06T 7/20 (2013.01); G06T 7/248 (2017.01); G06T 2207/10016 (2013.01); G06T 2207/20056 (2013.01); G06T 2207/20064 (2013.01); G06T 2207/30244 (2013.01); G06T 2207/30252 (2013.01); G06T 2207/30268 (2013.01)

(58) Field of Classification Search
CPC .................................................. G01C 21/165
See application file for complete search history.

(56) References Cited

U.S. PATENT DOCUMENTS

| 9,417,689 | B1* | 8/2016 | Ramaswamy | G06F 3/01 |
| 9,888,392 | B1* | 2/2018 | Snyder | H04W 4/027 |
| 2005/0130677 | A1* | 6/2005 | Meunier | G01S 5/021 |
| | | | | 455/456.6 |
| 2006/0091286 | A1* | 5/2006 | Finizio | G01S 7/4802 |
| | | | | 250/206.1 |
| 2009/0119296 | A1* | 5/2009 | Neogi | G06K 9/00442 |
| 2010/0045667 | A1* | 2/2010 | Kornmann | G06F 1/1626 |
| | | | | 345/419 |
| 2010/0164479 | A1* | 7/2010 | Alameh | G01D 18/006 |
| | | | | 324/115 |

(Continued)

Primary Examiner — Hunter B Lonsberry
Assistant Examiner — Donald J Wallace
(74) Attorney, Agent, or Firm — Bay Area Technology Law Group PC

(57) ABSTRACT

An apparatus and method are disclosed for characterizing motion of a platform. Motion sensor data from a portable device having a sensor assembly may be obtained. The portable device may be within the platform and tethered or untethered, and the mobility of the portable device may be constrained or unconstrained within the platform. Following a determination the platform is moving, motion dynamics of the portable device that are independent from motion dynamics of the platform may be identified and motion sensor data corresponding to motion of the platform and motion sensor data corresponding to the identified independent motion of the portable device may be separated from the obtained motion sensor data. Accordingly, motion sensor data corresponding to motion of the platform that is independent of motion of the portable device may be output. This may be used to derive operator analytics for assessing performance.

46 Claims, 26 Drawing Sheets

(56) References Cited

U.S. PATENT DOCUMENTS

| | | | | |
|---|---|---|---|---|
| 2010/0174487 A1* | 7/2010 | Soehren | ............... | G01C 21/20 701/500 |
| 2010/0283832 A1* | 11/2010 | Lin | ............... | G06K 9/3216 348/46 |
| 2011/0093250 A1* | 4/2011 | Lin | ............... | G01C 19/38 703/7 |
| 2011/0143816 A1* | 6/2011 | Fischer | ............... | G08G 1/16 455/566 |
| 2011/0148623 A1* | 6/2011 | Bishop | ............... | G01C 21/20 340/539.13 |
| 2012/0069918 A1* | 3/2012 | Chang | ............... | H04B 7/086 375/259 |
| 2012/0176492 A1* | 7/2012 | Garin | ............... | H04N 7/18 348/116 |
| 2012/0221289 A1* | 8/2012 | Burke | ............... | G01C 22/006 702/141 |
| 2012/0245839 A1* | 9/2012 | Syed | ............... | G01C 21/165 701/408 |
| 2012/0293420 A1* | 11/2012 | Stoumbos | ............... | G06F 3/0488 345/173 |
| 2013/0002854 A1* | 1/2013 | Nielsen | ............... | H04N 7/183 348/94 |
| 2013/0102419 A1* | 4/2013 | Jeffery | ............... | G09B 19/0038 473/409 |
| 2013/0194428 A1* | 8/2013 | Chao | ............... | G01C 21/20 348/159 |
| 2013/0205306 A1* | 8/2013 | Kelly | ............... | G06F 9/542 719/318 |
| 2013/0237241 A1* | 9/2013 | Burke | ............... | G01C 13/00 455/456.1 |
| 2013/0268236 A1* | 10/2013 | Yuen | ............... | A61B 5/0002 702/160 |
| 2013/0297203 A1* | 11/2013 | Kelly | ............... | G01C 21/18 701/454 |
| 2013/0310110 A1* | 11/2013 | Forutanpour | ......... | H04W 88/02 455/556.1 |
| 2014/0078275 A1* | 3/2014 | Joao | ............... | G08B 21/02 348/61 |
| 2014/0226864 A1* | 8/2014 | Venkatraman | ......... | G01C 21/20 382/107 |
| 2014/0257766 A1* | 9/2014 | Poduri | ............... | G06N 7/005 703/2 |
| 2014/0379207 A1* | 12/2014 | Katsman | ............... | G01C 21/165 701/33.2 |
| 2015/0153380 A1* | 6/2015 | Elhoushi | ............... | G01P 15/14 702/141 |
| 2018/0112983 A1* | 4/2018 | Ahmed | ............... | G01C 21/005 |

\* cited by examiner

METHOD AND APPARATUS FOR CHARACTERIZING PLATFORM MOTION

FIELD OF THE PRESENT DISCLOSURE

This disclosure generally relates to detecting whether a portable device is in a moving vehicle and characterizing an association between the portable device and a user. The disclosure further relates to determining whether the user is operating the moving vehicle.

BACKGROUND

Portable electronic devices, such as those configured to be handheld or otherwise associated with a user, are employed in a wide variety of applications and environments. The ubiquity of such devices as mobile phones, wearables, including smart watches and glasses, digital still cameras and video cameras, handheld music and media players, portable video game devices and controllers, tablets, mobile internet devices (MIDs), personal navigation devices (PNDs), other APPlication acCESSORIES (or Appcessories for short) and other similar devices speaks the popularity and desire for these types of devices. Increasingly, such devices are equipped with one or more sensors or other systems for determining the position or motion of the portable device with increasing sophistication and accuracy. Likewise, additional sensing capabilities are commonly available in the form of proximity and ambient light sensors, image sensors, barometers, magnetometers and the like. Still further, such portable devices often feature navigation systems, such as a Global Navigation Satellite Systems (GNSS), that enable precise determinations regarding geophysical position and movement. Corresponding advances in computation power, size, power consumption and prices make such portable devices powerful computing tools with extensive capabilities to detect their environment.

Given the noted popularity in portable devices having some or all of these capabilities, a wide variety of sensor data may be available and therefore leveraged to characterize activities the user in which the user may be engaged. One significant application relates to the operation of moving vehicles, such as for example automobiles. Notably, it may be desirable to assess aspects of how the vehicle is operated, including whether the operation is in a safe and legal manner. In addition, it may be important to determine whether the operator is using the portable device in a manner that distracts from proper operation of the vehicle. Correspondingly, there is a need for techniques to utilize sensor data from a portable device to analyze the performance of vehicle operator. As will be described in the following materials, this disclosure satisfies these and other needs.

SUMMARY

As will be described in detail below, this disclosure includes a method for characterizing motion of a platform. The method may include obtaining motion sensor data from a portable device having a sensor assembly, wherein the portable device is within the platform and may be tethered or untethered, and wherein mobility of the portable device may be constrained or unconstrained within the platform, determining the platform is moving, identifying motion dynamics of the portable device that are independent from motion dynamics of the platform and the lack thereof, separating motion sensor data corresponding to motion of the platform and motion sensor data corresponding to the identified independent motion of the portable device from the obtained motion sensor data when independent motion dynamics of the portable device are identified and outputting motion sensor data corresponding to motion of the platform that is independent of motion of the portable device.

This disclosure also include a portable device for characterizing motion of a platform. The portable device is within the platform and may be tethered or untethered and mobility of the portable device may be constrained or unconstrained within the platform. The portable device may include a sensor assembly integrated with the portable device, including at least one sensor configured to output data representing motion of the portable device, a processor configured to obtain the motion sensor data and a motion characterization module implemented with the processor. The motion characterization module may be configured to determine whether the platform is moving, identify motion dynamics of the portable device that are independent from motion dynamics of the platform and the lack thereof, separate motion sensor data corresponding to motion of the platform and motion sensor data corresponding to the identified independent motion of the portable device from the obtained motion sensor data when independent motion dynamics of the portable device are identified and output motion sensor data corresponding to motion of the platform that is independent of motion of the portable device

DETAILED DESCRIPTION

Figure 1:
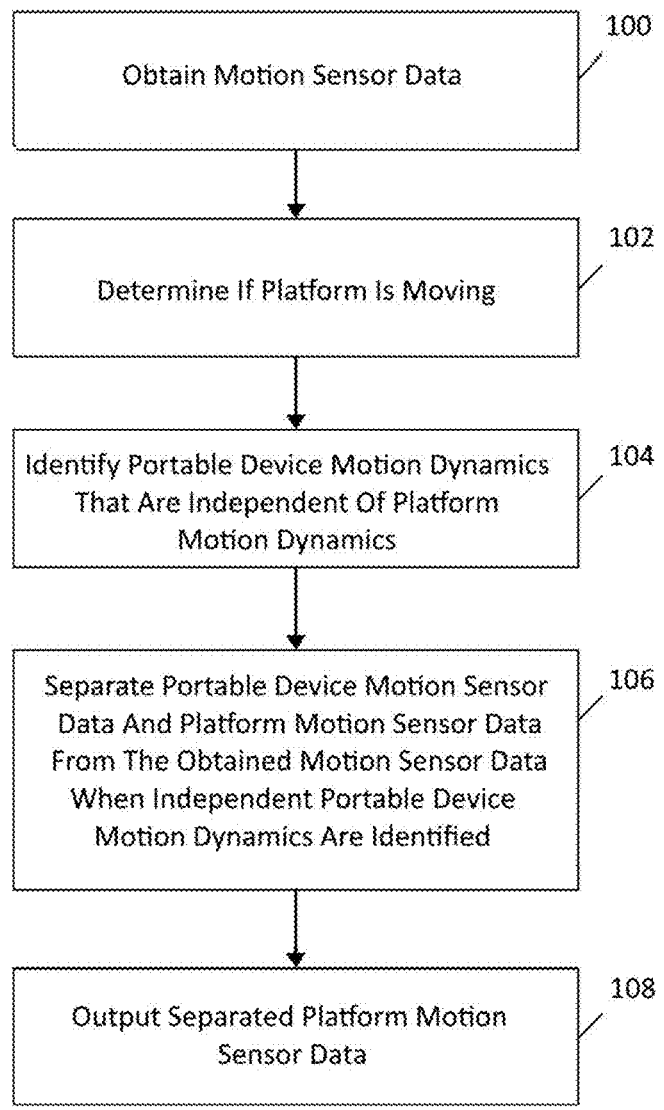
FIG. 1 is a block diagram for characterizing platform motion according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary portable devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more sensor processing units (SPUs), motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU and a microprocessor, a plurality of microprocessors, one or more microprocessors in conjunction with an SPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

As noted above, public policy and safety concerns may make it desirable to determine information that relates to operation of a moving vehicle. Due to the increasing popularity of portable devices, it is typical for a user to have a portable device associated with them when in a moving vehicle. Portable devices, such as smartphones or wearables, have embedded technology for sensing the motion dynamics of the device, and may have other sensors that provide related information. For example, inertial sensors such as accelerometers and gyroscopes having multiple sensitive axes may be used to measure specific forces and angular rates, and consequently obtain changes in position and orientation. In some embodiments, inertial sensor data may be fused with data from other supplemental sensors such as magnetometers or barometers to improve position or orientation determinations. As used herein, the term "motion sensor data" refers to information from such inertial and non-inertial sensors that can be used to obtain changes in position, orientation or movement of the portable device, and by extension, any platform carrying the portable device by determining the relative orientation of the sensors in the device with respect to the platform. Such motion sensors give self-contained information, i.e. they do not depend on external source of information such as satellites or any other wireless transmission. Further, one or more image sensors may be used to obtain information to help characterize motion of the portable device, and by extension, any platform carrying the portable device. As such, the term "image sensor data" refers to information from optical sensors, such as cameras or the like. Correspondingly, "supplemental sensor data" refers to any other source of information that may be obtained by the portable device, including depth with respect to a reference object from a depth or ranging sensor, presence of nearby objects from a proximity sensor, environmental conditions of the portable device, such as from an ambient light sensor, and others.

Thus, the sensor data of a portable device associated with a user reflects movement of the platform as well as movement of the portable device that is independent of the platform. When the user is the platform, such as in the case of a pedestrian, the portable device measures the movement aspects of the person who carries the device. Similarly, if the platform is a vehicle, the measured data includes the vehicle motion data. In either case, the portable device may be tethered or untethered and mobility of the portable device may be constrained or unconstrained. Tethering typically indicates that the portable device is maintained in a fixed relationship to the platform. For example, the portable device may be placed in a cradle fixed to the vehicle or may be carried in a holster of the pedestrian. However, the techniques of this disclosure also apply when the portable device is not in a fixed relationship with the platform, such as when it is loose within a vehicle or being carried and operated in different manners by the pedestrian, i.e., untethered. Thus, the mobility of the portable device may be constrained or unconstrained depending on the circumstances. Further, even when tethered or otherwise constrained, the relative orientation of the portable device may not be known. For a portable device held in a vehicle cradle, it may be placed in a portrait, landscape or other orientation. Likewise, a portable device placed in a user's pocket may be up or down as well as facing inwards or outwards. As will be described in the following materials, the techniques of this disclosure apply in all of these situations. Thus, the wide variety of sensor data collected by a portable device, including measurements such as acceleration, angular velocity, the surrounding local Earth's magnetic field, location, height, surrounding light, sounds, and many others. Another important source of information includes any optical or image sensors, such as front or rear cameras, of the portable device may also be used. As desired, all available sensor information may be employed or a specific group of sensors may be polled depending on the application.

Accordingly, assessing the performance of a vehicle operator may involve any aspect. For example, operating knowledge may include acquiring telematics information, operator consciousness information, surrounding circumstances inside the vehicle, information about road conditions and traffic and it will be appreciated that the sensors and other resources of a portable device associated with the operator may provide some or all relevant information. Generally, any information regarding operation of the platform derived using sensor data according to the techniques of this disclosure may be termed operator analytics. To illustrate one representative approach, location of the vehicle, optionally in conjunction with any local or regional map information from any provider, may help monitor traffic conditions. Characteristics including acceleration, deceleration, and speed are major components in the assessment of operator performance and local conditions may help provide insight in determining whether the speed limit has been exceeded, or help explain whether sudden changes in speed or direction are appropriate or inappropriate.

It will also be appreciated there are many important components that may be used in evaluating operator performance, including detection of vehicle swerves, detection of vehicle sideways slide, and detection of driving on rumble strips. Each aspect may provide insight of operator performance during a given trip. Notably, detection of vehicle swerves may indicate how the driver is changing the driving lane and shows that if the change has been done smoothly and appropriately, or aggressively, by comparing the average speed of the vehicle in a previous window of time. Detection of vehicle sideways slide may be beneficial when the surface exhibits reduced traction, such as when driving on snow or in hydroplaning conditions. Similarly, detection of driving on rumble strips occurs when the operator is not maintaining an appropriate position within a lane, indicating drowsiness or distraction. Detecting these and other aspects of vehicle operation therefore may help assess operator performance and prevent accidents.

During a given trip, the portable device may measure different components such as acceleration, angular velocity, Earth's magnetic field strength, and others. Examples of relevant information that may be determined from this sensor data include location, traveled distance, breaking events, accelerating events, time of the trip, turning and cornering events, speed and others. Any one or combination of sensor data may be used when assessing operator performance. As will be described, the sensor data may be used to distinguish the vehicle dynamics from the device dynamics. Vehicle dynamics may refer to the movement of the platform, such as turns, speed, acceleration and deceleration, while device dynamics may refer to device orientation, which may change at any moment, and movements independent of the platform, including those caused by user interaction with the portable device, such as by Internet surfing, texting, viewing, capturing images, making/receiving calls or other functions involving the portable device, which may increase the chance of distracting the user from proper and safe operation of the moving vehicle.

As an example of the value of assessing operator performance, usage-based insurance (UBI), also known as pay as you drive (PAYD) and pay how you drive (PHYD), refers to a type of vehicle insurance whereby some portion of the coast is based upon the operator behavior. UBI provides an opportunity for insurers to modify the insurance cost to customers based on specific behaviors and usage patterns. Also, UBI could effectively reduce claims cost potentially. Recently, the concept of usage-based insurance has gained more attraction from the insurance companies around the world. UBI could improve a driver's behavior by providing an incentive for good driving record and performance which means fewer accidents and fewer claims and therefore less to be paid out by the insurance companies. More generally, an insurance company may more accurately estimate the damage in case of an accident and minimize the fraud based on an effective evaluation of operator performance, while the collected data may reduce cost of accidents by improving the accident response time and monitoring the safety. To properly assess operator performance, sufficient information must be available. While this could include integration of the necessary sensors into the vehicle itself, the availability of sensor data from a portable device may allow for more rapid adoption of UBI and similar applications. Notably, the portable device may permit adequate evaluation of operator performance without the need to retrofit an existing vehicle or may save costs associated with equipping a vehicle with dedicated sensors. Alternatively, the determinations made using sensor data from the portable device may supplement or verify determinations made using dedicated sensors. As such, leveraging the capabilities of portable device may provide the opportunity to support and accelerate the growth of this type of insurance.

To help illustrate the techniques of this disclosure, FIG. 1 depicts an exemplary routine for characterizing motion of a platform using sensor data from a portable device, which in turn may be used to evaluate operator performance. As discussed above, one example of a platform is a motorized vehicle such as an automobile, such that characterization of its motion may allow an assessment of the performance of its operator, with whom the portable device is associated. However, these techniques may be adapted to characterizing the motion of other platforms, including non-motorized vehicles or a pedestrian. Beginning with 100, sensor data may be obtained for a portable device. In one aspect, the sensor data may be inertial sensor data from one or more accelerometers, gyroscopes or other suitable motion and/or orientation detection sensors. In a further aspect, the sensor data may also include information obtained from one or more image sensors.

In 102, the sensor data may be processed to determine whether the portable device is in a moving vehicle or other relevant platform. Depending on the embodiment, motion sensor data, image sensor data, or both, may be used in determining whether the portable device is in a moving platform. If not, the routine may simply return to 100 so that obtaining the sensor data is ongoing in case circumstances change. Otherwise, the routine continues to 104 and the sensor data may be used to identify motion dynamics of the portable device that are independent from motion dynamics of the platform and the lack thereof. Again, depending on the embodiment, motion sensor data, image sensor data, or both, may be used in identifying independent motion dynamics of the portable device. Notably, the total motion experienced by the portable device is cumulative of the motion of the platform and the motion of the device within that platform. Identification of motion dynamics of the portable device that are independent allows a preliminary determination of whether the portable device is tethered or otherwise constrained by the platform. As noted above, this may occur when the portable device is placed within the cradle of a vehicle, for example. When in this condition, all motion experienced by the portable device may be attributed to movement of the platform, and the motion sensor data need not be segregated. Correspondingly, in 106 the obtained motion sensor data may be separated into motion sensor data corresponding to motion of the platform and motion sensor data corresponding to the identified independent motion of the portable device when independent motion dynamics for the portable device are identified. Once more, motion sensor data, image sensor data, or both, may be used depending on the embodiment when separating the motion sensor data. In 108, the separated motion sensor data corresponding to motion of the platform may be output, as well as, or alternatively to, motion sensor data corresponding to the identified independent motion of the portable device. As will be described in further detail below, motion sensor data corresponding to motion of the platform may be used for assessing operator performance.

Figure 2:
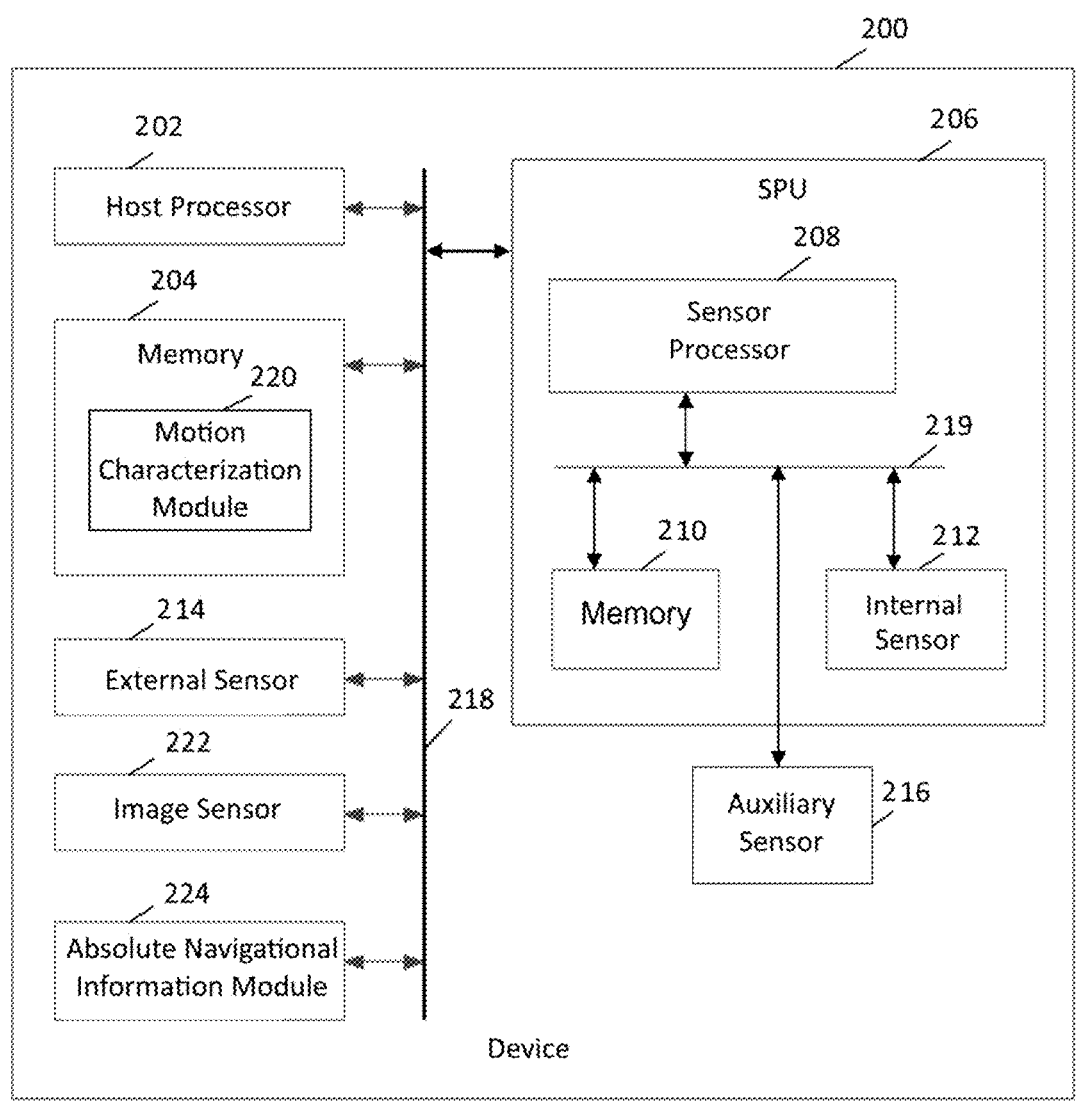
FIG. 2 is schematic diagram of a portable device for characterizing platform motion according to an embodiment.

As noted above, the portable device may include a sensor assembly including inertial motion sensors providing measurements that may be used in characterizing the motion of a platform. To help illustrate these features, a representative portable device 200 is depicted in FIG. 2 with high level schematic blocks. As will be appreciated, device 200 may be implemented as a device or apparatus, such as a handheld device that can be moved in space by a user and its motion, location and/or orientation in space therefore sensed. For example, such a handheld device may be a mobile phone (e.g., cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices.

As shown, device 200 includes a host processor 202, which may be one or more microprocessors, central processing units (CPUs), or other processors to run software programs, which may be stored in memory 204, associated with the functions of device 200. Multiple layers of software can be provided in memory 204, which may be any combination of computer readable medium such as electronic memory or other storage medium such as hard disk, optical disk, etc., for use with the host processor 202. For example, an operating system layer can be provided for device 200 to control and manage system resources in real time, enable functions of application software and other layers, and interface application programs with other software and functions of device 200. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 200, and in some of those embodiments, multiple applications can run simultaneously.

Device 200 includes at least one sensor assembly, as shown here in the form of integrated sensor processing unit (SPU) 206 featuring sensor processor 208, memory 210 and inertial sensor 212. As an example, SPU 206 may be a motion processing unit (MPU™, suitable implementations are available from InvenSense, Inc. of Sunnyvale, Calif.). Memory 210 may store algorithms, routines or other instructions for processing data output by inertial sensor 212 and/or other sensors as described below using logic or controllers of sensor processor 208, as well as storing raw data and/or motion data output by inertial sensor 212 or other sensors. Inertial sensor 212 may be one or more sensors for measuring motion of device 200 in space. Depending on the configuration, SPU 206 measures one or more axes of rotation and/or one or more axes of acceleration of the device. In one embodiment, inertial sensor 212 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 208, or other processing resources of device 200, combines data from inertial sensor 212 to provide a six axis determination of motion. As desired, inertial sensor 212 may be implemented using Micro Electro Mechanical System (MEMS) to be integrated with SPU 206 in a single package. Exemplary details regarding suitable configurations of host processor 202 and SPU 206 may be found in co-pending, commonly owned U.S. patent application Ser. No. 11/774,488, filed Jul. 6, 2007, and Ser. No. 12/106,921, filed Apr. 21, 2008, which are hereby incorporated by reference in their entirety.

Alternatively, or in addition, device 200 may implement a sensor assembly in the form of external sensor 214. External sensor 214 may represent one or more motion sensors as described above, such as an accelerometer and/or a gyroscope, that outputs data for categorizing, recognizing, classifying or otherwise determining device use case. As used herein, "external" means a sensor that is not integrated with SPU 206. In one aspect, external sensor 214 may represent one or more acoustic, infrared, ultrasonic, radio frequency, proximity and/or ambient light sensors. Also alternatively or in addition, SPU 206 may receive data from an auxiliary sensor 216 configured to measure one or more aspects about the environment surrounding device 200. For example, a barometer and/or a magnetometer may be used to refine position determinations made using inertial sensor 212. In one embodiment, auxiliary sensor 216 may include a magnetometer measuring along three orthogonal axes and output data to be fused with the gyroscope and accelerometer inertial sensor data to provide a nine axis determination of motion. In another embodiment, auxiliary sensor 216 may also include a barometer to provide an altitude determination that may be fused with the other sensor data to provide a ten axis determination of motion. Although described in the context of one or more sensors being MEMS based, the techniques of this disclosure may be applied to any sensor design or implementation. Either or both of external sensor 214 and auxiliary sensor 216 may be a suitable source of supplemental sensor data in addition to motion sensor data to be used as described below, and other architectures may also be used to provide supplemental sensor data as desired.

In the embodiment shown, host processor 202, memory 204, SPU 206 and other components of device 200 may be coupled through bus 218, while sensor processor 208, memory 210, internal sensor 212 and/or auxiliary sensor 216 may be coupled though bus 219, either of which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 200, such as by using a dedicated bus between host processor 202 and memory 204.

In one aspect, the various operations of this disclosure may be implemented through motion characterization module 220 as a set of suitable instructions stored in memory 204 that may be read and executed by host processor 202. Other embodiments may feature any desired division of processing between host processor 202, SPU 206 and other resources provided by device 200, or may be implemented using any desired combination of software, hardware and firmware.

Multiple layers of software may be employed as desired and stored in any combination of memory 204, memory 210, or other suitable location. For example, a motion algorithm layer can provide motion algorithms that provide lower-level processing for raw sensor data provided from the motion sensors and other sensors. A sensor device driver layer may provide a software interface to the hardware sensors of device 200. Further, a suitable application program interface (API) may be provided to facilitate communication between host processor 202 and SPU 206, for example, to transmit desired sensor processing tasks. As such, aspects implemented in software may include but are not limited to, application software, firmware, resident software, microcode, etc., and may take the form of a computer program product accessible from a computer-usable or computer-readable medium providing program code for use by or in connection with a computer or any instruction execution system, such as host processor 202, sensor processor 208, a dedicated processor or any other processing resources of device 200.

As noted above, image sensor data may be used for aspects of this disclosure, including determining if platform of the portable device 200 is moving, identifying independent motion dynamics of the portable device and/or separating obtained motion sensor data into motion sensor data corresponding to motion of the platform and motion sensor data corresponding to the identified independent motion of the portable device. Correspondingly, device 200 may include image sensor 222, which may represent one or more optical sensors for capturing images and may be implemented as front-facing cameras, rear-facing cameras or both, for example, which provide a valuable source of information regarding the environment surrounding the portable device. In some embodiments, the image sensor or optical sensor may be based on a complimentary metal oxide semiconductor (CMOS) technology that is not subject to the time-varying drift associated with the types of inertial sensors typically employed in personal electronics, such as micro electro mechanical system (MEMS)-based inertial sensors. Image sensor data may therefore include captured optical samples, such as a sequence of images.

As opposed to sensor-based information, such as information that may be obtained from the self-contained sensors represented by inertial sensor 212, external sensor 214 and/or auxiliary sensor 216 discussed above, device 200 may also include absolute navigational information module 224 that provides any desired degree of location awareness capabilities. In one aspect, this may include a reference-based wireless system providing a source of absolute location information for device 200. Representative technologies that may be embodied by absolute navigational information module 224 include: (i) global navigation satellite system (GNSS) receiver such as global positioning system (GPS), GLONASS, Galileo and Beidou, or any other GNSS, as well as (ii) WiFi™ positioning, (iii) cellular tower positioning, (iv) Bluetooth-based positioning; (v) Bluetooth low energy (BLE)-based positioning; (vi) other wireless-based positioning; and (vii) visual light communication-based positioning or other similar methods.

The techniques of this disclosure may be used to separate motion sensor data corresponding to motion of the platform and motion sensor data corresponding to the identified independent motion of the portable device from the obtained motion sensor data in order to output motion sensor data corresponding to motion of the platform that is independent of motion of the portable device as noted above.

In one aspect, the motion sensor data corresponding to motion of the platform that is independent of motion of the portable device may be processed to derive operator analytics for an operator of the platform. A navigation solution for the platform may be provided by using the motion sensor data corresponding to motion of the platform that is independent of motion of the portable device, so that the operator analytics may be based at least in part on the navigation solution. The operator analytics may be based on at least one of acceleration change, heading change, and speed. The operator analytics may include adjusting for detection of events comprising at least one of large acceleration, large deceleration, sharp turns, a vehicle swerve, a vehicle sideways slide and vehicle interaction with rumble strips. In turn, operator performance may be scored by comparing the operator analytics to local conditions determined to exist during operation of the platform.

In one aspect, determining the platform is moving may include processing motion sensor data from the portable device. Processing the motion sensor data may include applying a signal analysis technique. The signal analysis technique may be at least one of: (i) a statistical analysis; (ii) a frequency-domain analysis; and (iii) a time-domain analysis. Alternatively or in addition, processing the motion sensor data may include applying a machine learning technique. Features extracted from the processed motion sensor data may be input to at least one stored classification model to determine whether the platform is moving. The at least one stored classification model may include extracted features developed during a training phase.

In one aspect, a source of absolute navigational information may be provided so that determining the platform is moving may be based at least in part on absolute navigational information.

In one aspect, image sensor data may be obtained from the portable device, so that determining the platform is moving may include processing the image sensor data. Processing the image sensor data may include comparing similarity between successive samples.

In one aspect, identifying motion dynamics of the portable device that are independent from motion dynamics of the platform may include processing the motion sensor data from the portable device. For example, processing the motion sensor data may include at least one of: (i) calculating radius of rotation; (ii) assessing change in orientation of the portable device; (iii) determining heading misalignment between the portable device and the platform; and (iv) fusing extracted features from different sensor types. Motion sensor data may also be obtained from at least one auxiliary portable device, so that processing the motion sensor data may include comparing motion sensor data from the portable device with motion sensor data from the auxiliary portable device. Further, a source of absolute navigational information may be provided, so that identifying motion dynamics of the portable device that are independent from motion dynamics of the platform may be based at least in part on absolute navigational information. Still further, supplemental sensor data may be obtained from the portable device, so that identifying motion dynamics of the portable device that are independent from motion dynamics of the platform may include processing the supplemental sensor data.

In one aspect, image sensor data may be obtained from the portable device, so that identifying motion dynamics of the portable device that are independent from motion dynamics of the platform may include processing the image sensor data. The image sensor data may be a sequence of images and processing the image sensor data may include calculating a frame related parameter. For example, the frame related parameter may be derived from at least one of: (i) a comparison of pixels between sequential images; (ii) a comparison of histograms of sequential images; and (iii) a comparison of frame entropy of sequential images.

In one aspect, the image sensor data may be a sequence of images and processing the image sensor data may include performing an optical flow analysis.

In one aspect, the image sensor data may be a sequence of images and processing the image sensor data may include correlating regions between sequential images using at least one of: (i) edge change rate detection; (ii) statistical analysis; (iii) frequency domain analysis; and (iv) multi-resolution analysis.

Further, image sensor data may be obtained from at least one auxiliary device, so that processing the image sensor data may include comparing image sensor data from the portable device with image sensor data from the auxiliary device.

Still further, supplemental sensor data may be obtained from the portable device, so that identifying motion dynamics of the portable device that are independent from motion dynamics of the platform may include processing the supplemental sensor data.

In one aspect, ranging sensor data may be obtained from the portable device, so that identifying motion dynamics of the portable device that are independent from motion dynamics of the platform may include processing the ranging sensor data.

In one aspect, separating motion sensor data corresponding to motion of the platform and motion sensor data corresponding to the identified independent motion of the portable device from the obtained motion sensor data may include processing the motion sensor data from the portable device. For example, processing the motion sensor data may include at least one of: (i) performing a wavelet analysis; (ii) performing a blind source separation technique; (iii) performing a Fast Fourier Transform (FFT) analysis; (iv) performing a Weighted Frequency Fourier Linear Combiner; and (v) calculating radius of rotation. Further, motion sensor data may be obtained from at least one auxiliary portable device, so that processing the motion sensor data may include comparing motion sensor data from the portable device with motion sensor data from the auxiliary device.

In one aspect, a source of absolute navigational information may be provided, so that separating motion sensor data corresponding to motion of the platform and motion sensor data corresponding to the identified independent motion of the portable device from the obtained motion sensor data may be based at least in part on the absolute navigational information.

In one aspect, image sensor data may be obtained from the portable device, so that separating motion sensor data corresponding to motion of the platform and motion sensor data corresponding to the identified independent motion of the portable device from the obtained motion sensor data may include processing the image sensor data. For example, the image sensor data may be a sequence of images and processing the image sensor data may include performing an optical flow analysis.

In one aspect, ranging sensor data may be obtained from the portable device, so that separating motion sensor data corresponding to motion of the platform and motion sensor data corresponding to the identified independent motion of the portable device from the obtained motion sensor data may include processing the ranging sensor data.

In one aspect, image sensor data may be obtained from the portable device and may be a sequence of images, so that processing the image sensor data may include performing an optical flow analysis, and separating motion sensor data corresponding to motion of the platform and motion sensor data corresponding to the identified independent motion of the portable device from the obtained motion sensor data may be based at least in part on the processed ranging sensor data and the optical flow analysis.

As discussed above, the techniques of this disclosure also involve a portable device for characterizing motion of a platform. In one aspect, the motion characterization module may be configured to determine whether the platform is moving, and to perform at least one of: (i) identifying motion dynamics of the portable device that are independent from motion dynamics of the platform; and (ii) separating motion sensor data corresponding to motion of the platform and motion sensor data corresponding to the identified independent motion of the portable device from the obtained motion sensor data using the obtained motion sensor data.

In one aspect, the portable device may also include a source of absolute navigational information, so that the processor may be configured to obtain the absolute navigational information and the motion characterization module may be configured to perform at least one of: (i) determining whether the platform is moving; (ii) identifying motion dynamics of the portable device that are independent from motion dynamics of the platform; and (iii) separating motion sensor data corresponding to motion of the platform and motion sensor data corresponding to the identified independent motion of the portable device from the obtained motion sensor data using the obtained absolute navigational information. The source of absolute navigational information may be at least one of the following: (i) a global navigation satellite system (GNSS); (ii) cell-based positioning; (iii) WiFi-based positioning; (iv) Bluetooth-based positioning; (v) Bluetooth low energy-based positioning; (vi) other wireless-based positioning; and (vii) visual light communication-based positioning.

In one aspect, the portable device may have at least one image sensor, so that the processor may be configured to obtain image sensor data and the motion characterization module may be configured to perform at least one of: (i) determining whether the platform is moving; (ii) identifying motion dynamics of the portable device that are independent from motion dynamics of the platform; and (iii) separating motion sensor data corresponding to motion of the platform and motion sensor data corresponding to the identified independent motion of the portable device from the obtained motion sensor data using the obtained image sensor data.

In one aspect, the portable device may have a supplemental sensor, so that the processor may be configured to obtain supplemental sensor data and the motion characterization module may be configured to perform at least one of: (i) identifying motion dynamics of the portable device that are independent from motion dynamics of the platform; and (ii) separating motion sensor data corresponding to motion of the platform and motion sensor data corresponding to the identified independent motion of the portable device from the obtained motion sensor data using the obtained supplemental sensor data. For example, the supplemental sensor may be selected from the group consisting of an ambient light sensor and a proximity sensor.

In one aspect, the portable device may have a ranging sensor, so that the processor may be configured to obtain ranging sensor data and the motion characterization module may be configured to perform at least one of: (i) identifying motion dynamics of the portable device that are independent from motion dynamics of the platform; and (ii) separating motion sensor data corresponding to motion of the platform and motion sensor data corresponding to the identified independent motion of the portable device from the obtained motion sensor data using the obtained ranging sensor data.

In one aspect, the sensor assembly may be an inertial sensor. For example, the sensor assembly may include an accelerometer and a gyroscope. The inertial sensor may be implemented as a Micro Electro Mechanical System (MEMS).

Examples

As described above, the techniques of the disclosure may involve using any combination of motion sensor data and image sensor data to make a series of determinations, including whether a portable device is in a moving vehicle. If so, any independent motion dynamics of the portable device may be identified. When the portable device is tethered or otherwise constrained to the platform, even if only temporarily, the identification of independent motion dynamics of the portable device may include the determination that no independent motion dynamics of the portable device exist and correspondingly that any motion experienced by the portable device reflects motion of the platform. The motion sensor data may be output directly or may be separated into motion sensor data corresponding to motion of the platform and motion sensor data corresponding to the identified independent motion of the portable device. The following materials give examples of how motion sensor data and image sensor data may be used at each stage.

Figure 3:
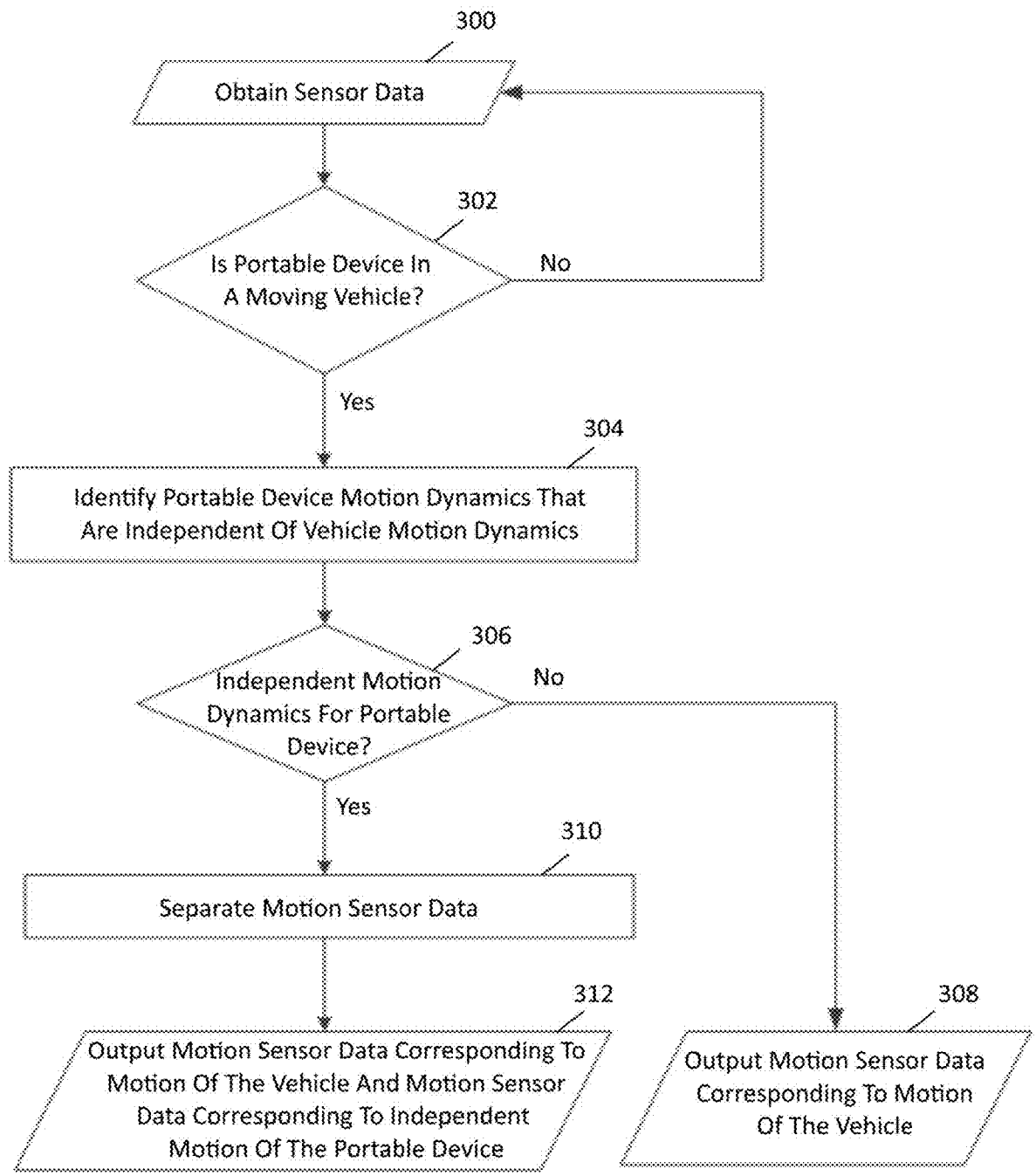
FIG. 3 is a flowchart showing a routine for characterizing platform motion according to an embodiment.

To help illustrate aspects of this disclosure with regard to evaluating operator performance, FIG. 3 depicts an exemplary routine for using sensor data from a portable device. As discussed above, one example of a platform is a motorized vehicle such as an automobile, truck, tractor trailer, van or other similar conveyance, such that characterization of its motion may allow an assessment of the performance of its operator, with whom the portable device is associated. Beginning with 300, sensor data may be obtained for a portable device. For example, the sensor data may be inertial or other motion sensor data, and may also include imaging sensor data, supplemental sensor data and/or ranging sensor data. In 302, the sensor data may be processed to determine whether the portable device is in a moving platform such as a motorized vehicle. Depending on the embodiment, motion sensor data, image sensor data, or both, may be used in determining whether the portable device is in a moving vehicle. Notably, the characteristics of the moving platform may be assessed to determine whether the type of motion is consistent with that of a motorized vehicle. Given that aspects of the techniques of this disclosure relate to assessing the performance of the operator of the vehicle, it may be desirable to categorize the platform as a motorized vehicle. If the platform is not moving or if the platform is not exhibiting motion characteristic of a motorized vehicle, the routine may simply return to 300 so that obtaining the sensor data is ongoing in case circumstances change. Otherwise, the routine continues to 304 and the sensor data may be used to identify motion dynamics of the portable device that are independent from motion dynamics of the vehicle or the lack thereof. Again, depending on the embodiment, motion sensor data, image sensor data, or both, may be used in identifying independent motion dynamics of the portable device.

As discussed above, the total motion experienced by the portable device is cumulative of the motion of the platform and the motion of the device within that platform, so that when no independent motion dynamics for the portable device are identified, all motion experienced by the portable device may be attributed to movement of the platform, and the motion sensor data need not be separated. Correspondingly, in 306 the routine branches depending on whether independent portable device motion dynamics are identified, and if not, the routine flows to 308 and the obtained motion sensor data is output as corresponding to the motion dynamics of the vehicle and may be used to characterize the motion of the platform for any desired purpose, such as for assessing operator performance. If there are independent motion dynamics identified for the portable device in 306, then the obtained motion sensor data may be separated into motion sensor data corresponding to motion of the vehicle and motion sensor data corresponding to the identified independent motion of the portable device in 310 as indicated. Once more, motion sensor data, image sensor data, or both, may be used depending on the embodiment when separating the motion sensor data. The separated motion sensor data output in 312 may be motion sensor data corresponding to motion of the vehicle, motion sensor data corresponding to the identified independent motion of the portable device, or both. As an example, motion sensor data corresponding to motion of the platform may be used for assessing operator performance and motion sensor data corresponding to the identified independent motion of the portable device may be used for other related or unrelated purposes. For example, it may be desirable to determine whether the user of a portable device is operating the platform as discussed in commonly-owned U.S. patent application Ser. No. 14/812,411, filed Jul. 29, 2016, which is hereby incorporated by reference in its entirety.

The techniques of this disclosure, particularly with regard to the determination of whether the platform is moving, the identification of independent motion dynamics of the portable device and/or separating motion sensor data corresponding to motion of the platform and motion sensor data corresponding to the identified independent motion of the portable device from the obtained motion sensor data may be performed using only data obtained from sensors of the portable device or a plurality of synchronized portable devices as described in the examples below. Further, the sequential determinations that may be made, such as indicated by the routines of FIGS. 1 and 3 allow resources to be conserved, improving the efficiency of the process. For example, if it determined the platform is not moving, additional aspects of the routine(s) need not be performed. Likewise, if no independent motion dynamics are identified, it may not be necessary to expend the processing resources associated with separating or segregating the motion sensor data, as the obtained motion sensor data may be output directly as motion sensor data corresponding to motion of the platform.

With regard to the determination of whether the portable device is in a moving platform made in 102 of FIG. 1 or 302 of FIG. 3, any capability of the portable device may be employed, including using the motion sensor data, the image sensor data, or other information such as may be obtained from proximity sensors, light sensors, wireless signal positioning, and operating status of the portable device. For example, if the portable device is interfaced with a vehicle system, such as with the audio system through Bluetooth™ or the like, different assumptions may be made about whether movement of the portable device corresponds to motion of the platform.

In the context of determining whether the portable device is in a moving platform primarily using motion sensor data, any suitable signal analysis or machine learning technique may be employed. Signal analysis techniques include many approaches such as statistical, time domain, and/or frequency domain analysis and the machine learning techniques may involve extracting features from the sensor data and inputting the extracted features into a classification model generated offline during a training phase. Any combination of machine learning and signal analysis techniques, or both, may be employed. Examples of these techniques are described in the following materials, but any suitable means may be employed, using motion sensor data, such as information from inertial sensor 212, external sensor 214 and/or auxiliary sensor 216. Motion characterization module 220 may be configured to use the motion sensor data to determine whether portable device 200 is within a moving vehicle.

In one embodiment, a machine learning approach may be employed in which a classification model is built using different types of statistical, time-domain, and frequency-domain features extracted from a large set of training trajectories of both vehicle motion modes, such as experienced in an automobile, another wheeled vehicle (e.g., car, truck, bus, motorcoach, or the like), boat, heavy equipment, or other motorized vessels, and non-vehicle motion modes, such as for example walking, running or cycling among others. For example, three-axis accelerometer and three-axis gyroscope data may be used. Optionally, additional information, such as from a magnetometer (e.g., a three-axis magnetometer), a barometer, absolute navigational information module 224 (e.g., GNSS information) and/or from other suitable sources.

Figure 4:
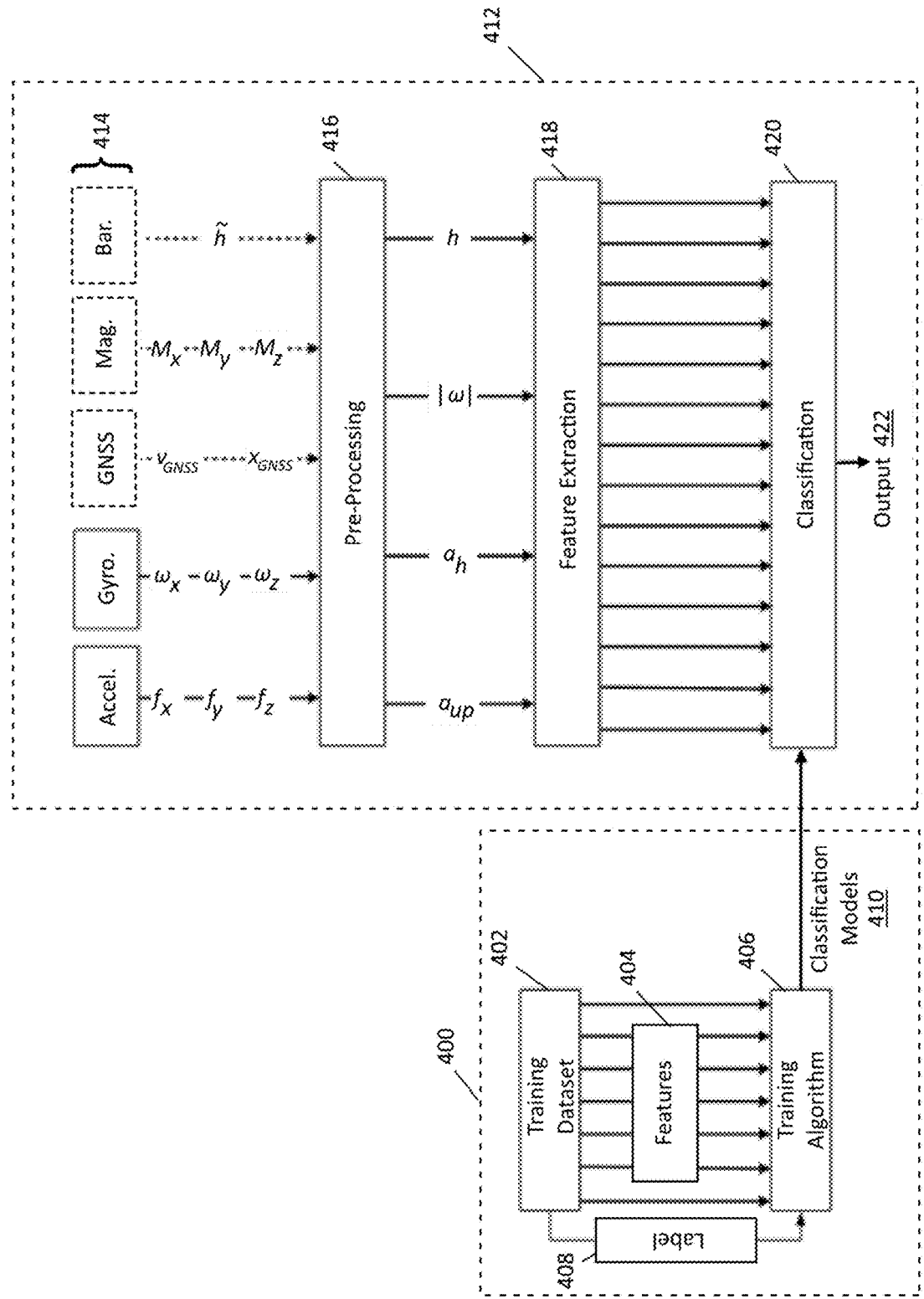
FIG. 4 is a schematic representation of training and identification phases to be used for characterizing platform motion according to an embodiment.

An exemplary configuration is schematically depicted in FIG. 4. During an offline training phase 400, data sets of representative trajectories for desired vehicle motion modes may be supplied in 402, from which statistical, time-domain, and/or frequency-domain features may be extracted in 404 and supplied to a suitable training algorithm in 406. A label 408 representing whether the motion mode of each data set corresponds to a moving vehicle may be associated with the extracted features by the algorithm to generate classification models 410.

One or more classification models may then be supplied to the portable device, such as to motion characterization module 220 of portable device 200 for use in an identification phase 412 during which it may be determined whether portable device 200 is in a moving vehicle. In 414, accelerometer and gyroscope motion sensor data, and optionally, GNSS, magnetometer and/or barometer data, may be obtained for portable device 200. As indicated, this may include measurements of specific forces and angular rates, velocity, position, and/or altitude. In 416, any suitable combination of this data may be preprocessed, such as in a sensor fusion operation to estimate certain variables. Preprocessing may also include performing filtering operations, such as with a low pass filter to reduce noise. Preprocessing may also include leveling one or more sensor measurements to account for an orientation of portable device 200, such as in the form of determined roll or pitch angles indicating a relationship to a suitable external frame of reference. These variable may include any of: $a_{up}$, representing a net acceleration component of portable device 200 along the axis normal to the surface of the Earth; $a_h$, representing magnitude of the acceleration component along the plane parallel to the surface of the Earth; $|\omega|$, representing the norm of compensated angular rotation components; h, representing smoothed altitude, which may include barometric altitude if available, fused with smoothed levelled vertical acceleration; and/or $v_{up}$, representing differentiation of smoothed height with respect to time.

In 418, features may be extracted from the variables output by 416, suitable features include statistical features, representing either the central or typical value, or a measure of the spread of data, across a window; energy, power, and magnitude features, representing the overall intensity of the data values across a window; time-domain features, representing how a signal or variable varies with time; frequency-domain features, representing a variable or signal in the frequency domain; or any other features, such as cross-correlation between the acceleration components. The extracted features may then be fed to 420 for classification by evaluation of the features extracted in 418 into the models 410 derived during training phase 400. Classification as represented by 420 may be a decision tree, support vector machine, artificial neural network, Bayesian network, or any other machine learning or pattern recognition model, or combination thereof. Based on the output, motion characterization module 220 may determine whether portable device 200 is in a moving vehicle.

In one embodiment, a signal analysis approach may be employed in which a statistical (e.g., mean or variance), time-domain (e.g., peak detection), or frequency-domain (e.g., Fast Fourier Transform or wavelet transform) analysis may be performed, or a combination of these techniques may be employed. As in the machine learning approach, three-axis accelerometer and three-axis gyroscope data may be used. For example, the analysis may include at least one of an angular rotation signal, a signal derived from the angular rotation signal, an acceleration signal, and a signal derived the acceleration signal. Also similarly, additional information, such as from a magnetometer (e.g., a three-axis magnetometer), a barometer, absolute navigational information module 224 providing a source of absolute navigational information (e.g., GNSS information) and/or from other suitable sources is optional and may be employed as desired.

Figure 5:
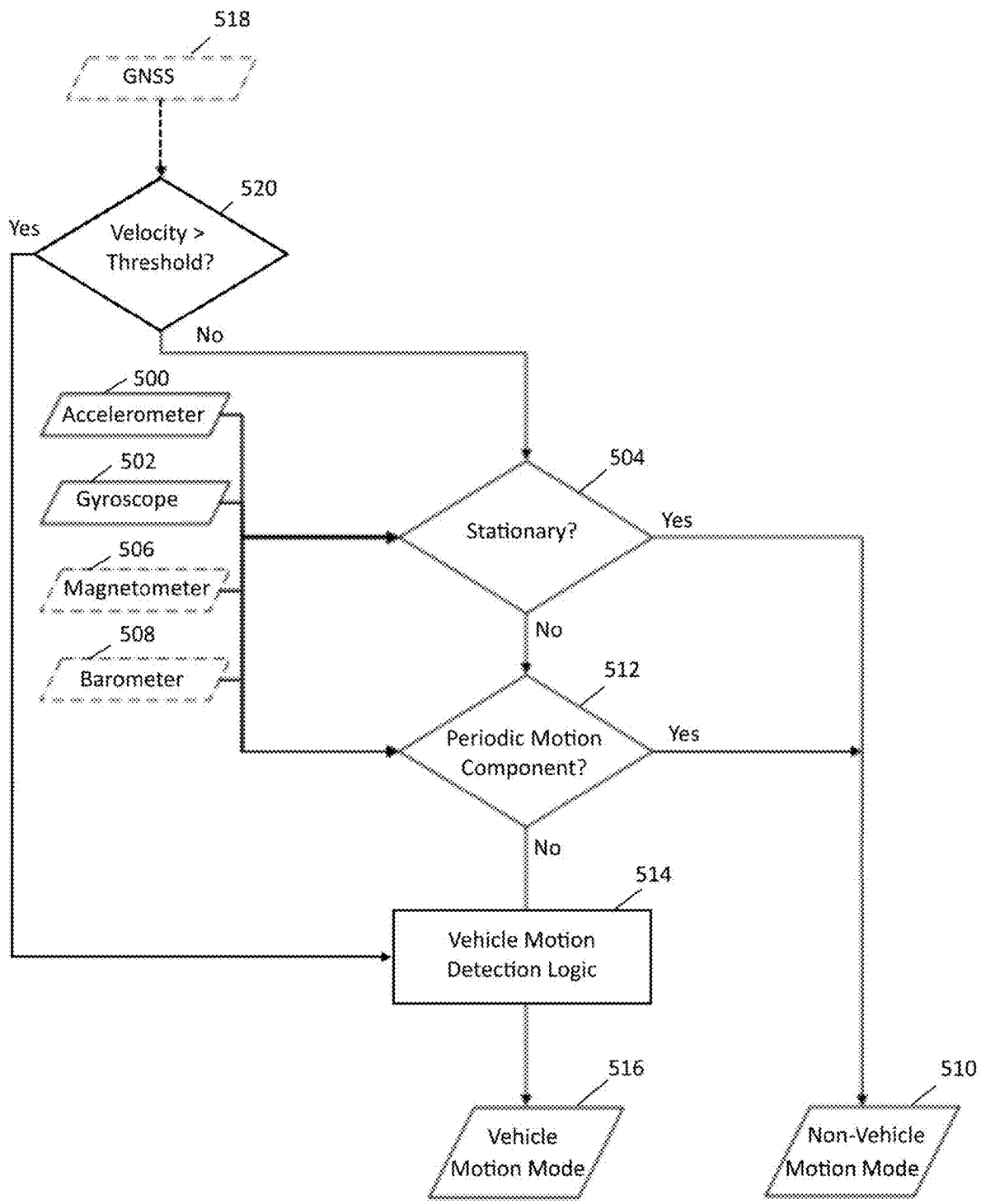
FIG. 5 is a flowchart showing a routine for determining whether a portable device is in a moving vehicle according to an embodiment.

An exemplary routine is schematically depicted in the flowchart of FIG. 5. Inputs, including accelerometer data 500 and gyroscope data 502, such as from inertial sensor 212, external sensor 214 and/or auxiliary sensor 216, may be fed to 504 and used by motion characterization module 220 to determine whether portable device 200 is stationary. As indicated, additional information, depicted as magnetometer data 506 and barometer data 508 optionally may be used if desired and available. Depending on the implementation, barometer and/or magnetometer data may be obtained from external sensor 214 and/or auxiliary sensor 216. Information from other suitable sources may also be employed. For example, determination of whether portable device 200 is stationary may include deriving the variance, mean, and magnitude of certain frequency bins, of the specific force measurements from the accelerometer and the rotation measurements from the gyroscope over pre-defined length windows and comparing the values against suitable thresholds to identify whether the platform conveying portable device 200 is stationary or not. As indicated by 504, if such values are less than corresponding thresholds, the platform may be assumed to be stationary and the routine may branch to 510 resulting in a determination portable device 200 is not in a moving vehicle.

Otherwise, if the determination in 504 is that the platform is not stationary, the motion sensor data, including accelerometer data 500 and gyroscope data 502, may be fed to 512 for determination of whether a periodic motion component is present. Again, use of magnetometer data 506, barometer data 508 and/or other suitable sources of information is optional and may be used if desired and available. When a periodic motion component is present, it may indicate the user is undergoing a regular, repeating motion. Since a periodic motion component is characteristic of human-powered motion, such as walking, running, cycling and the like, a positive determination in 512 may cause the routine to branch to 510 resulting in a determination portable device 200 is not in a moving vehicle. For example, the specific force measurements may be transformed to obtain the levelled vertical acceleration (i.e., acceleration along the axis perpendicular to the Earth's surface). Correspondingly, if regular maxima peaks occur with amplitudes exceeding an appropriate threshold and if peak-to-peak time periods exceeding an appropriate threshold are detected, then footsteps or cycle pedals may be assumed. However, if no or an insufficient periodic motion component is detected, the routine may continue to 514, for application of vehicle motion detection logic that may receive inputs from 512 and 518, discussed below. Output from vehicle motion detection logic 512 may include a determination portable device 200 is in a moving vehicle mode as indicated by 516. Otherwise, it is identified that the phone is not in a moving vehicle, i.e., assumed that the user carrying the phone may be walking, running, or cycling for example or other non-vehicular motion.

As an optional adjunct, if GNSS data 518 is available, such as obtained from absolute navigational information module 224, motion characterization module 220 may determine in 520 whether portable device 200 is experiencing a velocity greater than an appropriate threshold. Other sources of absolute navigational information may also be used to derive velocity for portable device 200. If the velocity exceeds the threshold for a sufficient period of time, such as several seconds, it may be assumed that portable device 200 is in a moving vehicle and the routine may jump to 514. Otherwise, the routine may continue to 504 to perform the operations described above, since velocity below the threshold may indicate portable device 200 is stationary or the platform is the user cycling, running or walking. Further, the position and/or velocity information determined from GNSS data 518 may be used to supplement or facilitate the determinations made in 504 and 512.

Alternatively or in addition, image sensor data may be used when determining whether the portable device 200 is within a moving platform. For example, detection of whether portable device 200 is in a static, motionless state may be determined by assessing the degree of similarity between samples. As will be appreciated, if portable device 200 is static, even if it is within a platform, the platform must also be static. In one embodiment, motion characterization module 220 may be configured to detect a static state of portable device 200 using the Mean Structural Similarity Index (MSSIM). The MSSIM is a singular value that quantifies the degree to which two images match in luminance, contrast, and structure. For two input signals x and y, the SSIM within a window m of size N×N is given by Equation (1), wherein $\mu_x$ and $\mu_y$ are the means of $x_m$ and $y_m$, $\sigma_x^2$ and $\sigma_y^2$ are the variance of $x_m$, and $y_m$, $\sigma_{xy}$ is the covariance between $x_m$ and $y_m$, and $C_1$ and $C_2$ are stabilizing coefficients:

$$SSIM(x_m, y_m) = \frac{(2\mu_x\mu_y + C_1)(2\sigma_{xy} + C_2)}{(\mu_x^2 + \mu_y^2 + C_1)(\sigma_x^2 + \sigma_y^2 + C_2)} \quad (1)$$

By taking the mean value across all M windows used to construct the structural similarity array, the MSSIM may be represented by Equation (2):

$$MSSIM(x, y) = \frac{\sum_{m=1}^{M} SSIM(x_m, y_m)}{M} \quad (2)$$

An MSSIM value of zero may be taken as an indication that the two images are completely unrelated, while a value of one indicates that the images are identical. Because a static feature-rich scene and a moving feature-less scene would both result in a high MSSIM, characteristics in addition to the MSSIM value may be employed for static detection. For example, when the MSSIM value of a pair of images exceeds a threshold, the homogeneity of the images may also be assessed. In one aspect, a high homogeneity (i.e. small derivative value) of the scene being captured may indicate largely uniform images and may reduce the confidence in any navigational constraint subsequently determined from those images. Conversely, high derivative values may indicate the scene is feature-rich and the confidence in a corresponding navigational constraint determined from the images may be increased.

Turning now to 104 of FIG. 1, may be performed by motion characterization module 220, such as by using motion sensor data, such as information from inertial sensor 212, external sensor 214 and/or auxiliary sensor 216. In progressing to this stage, it has already been determined that portable device 200 is in a moving vehicle. Correspondingly, in one aspect, identifying independent motion dynamics of the portable device may include determining whether portable device 200 is tethered to the platform, such as being secured in a cradle or holder or otherwise mounted to the vehicle.

In one aspect, identification of independent motion dynamics of the portable device may involve assessing a radius of rotation. Since portable device 200 may be moved or tilted to any orientation within the platform (vehicle) either due to interaction with the user or due to a movement of the platform including turns, the radius of rotation of portable device 200 may be used to distinguish whether the device movement is attributed to vehicle turning or movement by the user. Calculating the radius of rotation of the device may be achieved using the gyroscope and accelerometer readings or a smoothed, averaged, or filtered version thereof. The calculated radius of rotation may or may not undergo smoothing, averaging, or filtering as well. A threshold value may be used to classify the values of the calculated radius of rotation to relatively smaller and relatively larger values. Smaller values of the radius of rotation indicate a device motion due to a user movement while larger values may indicate device motion due to vehicle maneuvering. As such, user movement may include changes in orientation, direction, or dynamics due to a user is trying to reach the phone or use it for any activity such as making calls. Vehicle or vehicle movement on the other hand may include a change in the device orientation, direction, or dynamics due change in the vehicle direction or vehicle speed by accelerating or decelerating.

One suitable technique for calculating the radius of rotation of portable device 200 r may depend on its angular velocity ω, angular acceleration $\dot{\omega}$ and translational acceleration A; both the angular velocity and the angular acceleration may be obtained from gyroscope measurements, while the translational acceleration may be obtained from accelerometer measurements after removing the gravitational component. Removing the gravitational component from the accelerometer data may require leveling the device axis to the horizontal plan. Optionally, the gyroscope and accelerometer readings may be smoothed, averaged, or filtered, such as for example smoothing or averaging a history of the gyroscope readings before using them to calculate the angular acceleration. Equation (3) illustrates the relation between the translational velocity V of an object and its rotational velocity ω, where R is the radius of rotation vector where can be represented by $[R_x, R_y, R_z]^T$.

$$V = \omega \times R \quad (3)$$

This equation may then be differentiated to generate Equation (4):

$$a = \dot{V} = \dot{\omega} \times R - |\omega|^2 R = \{[\dot{\omega}_\times] - |\omega|^2 [I]\} R \quad (4)$$

in which a is the translational acceleration vector, I is the identity matrix, and $\dot{\omega}$ is the angular acceleration vector as given in Equation (5):

$$[\dot{\omega}_\times] = \begin{bmatrix} 0 & -\dot{\omega}_z & \dot{\omega}_y \\ \dot{\omega}_z & 0 & -\dot{\omega}_x \\ -\dot{\omega}_y & \dot{\omega}_x & 0 \end{bmatrix} \quad (5)$$

Both sides of Equation (4) may be multiplied by $\{[\dot{\omega}_\times] - |\omega|^2 [I]\}^{-1}$ to obtain R as indicated by Equation (6):

$$R = \{[\dot{\omega}_\times] - |\omega|^2 [I]\}^{-1} a \quad (6)$$

$$= \begin{bmatrix} |\omega|^2 & -\dot{\omega}_z & \dot{\omega}_y \\ \dot{\omega}_z & |\omega|^2 & -\dot{\omega}_x \\ -\dot{\omega}_y & \dot{\omega}_x & |\omega|^2 \end{bmatrix}^{-1} a$$

Correspondingly, the magnitude of the radius of rotation may be expressed by Equation (7), where e $R_x$, $R_y$, and $R_z$ are the three components of the B vector in the x-axis, y-axis, and z-axis direction respectively:

$$r = |R| = \sqrt{R_x^2 + R_y^2 + R_z^2} \quad (7)$$

Figure 6:
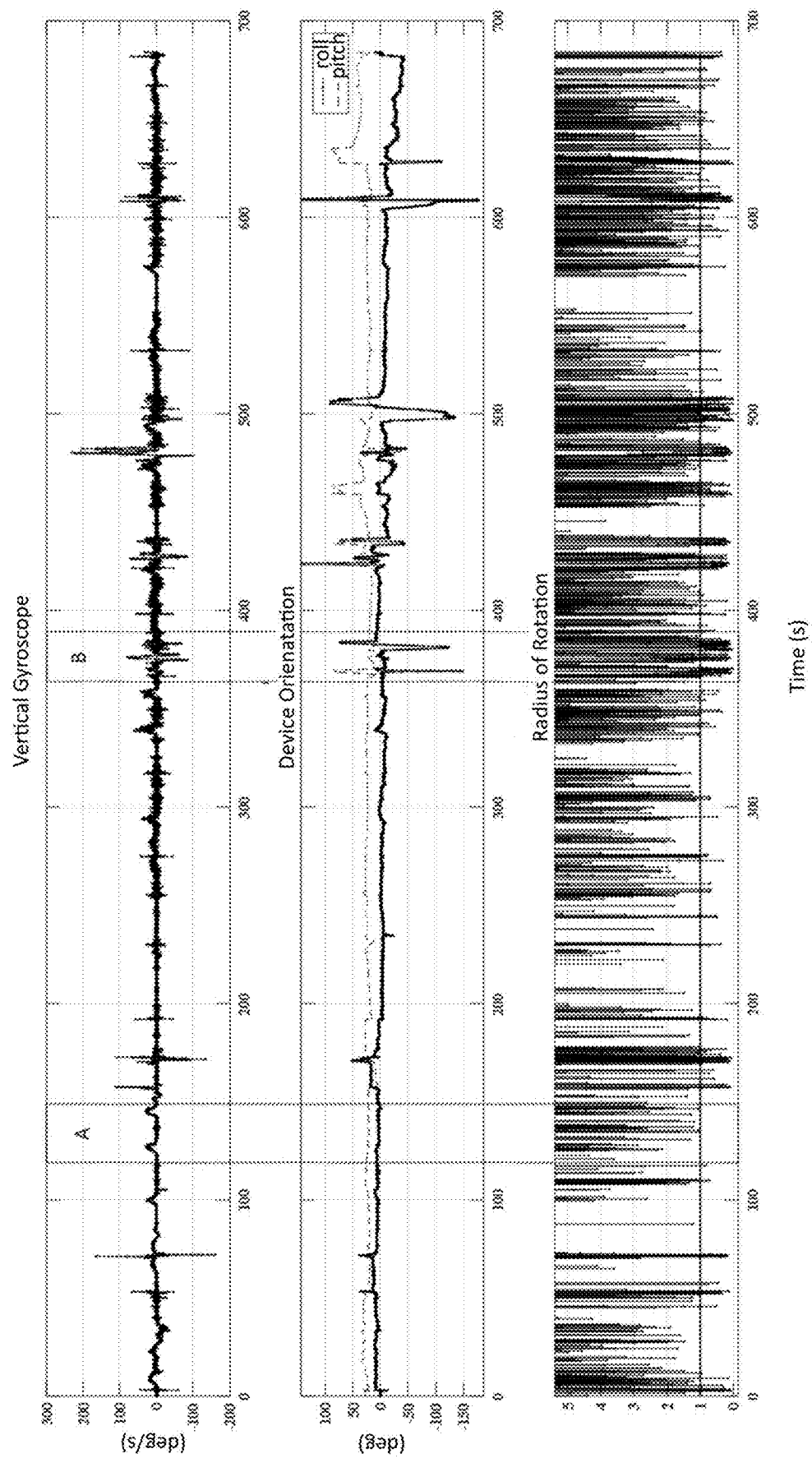
FIG. 6 is a graphical representation of motion sensor data including motion sensor data corresponding to motion of the platform and motion sensor data corresponding to identified independent motion of the portable device according to an embodiment.
Figure 7:
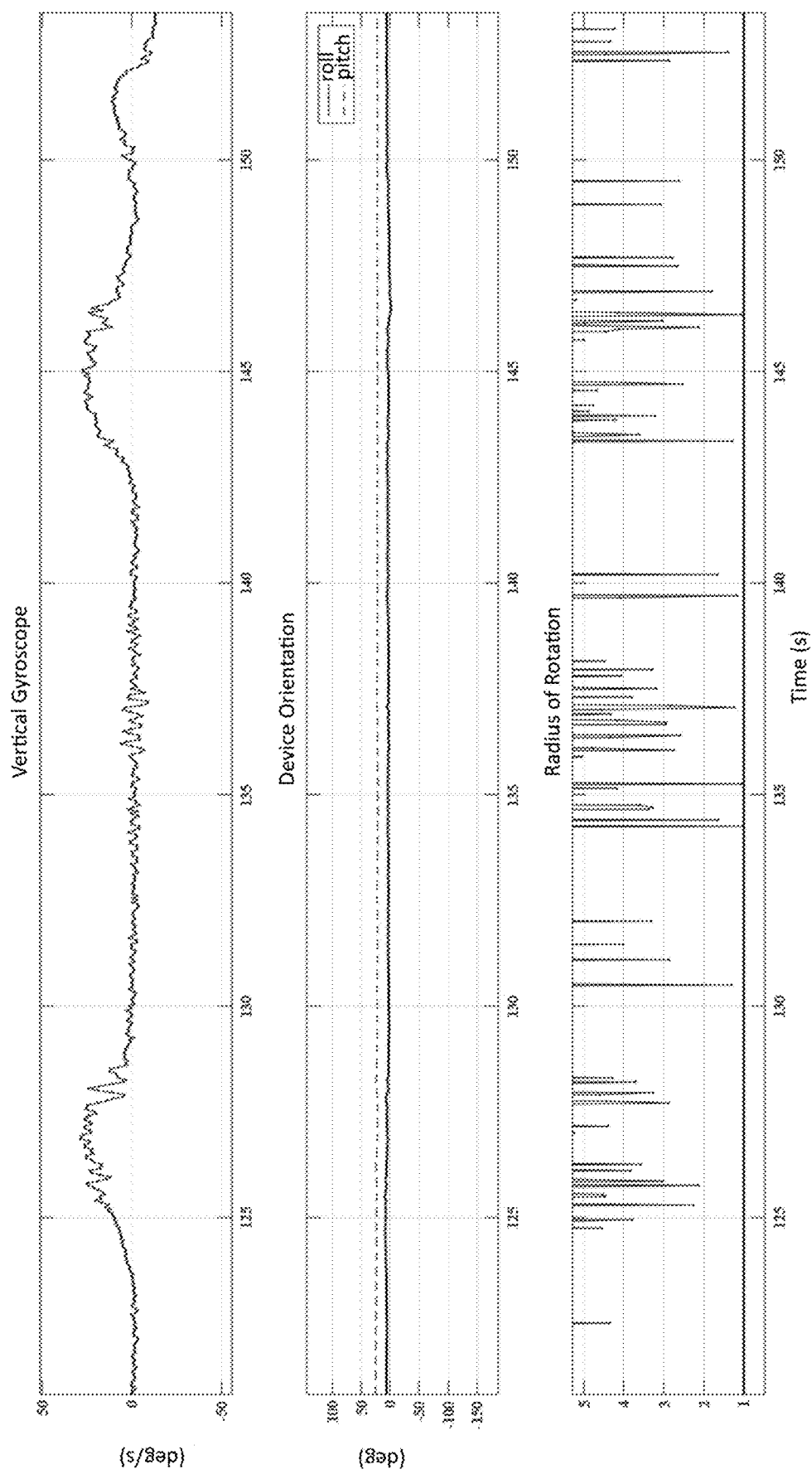
FIG. 7 is detail view of a region of the motion sensor data shown in FIG. 6 indicating vehicle motion according to an embodiment.
Figure 8:
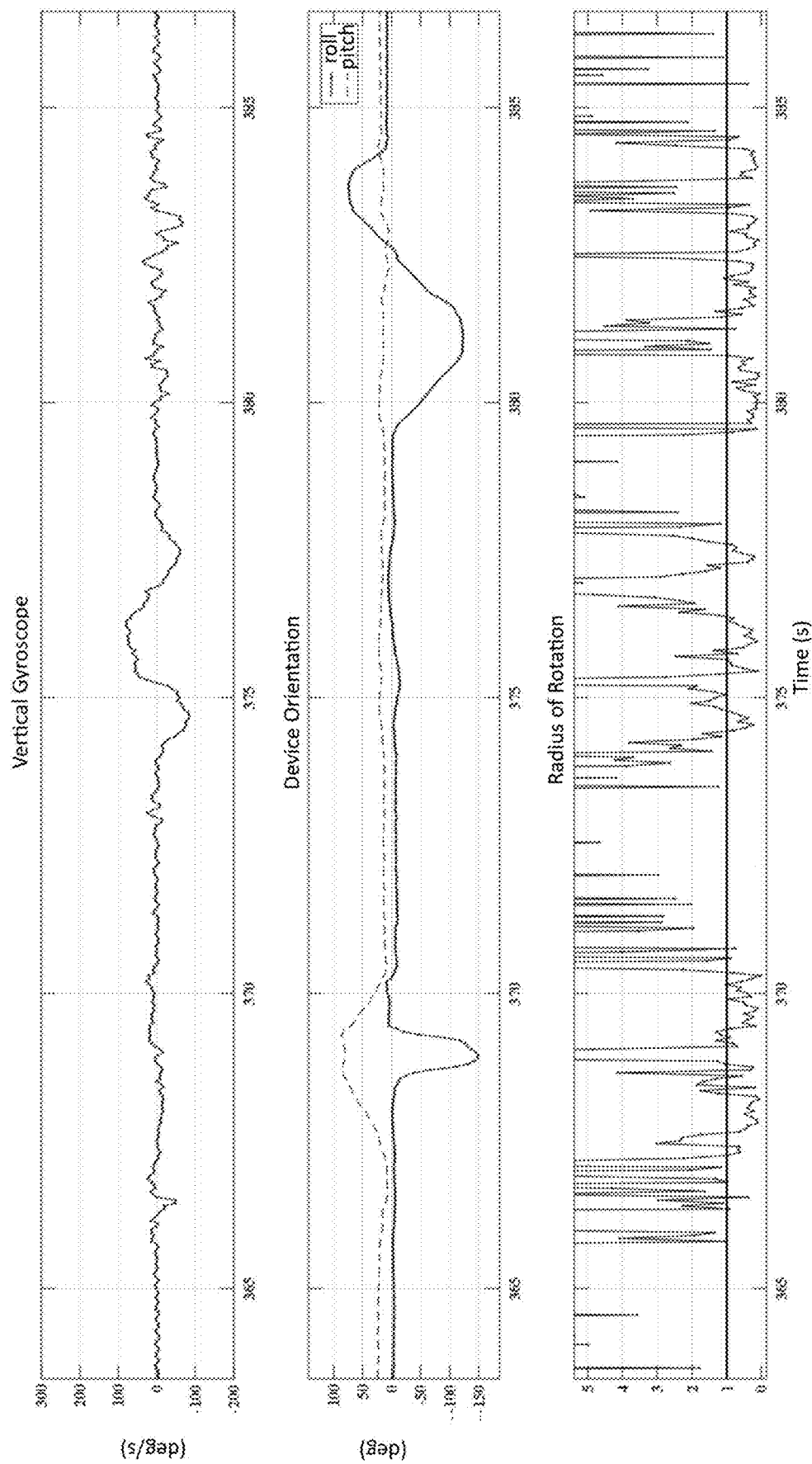
FIG. 8 is detail view of a region of the motion sensor data shown in FIG. 6 indicating device motion due to user interaction according to an embodiment.

As noted above, the calculated value of the radius of rotation of portable device 200 may be used to identify if a change in the device motion is caused by a movement of the device itself or by a motion of the platform containing the device. A smaller radius of rotation value results when movement is due to user interaction and a larger radius of rotation value results when movement is due to vehicle motion. To help illustrate, test data was obtained to show the effect of the estimated radius of rotation values in relation to the vertical gyroscope, and roll and pitch angles values. Specifically, FIG. 6 graphically illustrates the test data, with the top graph showing the vertical gyroscope value, the middle graph showing device orientation and the bottom graph showing the calculated radius of rotation. The region designated "A" represents movement due to vehicle motion while the region designated "B" represents movement due to user motion. for all entities. The two marked and labeled boxes are refereeing to regions of interest where area A refers to vehicle movement while area B refers to user interaction. A more detailed view of region "A" is graphically illustrated in FIG. 7, showing that there is a rotation around the vertical axis corresponding to a change in the vehicle direction. However, the roll and pitch values show that the device is maintaining the same orientation during the change. The radius of rotation values are predominantly larger than a given threshold, 1 meter, indicating the change in the driving direction is due to turn by the vehicle. In contrast, FIG. 8 illustrates a more detailed view of region "B." Here, the gyroscope values again indicate a change in direction, but the roll and pitch values also indicate a change in the device orientation and the radius of the rotation values are predominantly smaller than the threshold. Thus, region "B" represents movement of the device that may be attributed to user interaction.

In one aspect, identification of independent motion dynamics of the portable device may involve analyzing characteristics of the determined orientation of portable device 200. Roll, pitch, and yaw angles may be calculated from the motion sensor data, such as by using accelerometer data, gyroscope data, and/or magnetic data. These angles may be used to define the device orientation and any change in their values indicates movement experienced by portable device 200. As such, the device orientation will have a constant status if the device is motionless, while change in device orientation may be attributed to either platform motion or user interaction. Analyzing the change in the device orientation may be used to identify device motion dynamics that are independent of the platform motion dynamics. For example, if the vehicle is accelerating or decelerating, there will be no change in the device orientation and the values of the roll, pitch and yaw angles may expected to remain the same and not be affected. Likewise, a vehicle maneuver such as turning may be expected to result in a change in yaw angle only, while the roll and pitch angles values of portable device 200 may remain the same. Conversely, any change in the device orientation resulting from user interaction may affect any of the roll, pitch, and yaw angles. Correspondingly, the device orientation with the non-holonomic constraints may be used to identify the source of device movement and assign it to vehicle maneuvering or user interaction. Further, the rate of change in the device orientation may also be considered in the analysis.

In one aspect, identification of independent motion dynamics of the portable device may involve analyzing the heading misalignment between a heading of portable device 200 and the driving direction or heading of the platform. As will be appreciated, the heading misalignment between the vehicle direction and the device heading may be determined from the motion sensor data. It may be expected that the value of the heading misalignment angle will remain constant when the user is not interacting with portable device 200. For example, if the device is not moved being moved independently by the user, when the driving direction changes, the device heading will follow, changing in a corresponding manner so that the value of the heading misalignment angle stays relatively constant. As such, any change in the heading misalignment angle may indicate that the device is being moved due to user interaction.

Figure 9:
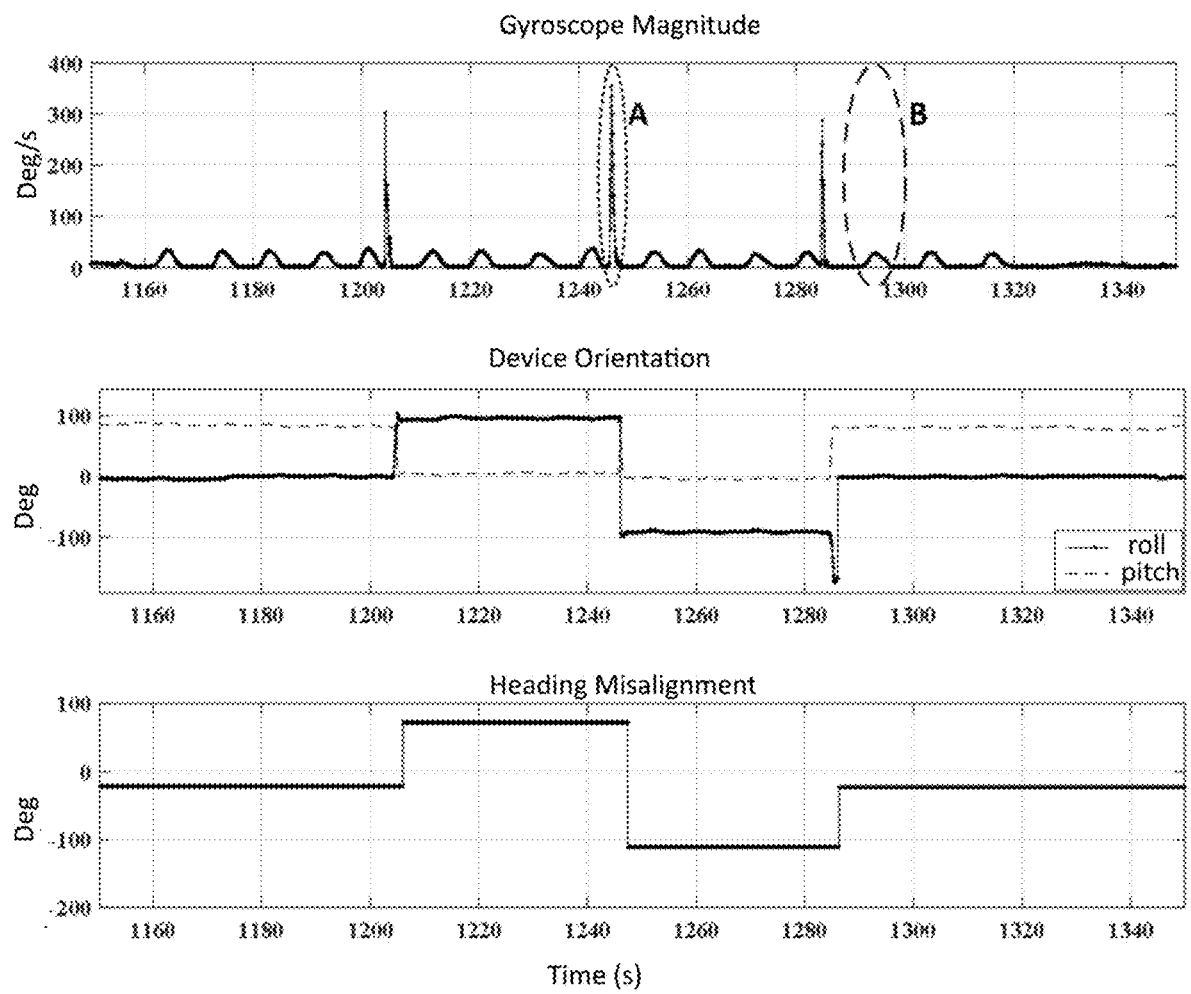
FIG. 9 is a graphical representation of motion sensor data characteristic of a portable device retained in a cradle according to an embodiment.
Figure 10:
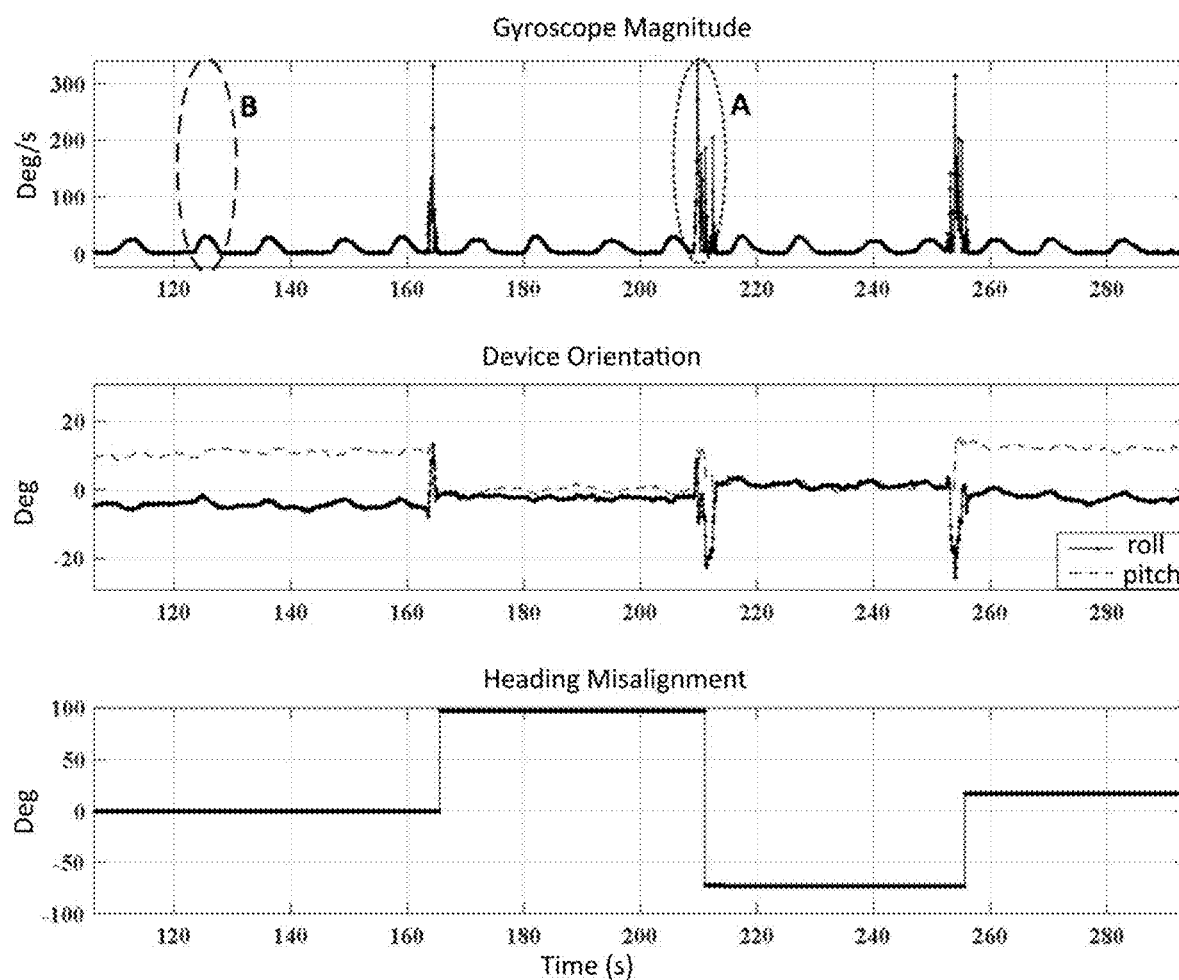
FIG. 10 is a graphical representation of motion sensor data characteristic of a portable device resting on a seat of the platform according to an embodiment.

To help illustrate, representative test data was obtained under temporarily tethered conditions, when the portable device was held in a cradle and when the portable device was placed on the passenger seat beside the operator. The results when cradled are graphically illustrated in FIG. 9, with the gyroscope magnitude shown in the top graph, the device orientation shown in the middle graph and the determined heading misalignment in the bottom graph. As shown, a driving test began with the device having a heading misalignment angle of about −20 degrees with respect to the driving direction. The user changes the device orientation to make a heading misalignment of about 80 degrees. Then, the device direction changes again to be about −110 degrees with respect to the driving direction. Finally, the device was returned to the original direction, with the heading misalignment angle about −20 degrees. Similarly, the results from when the portable device is resting on the passenger seat are shown in FIG. 10. At the start of the test, the device has the same heading angle as the driving direction with heading misalignment angle of about 0 degrees. The user changes the device direction, which makes the heading misalignment is about 100 degrees. Then, the device direction was changed to be about −70 degrees with respect to the driving direction. Finally, the device orientation was changed to have about 20 degrees of heading misalignment. In both figures, the device orientation values show the intervals and the times where the device changes orientation and the gyroscope magnitude plots shows the difference between the angular rotation values during turns and during orientation change. By correlating the times when the device orientation changes, but the heading misalignment does not, it may be determined the device movement is a result of the platform motion dynamics. For example, the regions labeled "A" are examples for the angular rotation values due to a change in the device orientation due to user interaction while the regions labeled "B" are examples for the angular rotation values due to a change in the driving direction, i.e., turning.

Figure 11:
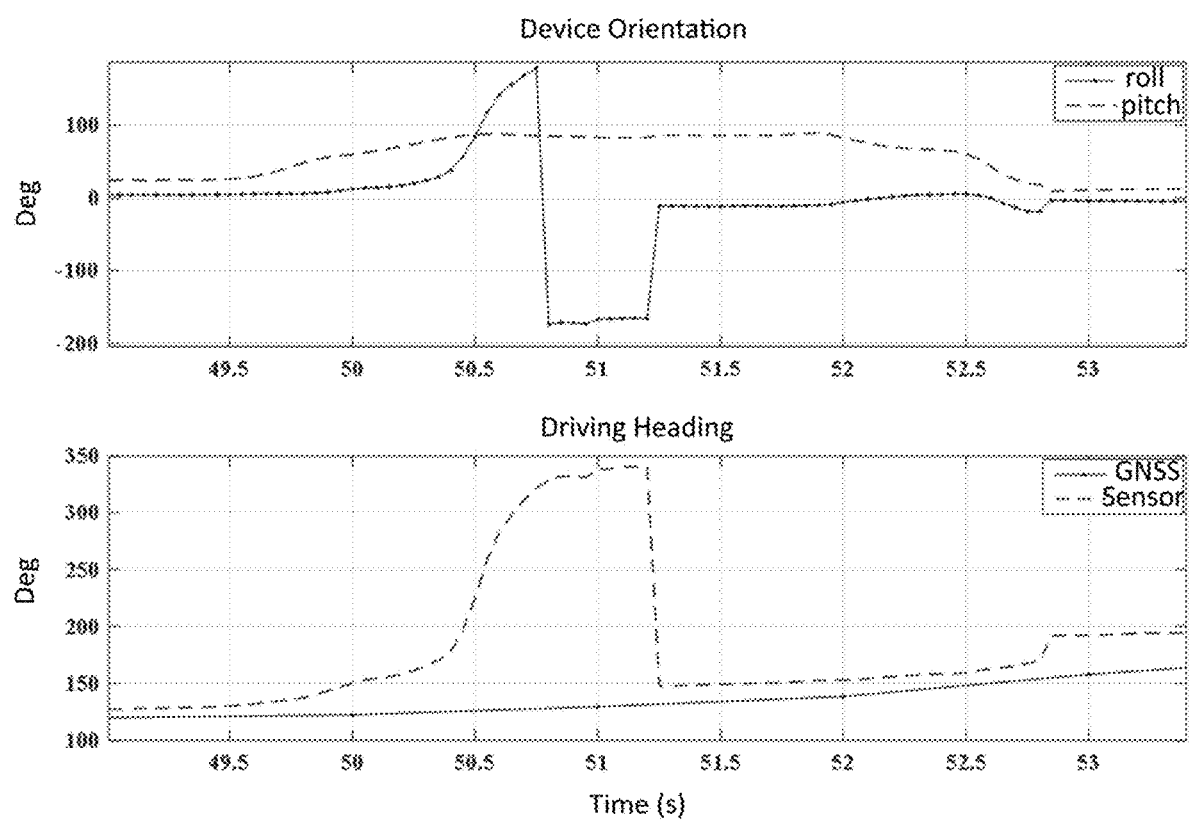
FIG. 11 is a graphical representation of motion sensor data correlated with a source of absolute navigational information according to an embodiment.

In one aspect, identification of independent motion dynamics of the portable device may involve use of a source of absolute navigational information, such as from absolute navigational information module 224. As discussed above, absolute navigational information such as GNSS data, when available, may provide information about the direction of the platform and portable device 200 when both have the same heading direction. The driving direction may be calculated from the GNSS data or other source of absolute navigational information collected by the device in the vehicle. The device heading as noted above may be calculated based on the sensors data, GNSS data, or both. When portable device 200 is in a tethered condition, both may be expected to have the same heading even if the vehicle is maneuvering or changing direction. However, device heading determined from motion sensor data may be expected to deviate from the heading based on the GNSS data when portable device 200 is moved due to user interaction. Representative test data is graphically illustrated in FIG. 11. As shown, periods when the device orientation changes may be correlated with periods when the heading of the device determined from the motion sensor data deviates from the heading determined from absolute navigational information to identify motion dynamics of the portable device that are independent of motion dynamics of the platform.

Figure 12:
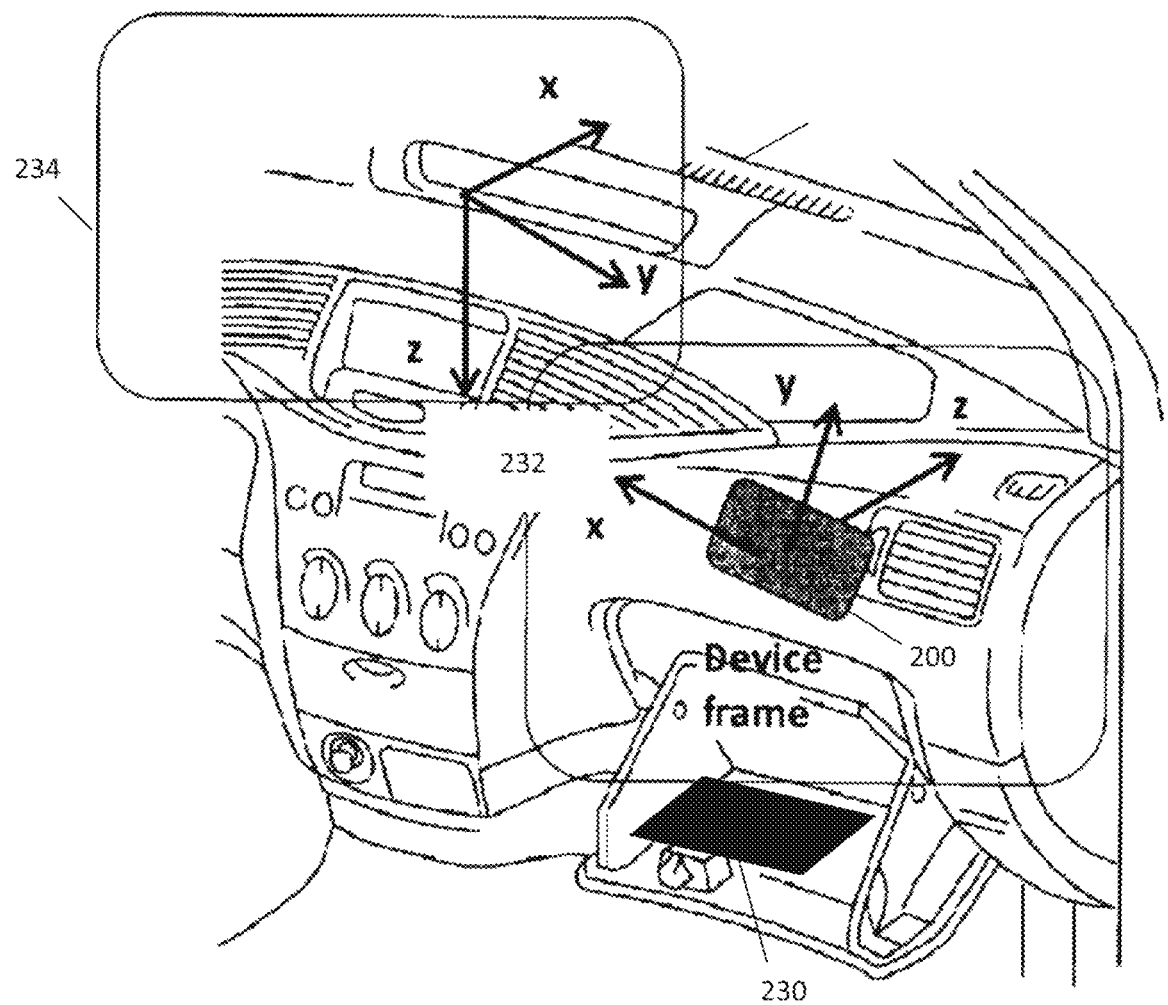
FIG. 12 is a schematic depiction of multiple portable devices for characterizing platform motion according to an embodiment.

In one aspect, identification of independent motion dynamics of the portable device may involve comparing motion sensor data from a plurality of portable devices. use of a source of absolute navigational information, such as from absolute navigational information module 224. As noted above, portable devices having the capability to sense motion are becoming ever more popular. Correspondingly, situations may exist when two or more devices generally having the capabilities discussed with regard to portable device 200 are present in the moving platform. When more than one device are in the vehicle at the same time, the motion sensor data from the different devices may be synchronized, such as by using a reference time tag such as GPS-Time tag. It may be expected that any change in device motion dynamics should be the same for all devices when both are in a tethered condition. However, if one device experiences a different motion pattern than another device, it may be determined that one there are motion dynamics that are independent of the moving platform. For example, FIG. 12 schematically depicts portable device 200 and auxiliary portable device 230 within the cabin of a platform, vehicle 232. As noted, auxiliary portable device 230 may have similar capabilities as portable device 200, an illustration being portable device 200 implemented as a smartphone and auxiliary portable device 230 as a tablet, however either device may be any portable device. In this embodiment, portable device 200 is shown as being mounted to a dash cradle. Depending on how it is secured, the frame 234 of portable device may not be aligned with the frame 236 of the vehicle. This difference in relative orientation is the misalignment between the respective frames, and as discussed herein, aspects of this disclosure pertain to determining this misalignment, such as in the context of heading misalignment which expresses the difference in orientation in reference to the direction of driving. Notably, this misalignment may vary at any time if the user is holding portable device 200 or otherwise interacting with it. In the embodiment shown, auxiliary portable device 230 is placed within the glove compartment, but the techniques of this disclosure may be applied regardless of its location within the platform. For example, either device may be held by the user, tethered to the platform (temporarily or for the duration of a trip), resting on a surface of the platform, held within a pocket or holster of the user, retained within a backpack, purse, briefcase or the like, or placed in any other manner within the platform.

Figure 13:
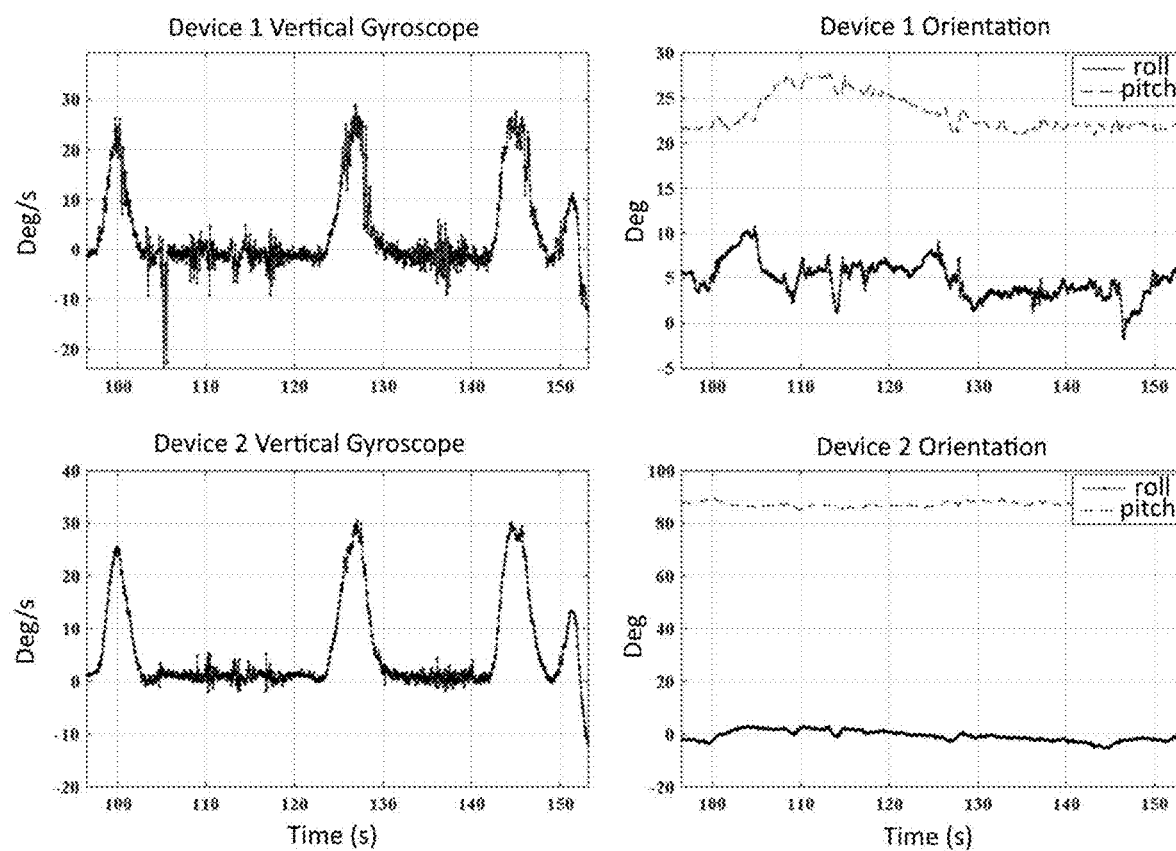
FIG. 13 is a graphical representation of motion sensor data from multiple portable devices when neither device experiences user interaction according to an embodiment.
Figure 14:
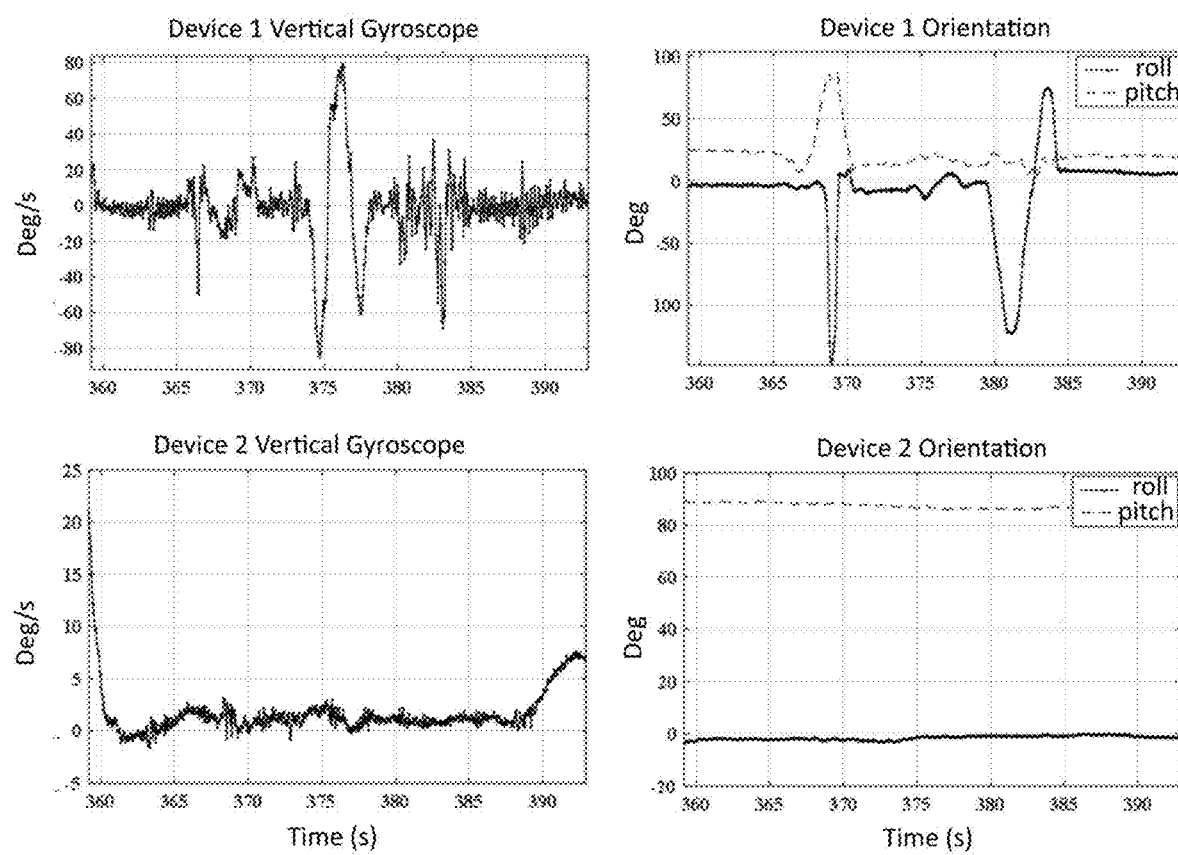
FIG. 14 is a graphical representation of motion sensor data from multiple portable devices when one device is experiencing user interaction according to an embodiment.

Representative data was collected when two devices were tethered to the vehicle as shown in FIG. 13 and when one device was tethered but the other experienced movement due to user interaction as shown in FIG. 14. As may be seen, the data from both devices was similar in FIG. 13 and one device experienced a different motion pattern in FIG. 14. Consequently, the change in the device dynamics may be recognized as being due to user interaction or vehicle movement by comparing the synchronized data from different devices that collect motion sensor data simultaneously. When the portable devices have the same change at the same time, it may be expected that all movement being experienced is attributable to the motion dynamics of the platform, while any differences may be used to identify motion dynamics of the portable device that are independent of the motion dynamics of the platform.

In one aspect, identification of independent motion dynamics of the portable device may involve other suitable techniques. For example, data from the accelerometer, gyroscope, magnetometer, barometer, and/or GNSS could be fused together or used individually. However, most of these benefit from some form of processing such as de-noising and leveling. Correspondingly, each source of sensor data has features which may be used to identify motion dynamics of the device that are independent of platform motion dynamics. These features may be calculated in the time domain or in the frequency domain. Using a windowing technique, suitable time domain features may include the magnitude, average, standard division, peak to peak, mean square error, . . . etc. while suitable frequency domain features may include amplitudes at certain frequency bins, signal energy, entropy, . . . etc. Further, a correlation coefficient may be used as a feature to represent the relation between two different sensors. Features may be represented as a scalar or vector per feature, a concatenated vector of all features, or one matrix holding all features. Moreover, the extracted features could be used as groups or subsets or may be transformed into a different space. Different techniques may then be used to fuse the different extracted features from the different sensors to provide the proper decision about the source of the device movement. One example is a statistical analysis technique that uses different features with the appropriate thresholds. Other possible technique includes methods based on machine learning algorithms, of which Artificial Neural Network (ANN), Support Vector Machine (SVM), k-nearest neighbor (KNN), Rand Forest (RF) are examples of machine learning classifiers.

Additionally or alternatively, identification of independent motion dynamics of the portable device may involve information obtained from image sensor 222 as noted above. Once it has been determined the platform is moving, After detecting the device in a moving vehicle, different approaches employing image sensor data may be used to distinguish between motion dynamics of the platform and of the portable device. As will be described in the following materials, image sensor output such as a camera image or sequence of images and input from image sensors of synchronized devices may be used. Further, supplemental sensor data, such as from depth sensors and proximity sensors, may also be employed. Depth or ranging sensors could be optical based, such as IR sensors, while a LIDAR or other ultrasonic sensors represent non-optical sensors than may provide depth or range information.

Since many implementations of portable device 200 may have an image sensor 222 in the form of a front and/or rear camera, such sensors may capture an instantaneous image or a sequence of images. Correspondingly, the captured images may be used when identifying independent motion dynamics of the portable device. Different techniques may be used to detect if a scene over a sequence of frames has changed totally or partially. When there is a change in platform dynamics, such as from vehicle maneuvering, it may be expected that change will occur in some areas while some other areas may be the same over a sequence of frames. Borders around the windshield or around door glasses may be used as a reference to detect change in the sequential frames. Conversely, when a user interacts with the device and causes movement that is independent of the platform motion dynamics, it may be expected the whole scene will change completely from frame to frame as opposed to the partial change in sequential frames with fixed borders when movement is due to the platform motion dynamics. As will be described below, optical flow analysis and motion estimation techniques may be used to evaluate the change in a scene over a sequence of frames.

Figure 15:
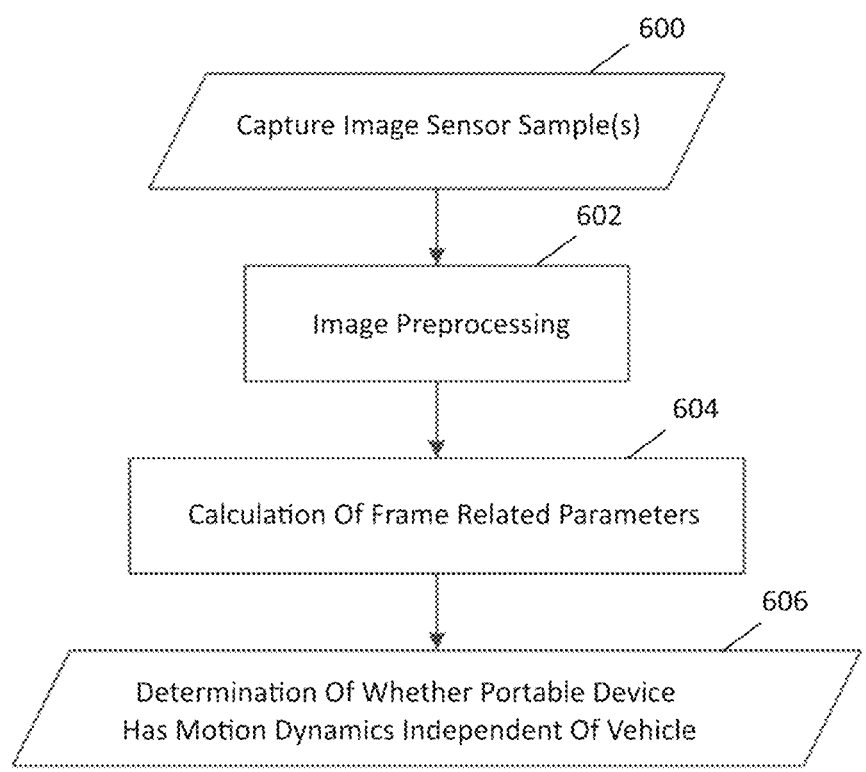
FIG. 15 is a flowchart showing a routine for using image sensor data for characterizing platform motion according to an embodiment.

An overview of one technique for using image sensor data is schematically illustrated in the flowchart shown in FIG. 15. Beginning with 600, at least one sample may be captured using image sensor 222, for example. In 602, one or more preprocessing operations may be performed, which may include steps such as conversion to grayscale, image denoising or other filtering, conversion to a format that facilitates calculation of frame parameter, and/or any other suitable preprocess. Next, one or more frame related parameters may be calculated for each sample in 604. Frame related parameters are values that help distinguish between movement of portable device 200 due to user interaction and movement due to platform motion. As will be described below, such parameters may use different characteristics of the sample on a pixel by pixel basis. Further, in some embodiments the parameters may be derived by comparing sequential samples to assess characteristics such as the similarity between two frames. In one aspect, a greater the difference between sequential sample, or consecutive images, relates to a greater indication of a relevant change in the scene. For example, a change in the scene may imply movement of device 200 that is independent of the platform. By accounting for constraints in aspects of the possible motion of the platform, a sudden change in the scene may occur when the device movement is due to user interaction. Other parameters may also be calculated to detect movement of the device caused by the user. Generally, the values of these parameters may be compared to appropriate thresholds to aid in the identification of independent motion dynamics of portable device 200. Thus, based at least in part on the calculated frame related parameters, a decision of whether portable device 200 has motion dynamics that are independent of the vehicle motion dynamics may be output in 606, as related to the operation of 104 in FIGS. 1 and 304 in FIG. 3.

One illustrative frame related parameter is a measurement of the difference between sequential samples, in that two consecutive frames may be used to calculate the Sum of Absolute Difference (SAD). The two frames are compared pixel by pixel, summing up the absolute values of the differences of each two corresponding pixels. The result is a positive number that is used as the score. SAD reacts very sensitively to even minor changes within a scene such as fast movements of the image sensor. To calculate the sum of absolute difference, the image may be converted into grayscale first as a preprocessing operation. Then the pixel by pixel differences between the two consecutive frames may be calculated, such as by employing Equation (8):

$$\mathrm{Diff}(i,j) = \mathrm{Curr\_Frame\_Pixel}(i,j) - \mathrm{Prev\_Frame\_Pixel}(i,j) \tag{8}$$

The summation of all differences may then be calculated, where the number of differences is equivalent to the total number of pixels per frame, given by the frame width (W) and height (H) dimensions. Equation (9) shows the determination of the normalized SAD between two consecutive frames, with the value of 255 corresponding to the number of the greyscale levels in this embodiment:

$$Norm_{Diff} = \frac{1}{255*W*H}\sum_{i=1}^{W}\sum_{j}^{H}|Diff(i,j)| \qquad (9)$$

Figure 16:
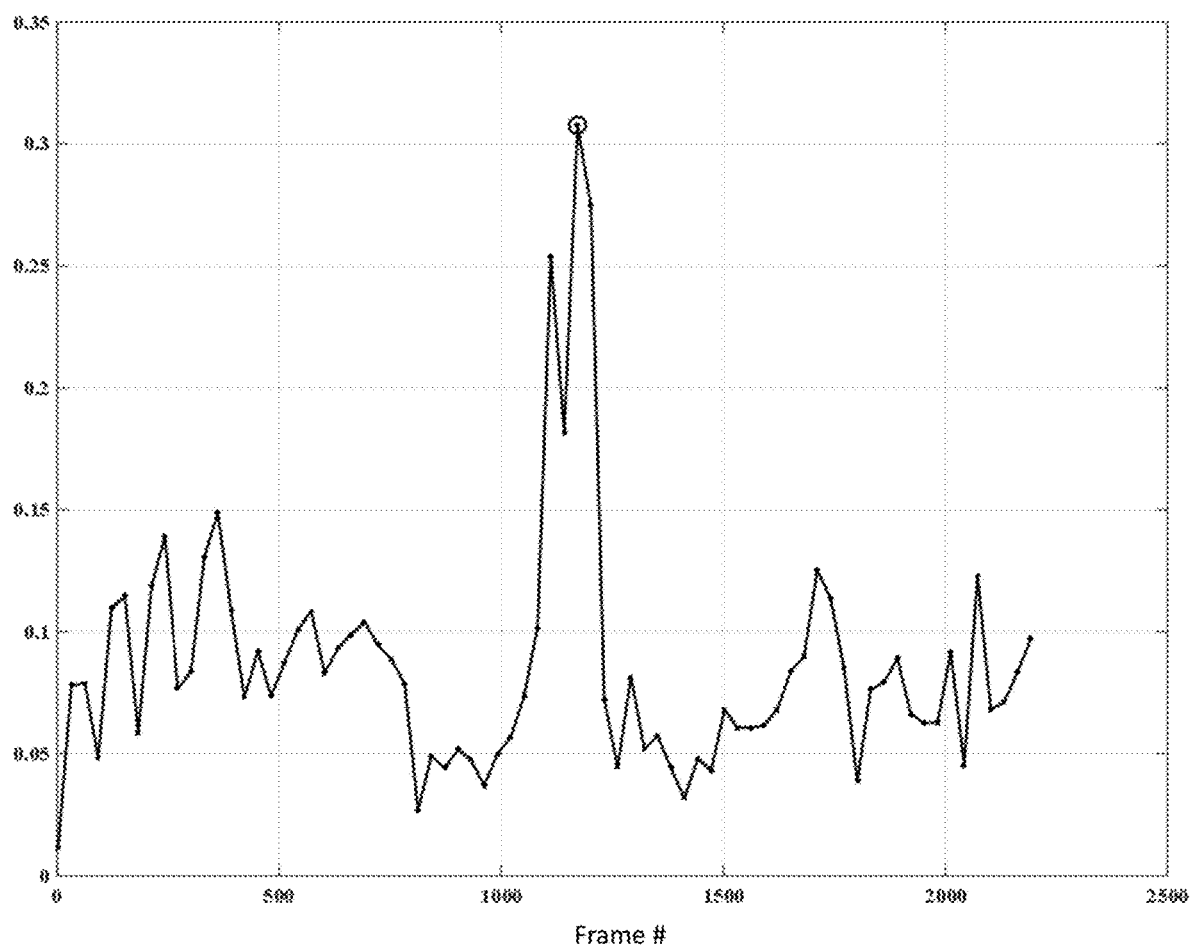
FIG. 16 is a graphical representation of the normalized sum of absolute differences for a sequence of image sensor samples according to an embodiment.
Figure 17:
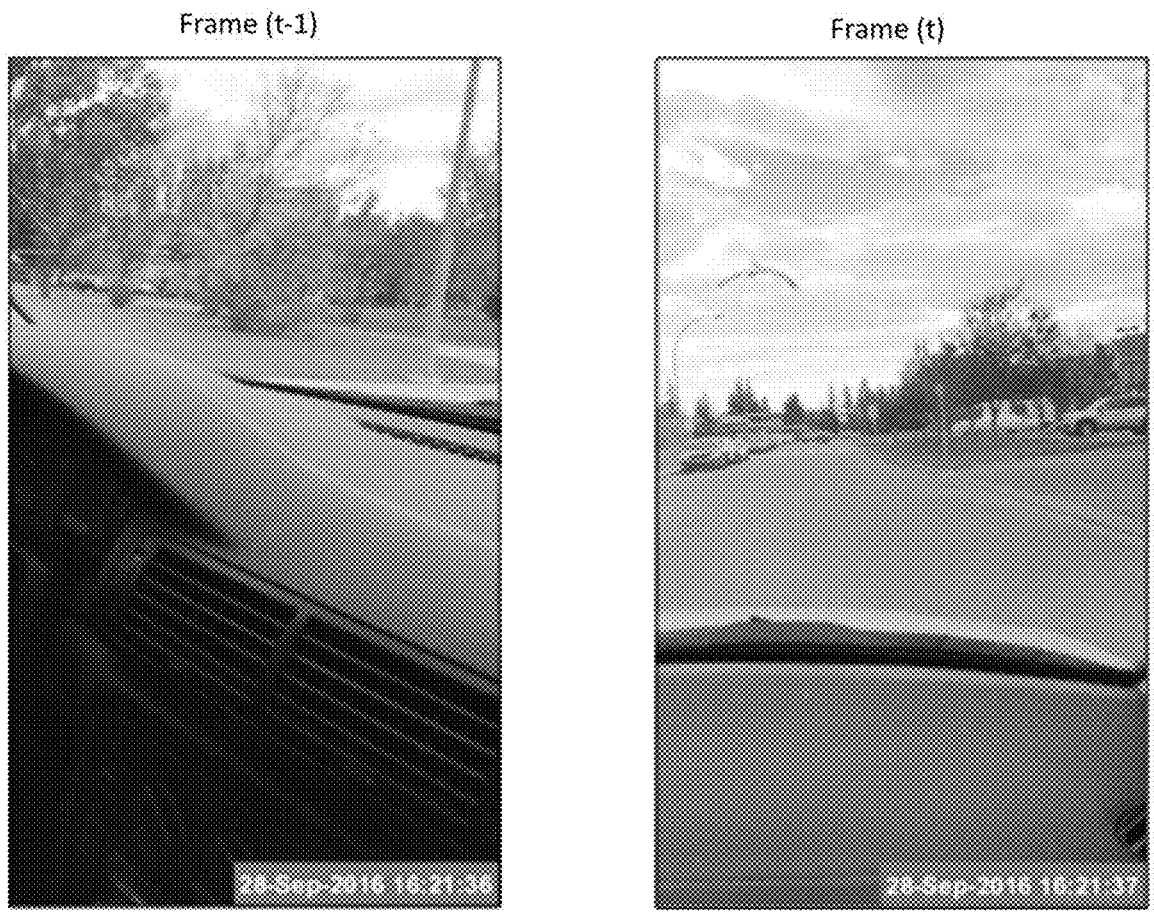
FIG. 17 depicts frames of the sequence of image sensor samples of FIG. 16 corresponding to a relatively high sum of absolute differences.

To help illustrate the use of the SAD frame related parameter, representative tests were performed using captured image sensor data. In FIG. 16, a plot of the normalized SAD between the consecutive frames is shown. At values below approximately 0.15, the normalized SAD indicates relatively small changes between sequential samples, indicating similar images corresponding to smooth changes over increased time periods as may be expected when the bordering portions remain constant and the outside scene changes in response to straight line progress or other vehicle maneuvers such as turns. However, peaks in the plot, such as the peak indicated by the circled data point having a value of 0.31, represent a relatively large normalized SAD. The corresponding images are shown in FIG. 17, and as may readily be seen, this larger SAD relates to a change in the orientation of portable device 200 within the platform, causing the entire image to change given the new perspective. As the time stamps indicate, the time difference between sequential samples is one second in this example, but other time periods may be used as desired.

Another frame related parameter may be based on the histograms of samples captured by image sensor 222, which for a greyscale image may be a distribution of its discrete intensity levels corresponding to the bit depth, such as in the range [0 255]. The histogram may be presented as a bar chart of the count of the number of pixels at each grayscale level in the image. The distribution is a discrete function h associating each intensity level $r_k$ the number of pixel with this intensity $n_k$. Further, a histogram may be normalized by transforming the discrete distribution of intensities into a discrete distribution of probabilities. One suitable technique may involve dividing each value of the histogram by the number of pixel (W*H) as indicated by Equation (10)

$$Norm_{n_k} = \frac{n_k}{W*H} \qquad (10)$$

Because a digital image is a discrete set of values, it may be expressed as a matrix so each $n_k$ may be divided by the dimension of the array, the product of the width by the length of the image.

In one aspect, sequential samples may be compared by computing the histogram differences (HD). This technique has similarities to the use of the SAD parameter described above, with the expectation that relatively smaller values may correlate to images captured when portable device is not experiencing motion dynamics independent of the platform and relatively larger values may correlate to movement of the device that is independent of the platform as may result from user interaction. As compared to SAD, HD may not be as sensitive to minor changes within a scene, and its use may result in fewer false indications of independent motion dynamics, but may not recognize hard cuts that result in significant discontinuities between sequential samples. sharp changes Correspondingly, one or a combination of both techniques as desired or as warranted by conditions.

Figure 18:
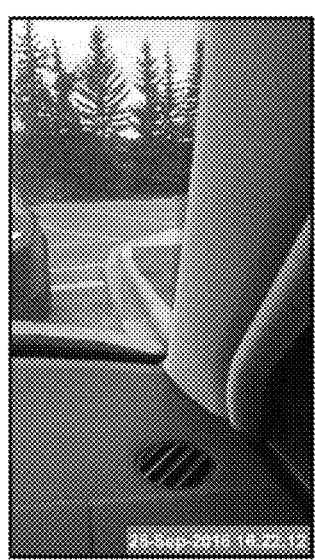
FIGS. 18 and 19 show representative images and their corresponding histograms when the platform is stationary and the user is not interacting with the portable device according to an embodiment.
Figure 18:
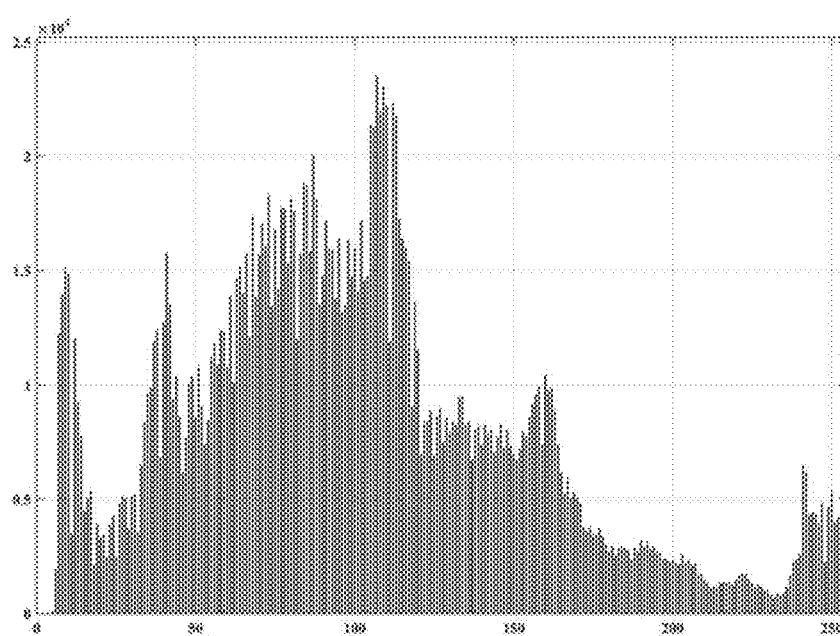
Figure 19:
Figure 19:
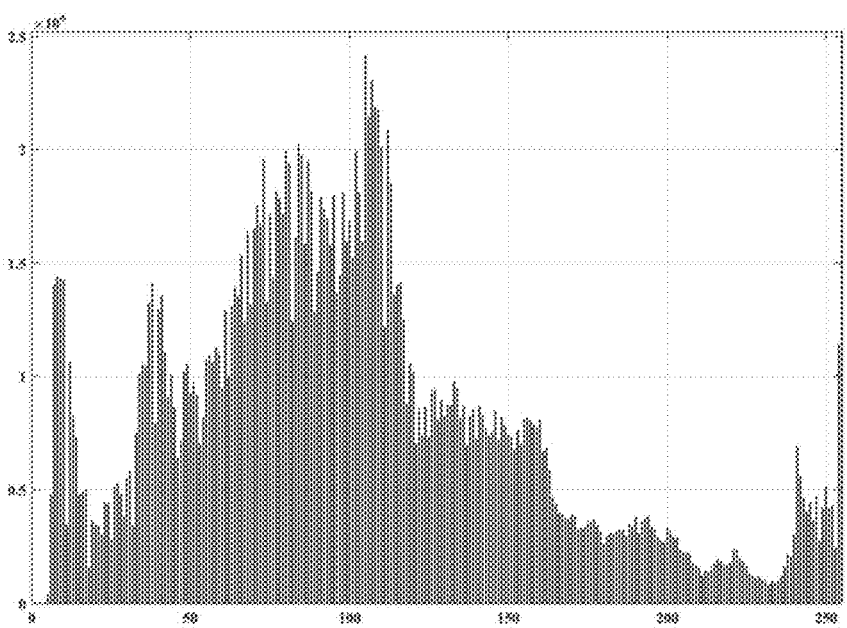
Figure 20:
FIGS. 20-22 show representative images and their corresponding histograms when the platform is moving and the user is not interacting with the portable device according to an embodiment.
Figure 20:
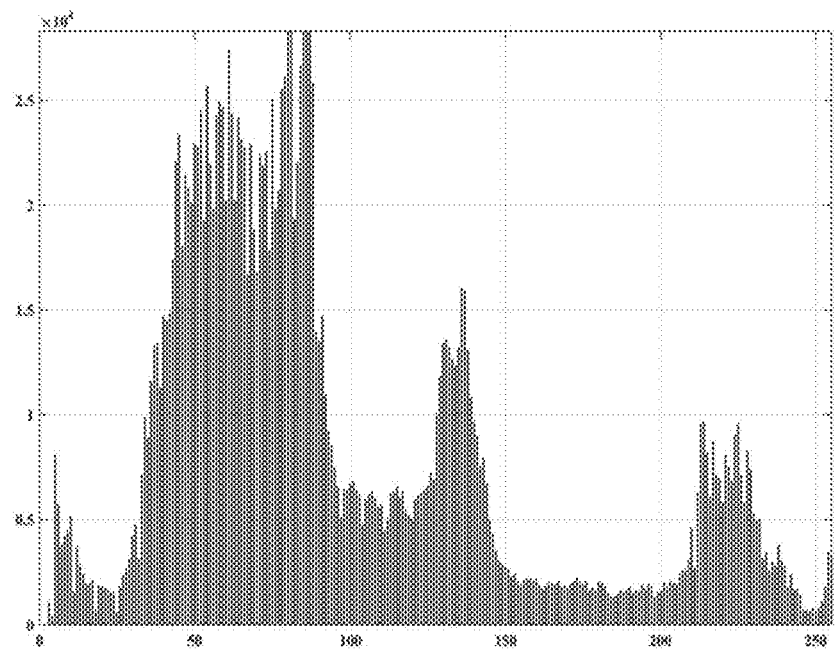
Figure 21:
Figure 21:
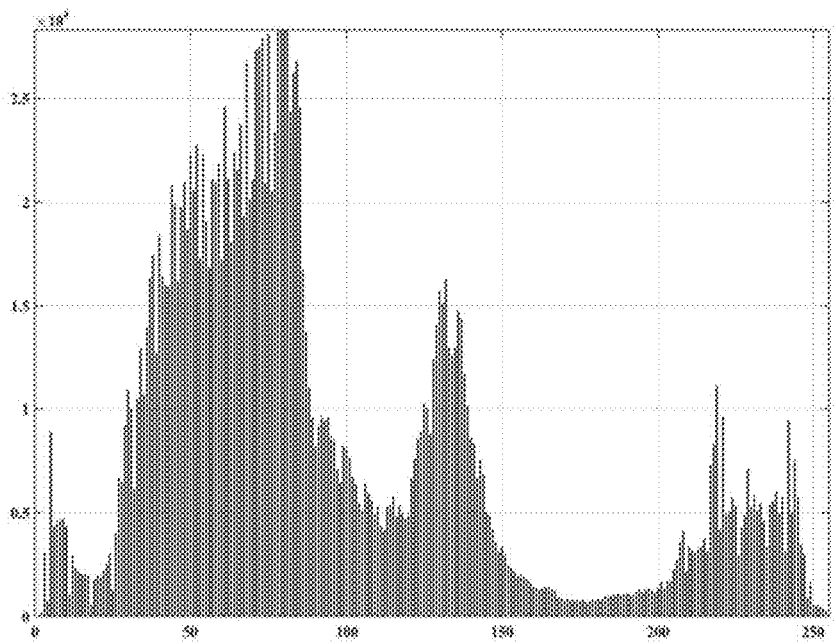
Figure 22:
Figure 22:
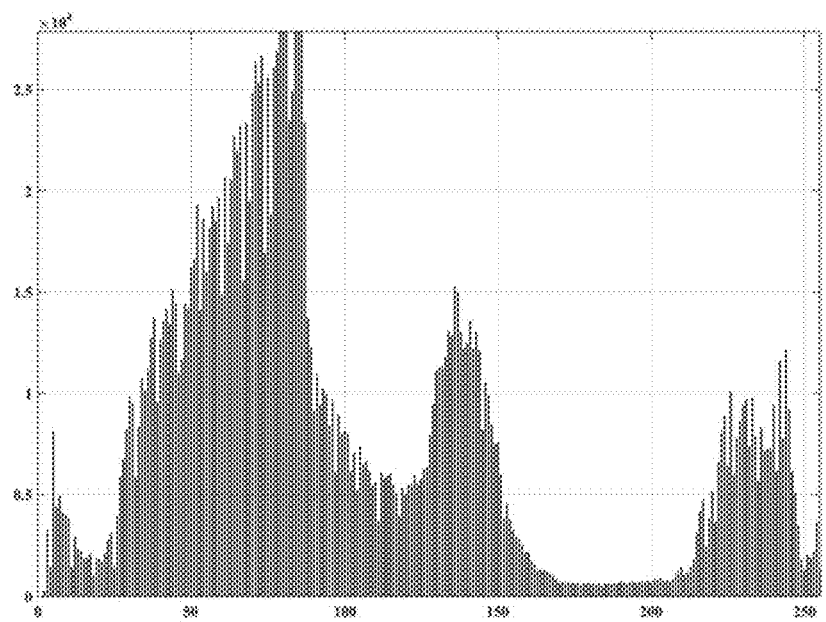
Figure 23:
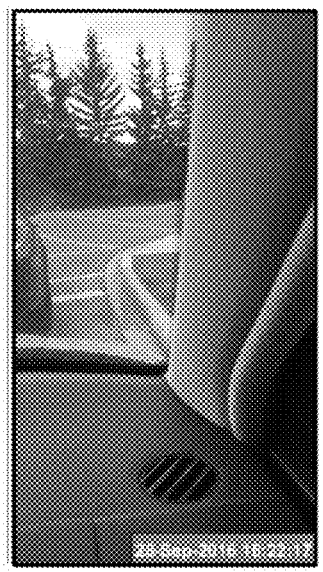
FIGS. 23 and 24 show representative images and their corresponding histograms when the user is interacting with the portable device according to an embodiment.
Figure 23:
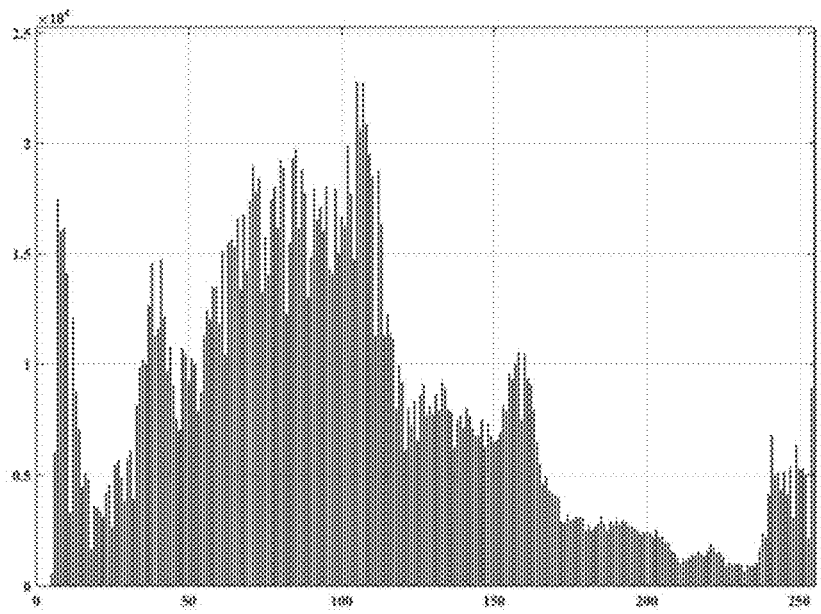
Figure 24:
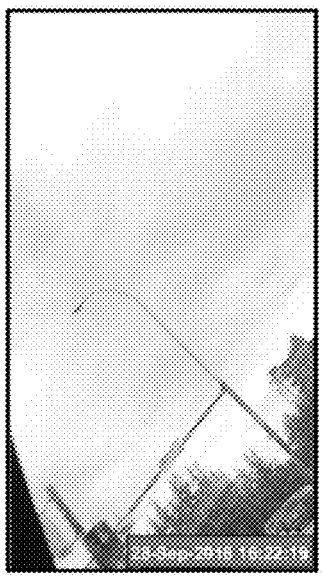
Figure 24:
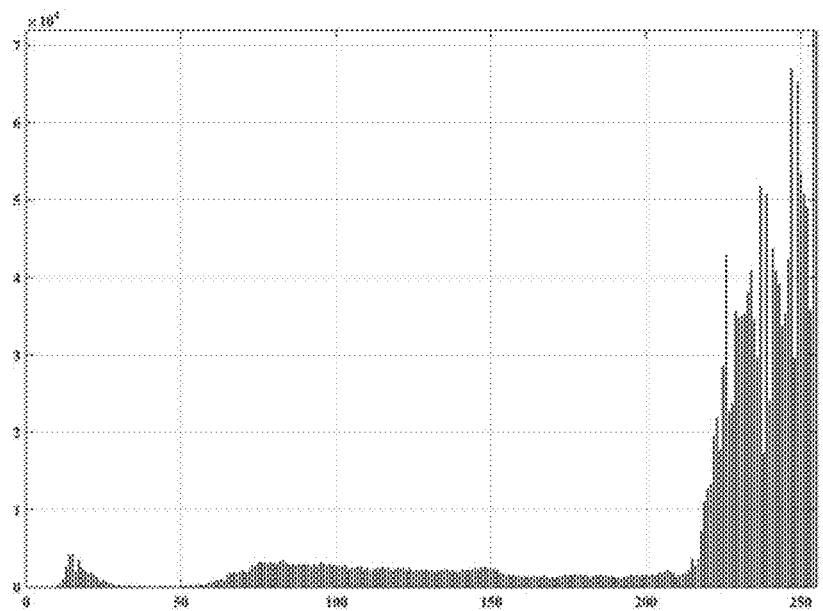

Representative tests were conducted to help illustrate these concepts. In one scenario, FIGS. 18 and 19 show sequential samples and their corresponding histograms captured when the vehicle was stationary in traffic and the user was not interacting with the device. As may be seen, the difference is relatively minor. A further illustration is given by FIGS. 20-22, which show sequential samples and their corresponding histograms captured when the vehicle was performing a turning maneuver and the user was not interacting with the device. Here, even though the outside scene changes as the vehicle performs the turn and the surrounding traffic is altered, the bordering portions of the images remain the same, again resulting in similar histograms. Conversely, FIGS. 23 and 24 show sequential samples and their corresponding histograms captured when the user was interacting with the device, causing motion dynamics of the portable device that are independent of the platform motion dynamics. As may be seen, the relative differences in the histograms are greater than in the scenarios when the user was not interacting with the device. The corresponding time stamps in the above figures reflect time periods of one or two second or a combination were used. As above, other time periods may be used as desired. Notably, different time periods may be employed by changing the sample rate but in other embodiments, one or more intermediate samples may be discarded before comparing consecutive frames or sequential samples.

Yet another frame related parameter that may be used when identifying independent motion dynamics of portable device 200 is a suitable measure of frame entropy. Particularly, entropy of grayscale image may be considered a statistical measure of randomness that used to characterize the texture of the image. One suitable expression of entropy is represented by Equation (11), M is the number of grayscale levels and $p_k$ is the probability associated with grayscale level k:

$$E = -\Sigma_{k=0}^{M-1} p_k \log_2(p_k) \qquad (11)$$

Figure 25:
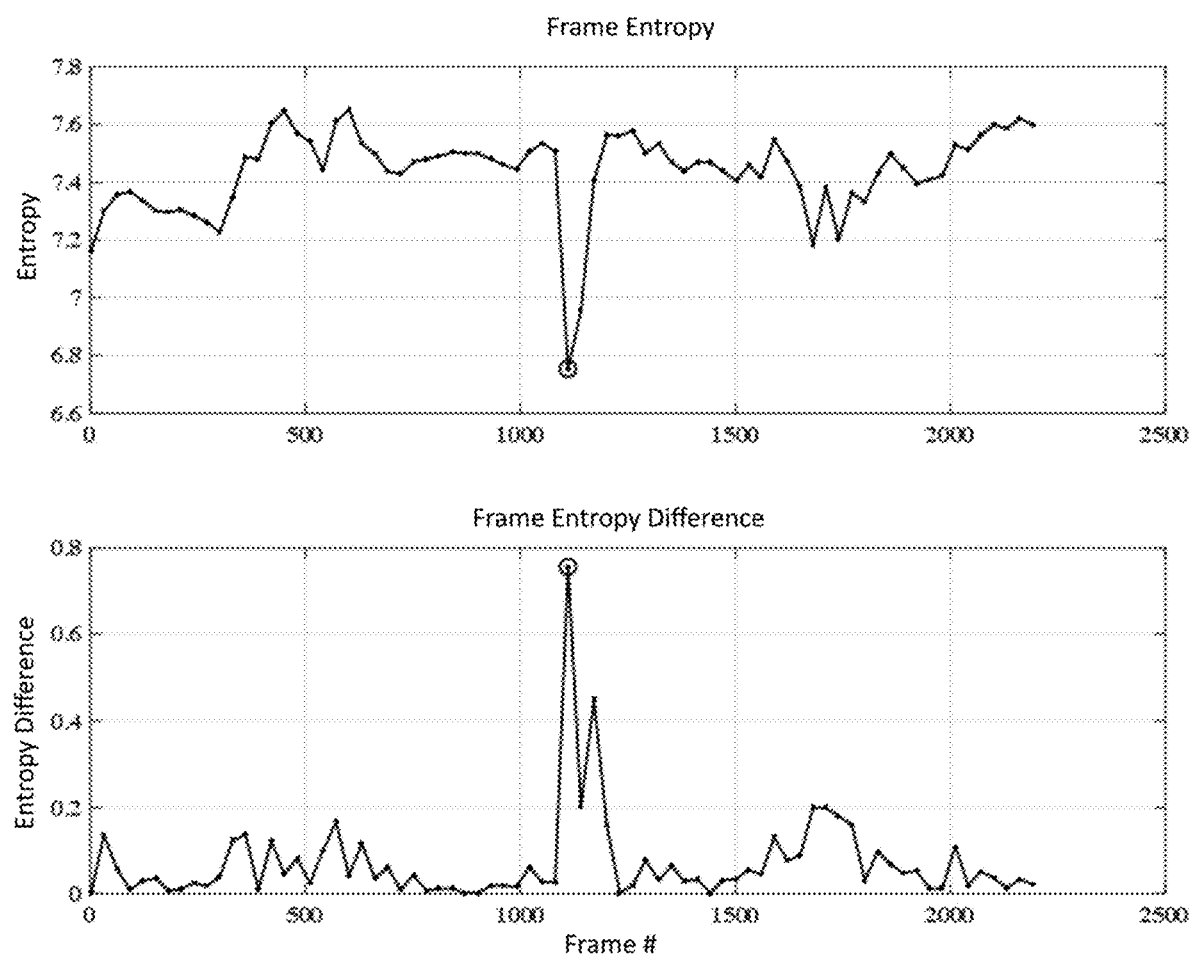
FIG. 25 is a graphical representation of frame entropy and frame entropy difference for a sequence of image sensor samples according to an embodiment.
Figure 26:
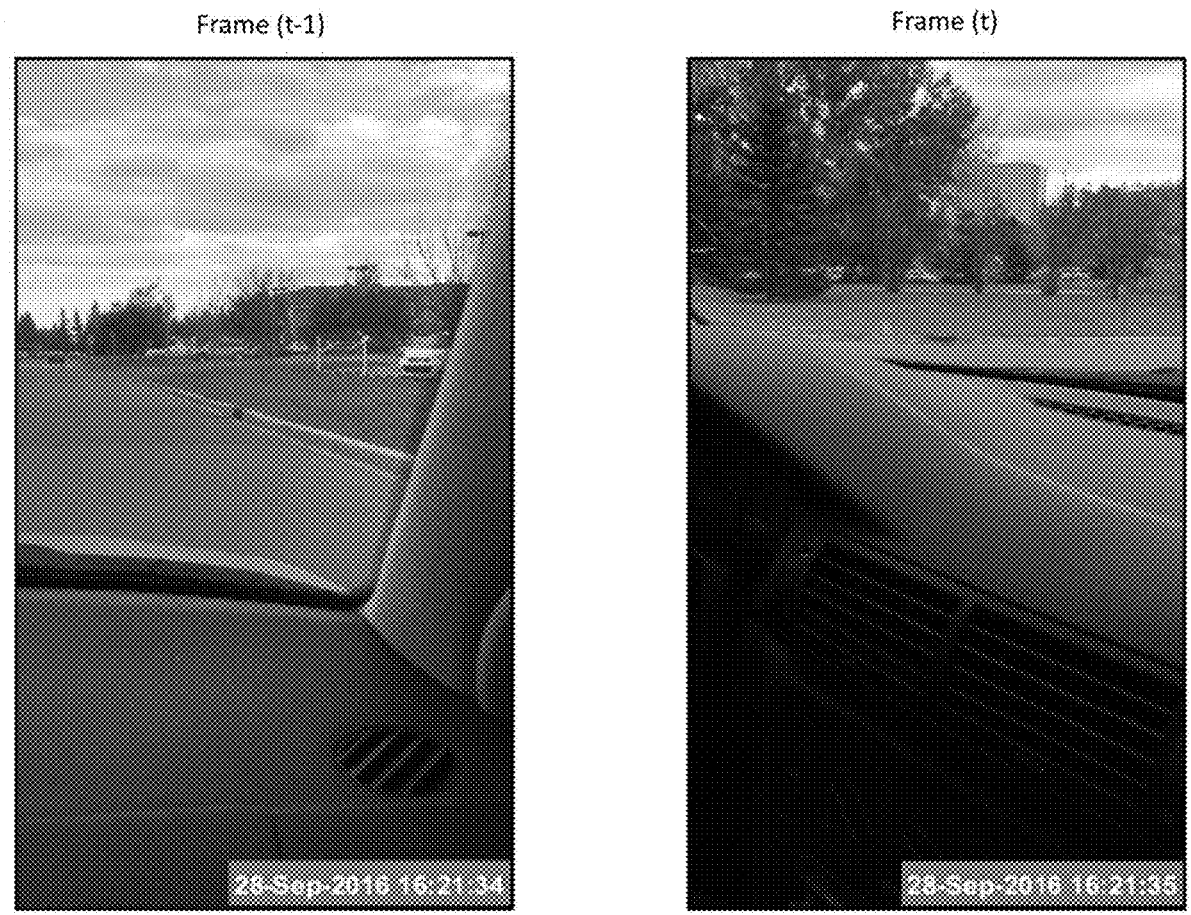
FIG. 26 depicts frames of the sequence of image sensor samples of FIG. 25 corresponding to a relatively high frame entropy difference.

Representative tests were conducted to help illustrate the use of entropy in identifying motion dynamics of the device that are independent of the platform. Captured samples were assessed using Equation (11) and the results are graphically depicted in FIG. 25, with the top plot showing the calculated entropy values and the bottom plot showing the difference in entropy between consecutive frames. This information indicates that consecutive frames with similar contents have relatively small entropy difference values, but if the consecutive frames have a relatively large change in contents as may occur when portable device 200 is moved due to user interaction, higher values of the entropy difference may result. A peak, such as the circled data, is therefore indicative of independent device movement with the corresponding images depicted in FIG. 26. As will be appreciated, the device has undergone a change in orientation that results in an image in which the contents have been significantly changed throughout the image.

Figure 27:
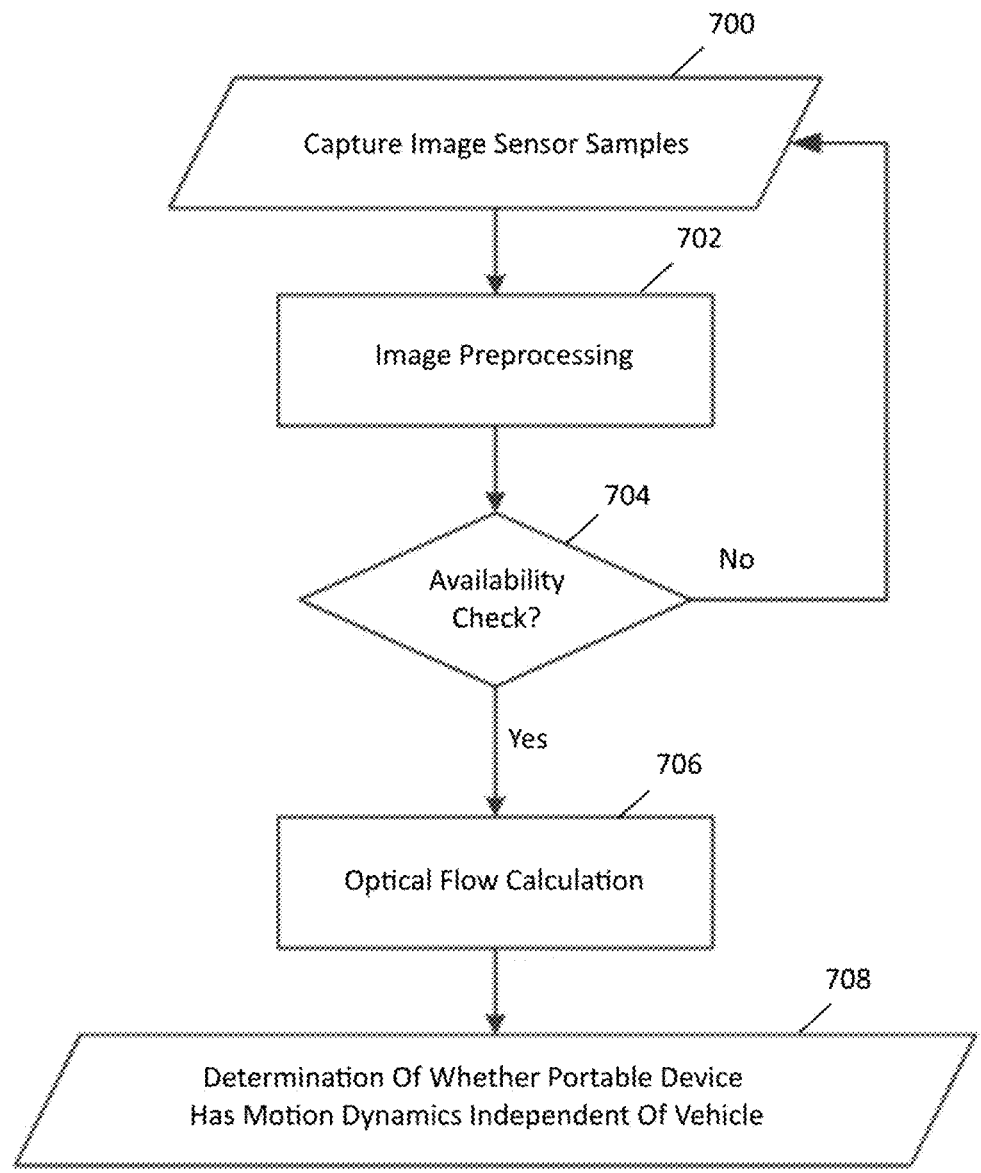
FIG. 27 is a flowchart showing a routine for using image sensor data in an optical flow analysis for characterizing platform motion according to an embodiment.

In addition, or as an alternative, to the use of frame related parameters, image sensor data may be subjected to an optical flow analysis when identifying independent motion dynamics for portable device 200. One representative routine is indicated by the flowchart shown in FIG. 27. Beginning with 700, samples may be obtained from image sensor 222. In 702, one or more preprocessing operations may be used to facilitate the optical flow analysis. For example, the image size may be reduced, colored images may be converted to grayscale, smoothing techniques may be employed to remove high spatial frequency noise, histogram equalization may be performed to mitigate changes in luminosity between frames and/or other suitable operations may be employed. The availability of one or more objects or features as detected by image sensor 222 may be assessed in 704. If the images are sufficiently feature-rich, the routine continues to 706 but otherwise returns to 700 to await the capture of samples having sufficient feature availability. An optical flow calculation may be performed in 706 to determine the amount of translation undergone between pairs of consecutively captured images. The calculated optical flow information may then be used to provide a decision if the device movement is due to a vehicle motion or a user movement in 708. Further details regarding these aspects are discussed below.

With respect to 702, it may be desirable to increase processing speed by reducing the pixel resolution of the captured samples by a suitable factor. For example, an approximately 90% reduction in image size may still permit accurate identification of independent motion dynamics while significantly decreasing the processing load. Other image size reductions may be employed, such as approximately 50% or more. Further, image sensor 222 may output images captured in 24-bit (3-channel RGB color) which may then be converted to 8-bit (single-channel grayscale), such as by the following process. Two color sequential samples may be denoted $I_k(x,y)$ and $I_{k-1}(x,y)$ of pixel size $N_x$ by $N_y$ within a given sequence where x and y represent the spatial coordinates and k represents the temporal coordinate of the frame. The value at every (x,y) location in $I_k$ and is a triplet whose individual elements indicate the 8-bit integer (0-255) intensity value of each of the red, green, and blue (RGB) color channels in the form (r, g, b). The grayscale conversion may be simplified by representing each image by three $N_x \times N_y \times 1$ arrays. Correspondingly, each array holds the 8-bit intensity value for one the three RGB color channels. As a result, the three-channel color image $I_k(x,y)$ may be decomposed into single-channel (i.e. single-color) arrays $r_k(x,y)$, $g_k(x,y)$ and $b_k(x,y)$.

The single-channel grayscale images obtained from the split-channel color images r(x,y), g(x,y), and b(x,y) may be denoted $G_k(x,y)$ and $G_{k-1}(x,y)$ as per the Rec. 601 formula used in the NTSC and PAL television standards according to Equation (12):

$$G_k(x,y)=0.299r_k(x,y)+0.587g_k(x,y)+0.114b_k(x,y) \quad (12)$$

Optionally, the grayscale images $G_k(x,y)$ and $G_{k-1}(x,y)$ may be subjected to further preprocessing to remove noise, enhance contrast, and the like. Examples of suitable operations that may be performed include histogram equalization and smoothing as known to those of skill in the art.

Histogram equalization may be applied to increase image contrast. As optical flow aims to measure the translation undergone by regions of brightness in the image, having a greater distinction between these regions serves to improve the flow calculation. The process begins with the creation of the image histogram as described above. The equalization routine then creates a new image with a "stretched" version of the histogram so as to span the full intensity range (0-255) rather than being clustered tightly around a somewhat central value. More intuitively, this serves to convert a predominantly grey image to one that spans the entire grayscale palette from black to white.

A given image can be represented as a $m_r$ by $m_c$ matrix of integer pixel intensities ranging from 0 to L-1, with L representing the number of possible intensity values, often 256. A normalized histogram p of the captured sample may be calculated according to Equation (13):

$$p_n = \frac{\text{number of pixels with intensity } n}{\text{total number of pixels}} \quad (13)$$
$$n = 0, 1, \ldots, L-1$$

Correspondingly, the histogram equalized image g may be defined as indicated in Equation (14), wherein the floor function rounds the number down to the nearest integer:

$$g_{i,j}=\text{floor}((L-1)\Sigma_{n=0}^{f_{i,j}}p_n) \quad (14)$$

This may be considered the equivalent of transforming the pixel intensities, k, of the image according to Equation (15):

$$T(k)=\text{floor}((L-1)\Sigma_{n=0}^{k}p_n) \quad (15)$$

It will be appreciated that a consequence of increasing contrast via histogram equalization is that noise may be increased as well, effectively lowering the signal to noise ratio in the image. This noise is generally of a high spatial frequency and may be removed by suitable low-pass filtering or smoothing the image. In one embodiment, image smoothing may be performed using two-dimensional convolution. Convolution is an operation on two functions $f$ and g, which produces a third function that can be interpreted as a modified ("filtered") version of $f$. In the case of image smoothing, function $f$ denotes the image and function g denotes the "smoothing kernel." The result of the convolution is a smoothed copy of the image $f$. Formally, for functions $f(x)$ and $g(x)$ of a continuous variable x, convolution may be defined as in Equation (16), where * represents the convolution:

$$f(x)*g(x)=\int_{-\infty}^{\infty}f(\tau)g(x-\tau)d\tau \quad (16)$$

This may also be defined as Equation (17) for a discrete variable x:

$$f[x]*g[x]=\Sigma_{k=-\infty}^{\infty}f[k]g[x-k] \quad (17)$$

In turn, these equations may be expressed as Equations (18) and (19), respectively, for functions of two variables x and y (e.g. images):

$$f(x)*g(x)=\int_{-\infty}^{\infty}\int_{-\infty}^{\infty}f(\tau_1,\tau_2)d\tau_1 g(x-\tau_1,y-\tau_2)d\tau_2 \quad (18)$$

$$f[x,y]*g[x,y]=\Sigma_{k_1=-\infty}^{\infty}\Sigma_{k_2=-\infty}^{\infty}f[k_1,k_2]g[x-k_1,y-k_2] \quad (19)$$

Different types of smoothing schemes exist (homogenous, Gaussian, median, bilateral, etc.) where each may be suited for noise of a particular distribution. In the case of homogenous smoothing, averaging the two neighboring pixels in each direction may be performed using the 5×5 convolution kernel K as indicated in Equation (20):

$$K = \frac{1}{25}\begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix} \quad (20)$$

Assuming that the image noise may exhibit a Gaussian distribution and Gaussian smoothing may be applied, the appropriate kernel to be used may be found using the 2D Gaussian function represented by Equation (21), where x and y are the distances from the origin in the horizontal and vertical axes, respectively, and σ is the standard deviation of the Gaussian distribution:

$$G(x, y) = \frac{1}{2\pi\sigma^2}e^{-\frac{x^2+y^2}{2\sigma^2}} \quad (21)$$

By using the Gaussian function to build a 5×5 smoothing kernel with σ=1, Equation (22) may be generated, such that the smoothed image is given by the convolution of the grayscale image with the smoothing kernel:

$$K = \frac{1}{273}\begin{bmatrix} 1 & 4 & 7 & 4 & 1 \\ 4 & 16 & 26 & 16 & 4 \\ 7 & 26 & 41 & 26 & 7 \\ 4 & 16 & 26 & 16 & 4 \\ 1 & 4 & 7 & 4 & 1 \end{bmatrix} \quad (22)$$

Next, with regard to 604, availability may be considered a measure of the homogeneity of an image (i.e. a measure of how feature-rich an image is) and is based on the derivative, or gradient, of the image. It is desirable to ensure that the captured images have sufficient features to be used for subsequent operations performed by motion characterization module 220. The first spatial derivative of an image may be obtained by convolving the image with a filter such as the Sobel filter and aggregating the result across the image. For example, a Sobel filter operation employs two 3×3 kernels which are convolved with the original image to calculate approximations of the horizontal and vertical derivatives. By denoting f as the source image, the horizontal and vertical approximations $G_x$ and $G_y$ are given in Equation (23), wherein '*' denotes a 2-dimensional convolution operation corresponding to image smoothing as discussed above:

$$G_x = \begin{bmatrix} -1 & 0 & 1 \\ -2 & 0 & 2 \\ -1 & 0 & 1 \end{bmatrix} * f, \; G_y = \begin{bmatrix} -1 & 2 & 1 \\ 0 & 0 & 0 \\ -1 & 2 & 1 \end{bmatrix} * f \quad (23)$$

The resulting gradient approximations in each direction can be combined to give the overall gradient magnitude G according to Equation (24):

$$G = \sqrt{G_x^2 + G_y^2} \quad (24)$$

In turn, the gradient magnitudes may be aggregated as D across the entire image, as indicated by Equation (25):

$$D = \Sigma_{j=0}^{N_y-1} \Sigma_{i=0}^{N_x-1} G[i,j] \quad (25)$$

Normalizing the aggregated derivative value D by dividing by the maximum intensity change between pixels (i.e. 0-255) in the entire image yields $D_{norm}$ according to Equation (26):

$$D_{norm} = \frac{D}{(N_x * N_y) * 255} \quad (26)$$

As will be appreciated, a small normalized aggregated derivative value, $D_{norm}$, implies high homogeneity and a lack of features that can be used for the subsequent processing operations while a high derivative value implies greater variation with the image. For example, large intensity fluctuations are indicative of objects being within the field of view. In one aspect, the presence of multiple objects allows for a more reliable optical flow analysis and correspondingly, a more accurate identification of independent motion dynamics of portable device 200.

Turning now to 608, the (optionally) smoothed grayscale images may be supplied as arguments to a suitable optical flow calculation routine, along with along with other algorithm-specific parameters including decomposition scale, number of levels, iterations, and the like. A flow map F may result from the optical flow calculation based on the brightness constancy constraint by assuming that changes in pixel intensities are only due to small translational motions in the time interval between images. In one aspect, brightness constancy is the assumption that a pixel at location (x, y, t) with intensity I(x, y, t) will have moved by Δx and Δy in the time interval between images Δt as given by Equation (27):

$$I(x,y,t) = I(x+\Delta x, y+\Delta y, t+\Delta t) \quad (27)$$

When the translational movement is relatively small, the brightness constancy equation may be expanded using a Taylor series, as given by the first-order approximation represented by Equation (28):

$$I(x+\Delta x, y+\Delta y, t+\Delta t) = I(x, y, t) + \frac{\partial I}{\partial x}\Delta x + \frac{\partial I}{\partial y}\Delta y + \frac{\partial I}{\partial t}\Delta t \quad (28)$$

Correspondingly, Equation (30) follows from Equation (29):

$$\frac{\partial I}{\partial x}\Delta x + \frac{\partial I}{\partial y}\Delta y + \frac{\partial I}{\partial t}\Delta t = 0 \quad (30)$$

Further, dividing each term by the time interval Δt leads to Equation (31):

$$\frac{\partial I}{\partial x}\frac{\Delta x}{\Delta t} + \frac{\partial I}{\partial y}\frac{\Delta y}{\Delta t} + \frac{\partial I}{\partial t}\frac{\Delta t}{\Delta t} = 0 \quad (31)$$

Equation (31) then results in Equation (32), where $u_x$ and $u_y$ are the x and y components of the velocity and referred to as the optical flow, $$\frac{\partial I}{\partial x} \text{ and } \frac{\partial I}{\partial y}$$

are the spatial derivatives of the image intensities and $$\frac{\partial I}{\partial t}$$

is the temporal derivative:

$$\frac{\partial I}{\partial x}u_x + \frac{\partial I}{\partial y}u_y + \frac{\partial I}{\partial t} = 0 \quad (32)$$

Since this is an equation in two unknowns, it may not be solved readily without another set of equations, a condition known as the "aperture problem." In one embodiment, a tensor-based Farnebeck method using polynomial expansion may be employed to approximate the neighborhood of each pixel in each frame using second-degree polynomials and in turn estimate displacement from a knowledge of how these polynomials change under translation. For example, polynomial expansion is to approximate the area surrounding each pixel with a quadratic polynomial $f_1$ as denoted in Equation (33), where A is a symmetric matrix, b a vector and c a scalar:

$$f_1(x) = x^T A_1 x + b_1^T x + c_1 \tag{33}$$

The three coefficients may be estimated from a weighted least squares fit to the intensity values in a defined area. The weighting has two components called certainty and applicability that determine which regions of the image are involved in the calculation and the size of the structures that will be represented by the expansion coefficients, respectively. Since the premise of polynomial expansion is to approximate areas surrounding the pixels by a polynomial, letting $f_1$ undergo an ideal global displacement d results in a calculation for $f_2$ as indicated by Equation (34):

$$\begin{aligned}f_2(x) &= f_1(x-d) \\ &= (x-d)^T A_1(x-d) + b_1^T(x-d) + c_1 \\ &= x^T A_1 x + (b_1 - 2A_1 d)^T x + d^T A_1 d - b_1^T d + c_1 \\ &= x^T A_2 x + b_2^T x + c_1\end{aligned} \tag{34}$$

By equating the coefficients of $f_1$ and $f_2$, such that $A_2 = A_1$, $b_2 = b_1 - 2A_1 d$ and $c_2 = d^T A_1 d - b_1^T d + c_1$, Equation (34) may be rearranged for $b_2$ and solved for the translation d as indicated by Equation (35):

$$d = -\tfrac{1}{2} A_1^{-1}(b_2 - b_1) \tag{35}$$

Accordingly, the output of the optical flow routine is the flow map $F_k(x, y)$ where each element is a tuple indicating an estimate of the translational motion (dx, dy) undergone by the intensity value at location (x, y) between images $G_k$ and $G_{k-1}$. The dual-channel flow map F may be split into two single-channel matrices $dx_k(x, y)$ and $dy_k(x, y)$. All x- and y-components of the flow map elements may then be summed to provide the aggregate translation, $dx_{agg,k}$ and $dy_{agg,k}$, between images $G_k$ and $G_{k-1}$, respectively given by Equations (36) and (37):

$$dx_{agg,k} = \Sigma_{j=0}^{N_y - 1} \Sigma_{i=0}^{N_x - 1} dx_{agg,k}[i,j] \tag{36}$$

$$dy_{agg,k} = \Sigma_{j=0}^{N_y - 1} \Sigma_{i=0}^{N_x - 1} dy_{agg,k}[i,j] \tag{37}$$

Yet another technique for employing image sensor data when identifying independent motion dynamics for portable device 200 may be based on region matching using area correlation differentiate the movement of the device that is separate from movement of the platform. Different regions may be classified based on their statistical similarity in each sequential sample. For each region in two consecutive frames, an area correlation function may be calculated. This area correlation energy function may be used to detect the similarity among the regions. A weighted sum of the correlation function in all the mismatched regions and their location may be used to classify movements of the image sensor into different types such as pan, tilt, zoom, etc., which indicate motion that is independent of the platform. This method has been tested on different sequences of image samples and found effective. Alternatively, such region matching strategies may be used as a pre-classifier used in addition to other identification techniques of this disclosure to reduce false detections.

Image sensor data may also be used when identifying independent motion dynamics for portable device 200 may be comparing the contents of sequential samples. Edge Change Rate (ECR) refers to a technique used to detect and distinguish between hard and soft cuts in consecutive frames. ECR attempts to compare the actual content of two frames by transforming the images to edge pictures. An edge picture extracts the probable outlines of objects within the picture, and then compares these edge pictures using dilation to compute a probability that the second frame contains the same objects as the first frame. Similarities and differences between images may be assessed in a similar manner to the other techniques discussed above.

Image sensor data may also be subjected to statistical analysis when identifying independent motion dynamics for portable device 200. For example, such techniques may be used to detect the abrupt and gradual transitions in a video frames. Different statistical metrics may be applied to sequential samples and their response to a scene change recorded. Suitable metrics include inner product, template matching, and chi-square.

In another aspect, a frequency domain analysis may be applied to the image sensor data when identifying independent motion dynamics for portable device 200 by decomposing the images into discrete frequency bins. For example, a Fourier transform of an image may represent how the image changes, in that the change may be gradual, sharp, or not present. The transformation converts the image into a domain where the image can be represented completely on discrete components. Any change in the frequency is a characteristic of change in the image spatial distribution or image geometry. Features such as edges reflect high frequency components while smooth regions have low frequency components. The different features of an image that might be extracted from the frequency domain could help in the distinguish between the source of the device movement and separate motion dynamics of the platform from motion dynamics of portable device 200.

A multi-resolution analysis employing wavelet represents another suitable technique for identifying independent motion dynamics for portable device 200 using image sensor data. Each frame may be represented in the feature space obtained by considering color, shape, or texture where the wavelet technique is applied to the sequential image samples in this representation space. The wavelet multi-resolutions analysis correspondingly may be used to detect scene changes. The correlation among adjacent frames may be described by statistical features related by the wavelet coefficients. For example, the magnitudes of high-frequency coefficients and the difference of magnitudes for low-frequency coefficients may be used to detect the movement of the device that is independent of the platform.

As noted with regard to FIG. 12, multiple portable devices may be associated with the user and each may have one or more image sensors that may provide useful information when identifying independent motion dynamics for one of the devices, such as auxiliary portable device 230 in conjunction with portable device 200. Pursuant to the discussion above, image sensor samples from different devices may be synchronized using a reference time tag such as GPS-Time tag. The synchronized samples may then be compared to measure rates of change in their image content. It may be expected that if a user interacts with one of the devices causing movement, then the change rate of the frame contents will be different than the rate in the device with which the user is not interacting. Consequently, the change in the device motion dynamics may be recognized as being due to user interaction or platform movement by checking the synchronized frames from the different devices cameras. When all devices have the same change rate at the same time, motion experienced by the devices may be expected to be due to vehicle motion as opposed to a situation in which different change rates are detected, which may indicate user interaction as discussed above.

As discussed above, portable device 200 may have additional sensors, such as external sensor 214, auxiliary sensor 216 or others that may be used to obtain supplemental sensor data. In some embodiments, one or more of these sensors may be an ambient light or optical proximity sensor. For example, smartphones and similar devices are now commonly provided with sensors having this functionality. Ambient light and proximity sensors may be used to detect changes in the surrounding area close to the device. Proximity sensors are used to detect nearby objects and conventionally are used to determine when a device is held close to the user's face, but generally detects all objects within range and boundary. On the other hand, a light sensor may detect and be used to adjust screen brightness or other device parameters. When a user is not interacting with portable device 200, it may be expected that relatively few or no changes may occur in such sensors, but user interactions with the device may be expected to result in more changes in the sensor signal. Correspondingly, such differentiation may be used alone when identifying independent motion dynamics or may be used to confirm or reject such a determination made using one or more other techniques.

Following identification of device motion dynamics that are independent of platform motion dynamics, such as represented by 104 of FIG. 1, it may be desirable to separate the motion sensor data corresponding to motion of the platform and motion sensor data corresponding to the identified independent motion of the portable device from the obtained motion sensor data. When no independent dynamics are identified, all motion measured by the motion sensor may be expected to correspond to motion of the platform. However, the existence of independent device motion dynamics indicates that some portion of the motion sensor data reflects motion of the platform, while the remainder is due to user interaction. As such, any suitable technique may be used to determine the change in the device orientation and other dynamics and thereby separate them from the vehicle dynamics as indicated by 110 in FIG. 1. Different approaches may be used to achieve the separation, including time domain based and frequency domain based techniques. As an illustration, wavelet analysis is representative of time domain based methods while fast Fourier transformation is representative of frequency domain based methods. Further, the following materials describe how motion sensor data, image sensor data or a combination of both may be used when segregating vehicle motion from independent device motion.

When employing motion sensor data to distinguish between motion sensor data corresponding to motion of the platform and motion sensor data corresponding to the identified independent motion of the portable device, one or more methods for separating the motion dynamics may be applied to extract the different dynamics parameters for the vehicle and the device. By providing information about the platform motion dynamics, device motion dynamics, as well as other parameters and features, the motion sensor data may be separated. In one aspect, a transition between whether identified independent motion exists may be used to compare states when the only motion corresponds to motion of the platform and when the motion corresponds both to platform motion and independent device motion. Particularly, a period when there is no independent device motion may be used as a reference to help distinguish independent device motion during other periods. For example, any suitable platform parameters may be characterized when there is no independent device motion.

Figure 28:
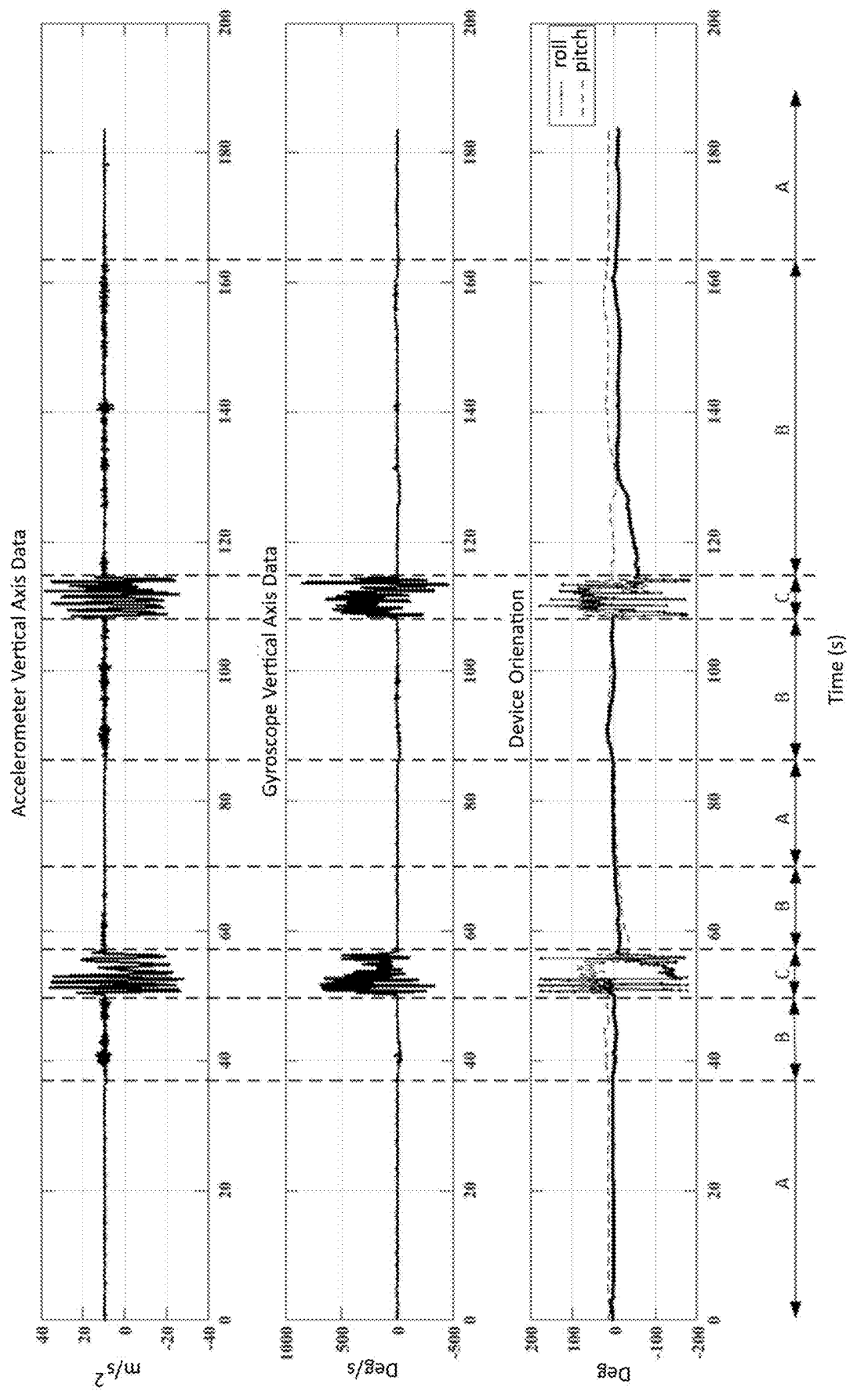
FIG. 28 is a graphical representation of motion sensor data including periods when the vehicle and portable device were not moving, when the portable device was not experiencing independent motion, and when the user was interacting with the device and causing movement independent of the vehicle according to an embodiment.

To help illustrate these aspects, representative tests were performed to collect motion sensor data during periods when there was no platform or device movement, when there was platform movement but no independent device movement, and when there was platform movement as well as independent device movement. The results are graphically represented in FIG. 28, the top graph showing vertical accelerometer measurements, the middle graph showing vertical gyroscope measurements, and the bottom graph showing device orientation, as expressed by roll and pitch, all plotted against the same time axis. As indicated, different zones may be identified corresponding to the combinations of device and platform movement, with Zone A representing that both the vehicle and the device were not moving, Zone B representing that the vehicle was moving, while the device was in a tethered condition and therefore not exhibiting independent motion, and Zone C representing that in addition to movement of the vehicle, the user was interacting with the device and causing movement independent of the vehicle.

As desired, the separation process may be performed on the raw input data, the leveled data, or estimated component values. Performing the separation process on the raw data or on leveled data such as accelerometer and gyroscope data will provide separate data for the vehicle and the device. The vehicle data, whether it is raw or leveled, may be used to calculate the navigation components to evaluate the operator's performance. On the other hand, performing the separation process on a derived navigation component, including values such as heading or velocity, may be used to provide separate components for both vehicle and device. Some separation methods can output all the values for each source of motion while some may output part of the values for each source of motion. Exemplary techniques for separating the different dynamics of the vehicle and the device are described below, with some common symbols and terminology. Notably, the p subscript denotes a quantity corresponding to the platform and the d subscript denotes a quantity corresponding to portable device 200, with $\vec{a}=[a_x\ a_y\ a_z]^T$ representing the total accelerometer readings and being equal to the sum of $\vec{a}_p=[a_{p_x} a_{p_y} a_{p_z}]^T$, the portion corresponding to platform motion and $\vec{a}_d$, the portion corresponding to independent device motion, and with $\vec{\omega}=[\omega_x\ \omega_y\ \omega_z]^T$ representing the total gyroscope readings and being equal to the sum of $\vec{\omega}_p=[\omega_{p_x}\ \omega_{p_y}\ \omega_{p_z}]^T$, the portion corresponding to platform motion, and $\vec{\omega}_d$, the portion corresponding to independent device motion.

In one aspect, a wavelet algorithm may be used to separate between the user dynamics and the vehicle dynamics. Wavelet Transform (WT) analyses the signal at different frequencies with different resolutions. WT may be applied to extract the time-frequency information from the provided signal. WT is a linear transformation that separates data into different frequency components, and then studies each component with a resolution matched to its scale. The Discrete Wavelet Transform (DWT) is used as signal measurements and processing may be done in discrete-time. DWT of a signal, u[n], may be expressed mathematically as Equation (38), wherein ψ is the chosen wavelet function, u is the signal, which may be the linear acceleration or angular rotation along any of the 3 orthogonal axes, ($a_x$, $a_y$, $a_z$) or ($\omega_x$, $\omega_y$, $\omega_z$), L is the dilation index, and $2^L$ is the scale, and n is the epoch number:

$$DWT(u)_{\psi,L}[n] = \frac{1}{\sqrt{2^L}} \sum_k u[k]\psi(2^{-L}k - n) \tag{38}$$

Smaller values of dilation index L, allow analysis of rapidly changing details while larger values of L allow analysis of slowly changing features. Therefore, the vehicle component of a signal may be extracted by choosing a relatively large dilation index, or summing over several relatively large dilation indices. The device component may be extracted from the total signal by choosing a relatively small dilation index, or summing over several relatively small dilation indices. The different approaches are represented by Equations (39) and (40), respectively, where $A_0$, $A_1$, $A_2$, and $A_3$ are scale factor values chosen such that $A_0 \leq A_1 < A_2 \leq A_3$:

$$u_p[n] = \sum_{L=A_2}^{L=A_3} \frac{1}{\sqrt{2^L}} \sum_k u[k]\psi(2^{-L}k - n) \tag{39}$$

$$u_d[n] = \sum_{L=A_0}^{L=A_1} \frac{1}{\sqrt{2^L}} \sum_k u[k]\psi(2^{-L}k - n) \tag{40}$$

Further, wavelet packet analysis may also be employed, which is an extension to DWT. Wavelet packet transform (WPT) analysis may be employed in signal recognition and characteristic extraction. Wavelet packet analysis is a successful technique in signal recognition and characteristic extraction. Due to its adaptivity, the WPT is suitable for nonstationary signal analysis and representation. The WPT's decomposition comprises the entire family of the sub-band tree, partitioning the frequency axis not only toward the low frequency but also toward the high frequency. Due to this fact, WPT is a generalization of the structure of the wavelet transform to a full decomposition. The WPT may be considered as an expansion of the DWT whereby the approximation and detail coefficients are decomposed. Thus, WPT can help extracting more valuable features from the signal based on approximations and details at different levels of decomposition.

WPT uses a pair of low pass and high pass filters to split a signal into roughly a low frequency and a high frequency component. In general, wavelet packet decomposition divides the frequency space into various parts and allows better frequency localization of signals. An analysis technique using WPT may help distinguish between the motion dynamics of the device and the motion dynamics of the platform by extracting the various individual signals from a mixture of signals. Correspondingly, extracting the different frequencies may be used when defining the motion dynamics of the device due to user interaction.

Figure 29:
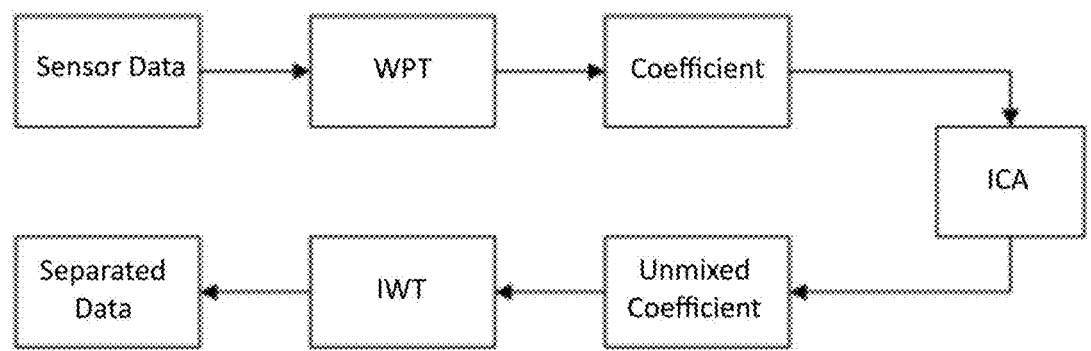
FIG. 29 is a schematic representation of an architecture for performing wavelet packet transform according to an embodiment.

One suitable architecture for implementing a WPT analysis for extracting the vehicle dynamics and the independent device dynamics when a user interacts with portable device 200 in a moving platform is schematically illustrated in FIG. 29. Since the WPT divides the frequency axis not only toward the low frequency but also toward the high frequency, its decomposition comprises the entire family of the sub-band tree. Accordingly, different frequency resolutions may be chosen to match the characteristic of the sensor data. In addition to the WPT analysis, a suitable Independent Component Analysis (ICA) algorithm may be used to help in extracting the different information from the received data. As an example, the WPT analysis may be applied to the data to get the necessary coefficients, while an ICA algorithm may be applied to the coefficients to obtain separated coefficients. Finally, the inverse wavelet transform (IWT) may be applied to obtain an estimate for the different dynamics to separate the motion sensor data into motion sensor data corresponding to motion of the platform and motion sensor data corresponding to the identified independent motion of the portable device.

In another aspect, Blind Source Separation (BSS) techniques allow the separation of a set of mixed signals without the aid of information about the nature of the signals. The available observations are processed in such a way that the different signals are extracted. ICA is a basic technique for BSS and presents a signal processing strategy that aims to state a set of random variables as linear combinations of statistically independent component variables. Interesting information on signals can be revealed by ICA by providing access to its independent components. For example, the ICA based BSS problem retrieves unknown source signals by making a simple assumption of n independent signals denoted as $s(t)=s_1(t) \ldots, s_n(t)$ and observed mixture of signals denoted as $x(t)=x_1(t)\ldots, x_n(t)$, assuming the mixture of signals as linear and instantaneous, Equation (41) may represent the mix, given that A is the unknown mixing matrix and t denotes time instance:

$$x(t)=As(t) \tag{41}$$

It will be appreciated that source signal s(t) and the procedure responsible for transformation of the source signal into mixed signal are both unknown, reflecting reflects the "Blindness" property of the problem. If the mixing matrix A is invertible i.e. number of sources N is less than or equal to the number of sensors P ($N \leq P$) then the source can be separated directly and output y(t) can be expressed as Equation (42), where B is a separating matrix or inverse of mixing matrix A such that $B=A^{-1}$:

$$y(t)=Bx(t)=BAs(t) \tag{42}$$

Many BSS techniques are based on statistical measures, such as variance in Principle Component Analysis (PCA) and a measure of non-Gaussian characteristics in ICA. PCA utilizes the variance to separate independent Gaussian sources along orthogonal axes, whereas ICA uses higher-order statistics to separate non-Gaussian independent sources.

When portable device 200 is present in a moving vehicle, the source signal is acceleration or angular rotation of either the vehicle or the device, while the mixture signal is a measurement from one of the signals (gyroscope, accelerometer, barometer, or magnetometer). There is only one sensor measuring each quantity directly, but at the same time there are two signal sources for each quantity (device and vehicle). Therefore, the BSS technique may be used to provide measurement quantities which can be measured directly by one sensor and indirectly by another sensor, or indirectly by two different sensors. Two examples of such quantities are vertical acceleration, $a_z$, and angular rotation around the vertical axis, $\omega_z$. Vertical acceleration can be deduced directly using the levelled vertical accelerometer, $x_1 = a_{up} = R_b^l a_z$, and by double differentiation of the height measured by the barometer, $x_2 = \ddot{h}$, to separate into $s_1 = a_{p_{up}}$ and $s_2 = a_{d_{up}}$. Further, angular rotation around the vertical axis can be deduced directly using the levelled vertical gyroscope, $x_1=\omega_{up}=R_b^l\omega_z$, and indirectly by differentiation of the levelled magnetometer heading, $x_2=R_b^l M_z$, to separate into $s_1=\omega_{p_{up}}$ and $s_2=\omega_{d_{up}}$, where $R_b^l$ is the matrix of rotation from the sensor frame to the local-level frame.

Separating the independent device dynamics from the vehicle dynamics using motion sensor data may also include performing a frequency domain analysis. The frequency domain analysis may include performing a Fast Fourier Transform (FFT). FFT is an algorithm to compute the Discrete Fourier transform (DFT) and the inverse (IDFT), converting time space to frequency space (or wavenumber) and vice versa. The FFT may be applied over a suitable window, including a data length of two seconds at the sensors data rate (X). As such, the $k^{th}$ discrete Fourier transform component with FFT (Y) of N points may be calculated as indicated by Equation (43):

$$Y_k = \sum_{i=1}^{N}\left(X(i)*e^{-\left(\frac{j2\pi(k)(i-1)}{N}\right)}\right) \text{ where } 0 \leq k \leq \frac{N}{2}+1 \quad (43)$$

Correspondingly, frequency domain analysis may be employed to find the different major operating frequencies for the motion sensor data.

Fourier Linear Combiner (FLC) algorithm may be used to model the input signal if the frequency is known. The reference signal is generated by a truncated Fourier series model in which the adaptive filter weights are the Fourier coefficients. Weighted Frequency Fourier Linear Combiner (WFLC) forms a dynamic truncated Fourier series model of the input signal. The created model by the WFLC can adapt to the model frequency as well as the Fourier coefficients. In this case, the fundamental frequency in the Fourier representation may be replaced by a set of adaptive frequency weights. WFLC may be considered an extension to the FLC, in order to adapt to the input signal of unknown frequencies and amplitude. The reference input vector to WFLC, $\vec{x}_k=[x_{1_k} \ldots x_{2M_k}]^T$ may be expressed by Equation (44), where M is the number of harmonics used, $k=1, 2, \ldots$ represents time-index, and T is a sampling period:

$$x_{r_k} = \begin{cases} \sin\left(rT\sum_{t=0}^{k} w_{o_t}\right) & r = 1, 2, \ldots, M \\ \cos\left((r-M)T\sum_{t=0}^{k} w_{o_t}\right) & r = M+1, \ldots, 2M \end{cases} \quad (44)$$

As in FLC, the weight vector may be updated using the Least Mean Square (LMS) algorithm, as expressed in Equations (45) and (46), where $\vec{w}_k^T=[w_{1_k} \ldots w_{2M_k}]^T$ is the coefficient or weight vector of the reference input, the input to algorithm $y_k$ contains the desired periodic or quasi-periodic signal which is to be modelled or estimated, $s_k$ and other undesired components such as noise and low-frequency signals, and $\mu$ is the adaptive gain parameter:

$$\varepsilon_k = y_k - \vec{w}_k^T \cdot \vec{x}_k \quad (45)$$

$$\vec{w}_{k+1} = \vec{w}_k + 2\mu\vec{x}_k\varepsilon_k \quad (46)$$

The frequency, $w_{o_k}$, which may be used in the reference input vector, may be estimated by a modified LMS as indicated by Equation (47), where $\mu_0$ is an adaptive gain parameter:

$$w_{o_{k+1}} = w_{o_k} + 2\lambda_o\varepsilon_k\Sigma_{i=0}^{M} i(w_{i_k}x_{M+i_k} - w_{M+i_k}x_{i_k}) \quad (47)$$

Further, an estimation of the desired periodic or quasi-periodic signal in the input can be calculated using Equation (48):

$$\hat{s}_k = \vec{w}_k^T \cdot \vec{x}_k \quad (48)$$

Notably, a good estimation may be achieved only when magnitudes of other undesired signal components in $y_k$ are not too large as compared to the magnitude of $s_k$.

The WFLC algorithm can estimate desired periodic signals from a mixture of desired periodic signals and undesired signals without altering the phase and magnitude of the desired periodic signal. Therefore, the WFLC algorithm can be used to distinguish the vehicle dynamics from the independent device dynamics. In implementing this technique, $y_k$ can be set to any of the measured quantities of net linear acceleration or angular rotation. Further, $\hat{s}_k$ may be the estimated vehicle component of the measured or deduced quantity. Also, $\varepsilon_k$ may be the estimated device component of the measured or deduced quantity.

In another aspect, angular rotation, $\vec{\omega}$, may be separated into the vehicle component, $\vec{\omega}_p$, and the independent device motion component, $\vec{\omega}_d$, recognizing that this does not separate accelerometer data. The proposed technique works with the assumption that the device is being moved while the vehicle is moving in a straight direction and not making turns. Here, if the radius of rotation is calculated to be less than the threshold as described above, it may be expected that any rotation is due to the user interaction with portable device 200 and that the vehicle rotation component is negligible as indicated by Equation (49), and conversely, if the radius of rotation is greater than the threshold, Equation (50) may be employed to separate the gyroscope data:

$$\vec{\omega}_p = \begin{cases} 0 & \text{if } R \leq R_{Th} \\ \vec{\omega} & \text{else} \end{cases} \quad (49)$$

$$\vec{\omega}_d = \begin{cases} \vec{\omega} & \text{if } R \leq R_{Th} \\ 0 & \text{else} \end{cases} \quad (50)$$

Another example of a suitable technique for separating the motion dynamics to distinguish between motion sensor data corresponding to motion of the platform and motion sensor data corresponding to the identified independent motion of the portable device may employ a source of absolute navigational information, such as from absolute navigational information module 224. For example, the GNSS data from the portable device during a detected driving event may provide navigation components for heading, position, and velocity. The estimated heading component based on the GNSS data refers to the vehicle direction and is considered as the vehicle heading. The provided velocity and position form the GNSS correspond to the vehicle velocity/speed and position. The different navigation components which describe the vehicle dynamics may then be used to evaluate the operator performance.

As will be appreciated, separating the vehicle and independent device dynamics may be performed using any of the above techniques as well as other suitable strategies. When more than one techniques is employed, a combination of the results may be established using a voting procedure. As desired, voting may be employed to choose which technique is more consistent relative to other techniques in providing an accurate separation of the dynamics.

Further, as discussed with reference to FIG. 12, multiple devices having capabilities consistent with portable device 200 may be associated with the user. As such, separation of the vehicle motion dynamics from the independent device motion dynamics may leverage information from any available source of motion sensor data. As noted, a global time reference such as GPS time may be used for synchronizing sensor measurements between devices, by any suitable source of reference time may be used. Once the data is adjusted in time, the relative change in dynamics between the different devices may be estimated. For example, the most fixed device measurements may be used to estimate the reference dynamics. Also, the dynamics of the moving device may be estimated based on its measurements. The difference between the two dynamics may indicate the independent device dynamics which resulted from user interaction.

To help illustrate these aspect, various representative scenarios may apply when two or more synchronized devices are contained within the platform. In one example, at least one device may be measuring motion only due to the vehicle, when that device is fixed to a cradle, in a tight pocket or bag, or other relatively tethered condition while other device(s) may be moving occasionally. In this scenario, the device representing only the vehicle motion may be used as a reference when comparing to a moving device to extract the independent device dynamics. In another example, each device may be moved occasionally, but a period may exist when at least one of them represents only the vehicle motion. Again, detection of which device is experiencing motion only due to the platform may establish the reference which may be used to extract the relevant motion sensor data from the other device(s). As opposed to the first scenario in which one device is never moved independent during collection of the motion sensor data, all devices may experience movement due to user interaction, but at least one period exists when one represents only motion of the platform. In yet another example, one of the devices may be partially constrained by a loose pocket or other container. In this condition, the device may experience some independent movement, but this movement may correspond to vibration or some other repeatable relatively small movement. As such, the pattern of repeated movement may be estimated and eliminated from the signal to obtain a suitable reference for use as described above.

As with motion sensor data, image sensor data may also be used together or alone in the separation of the vehicle motion dynamics from the independent device motion dynamics. Following the above discussion, the sensors of portable device 200 measure the overall dynamics of both device and vehicle. When the device is fixed, the measured dynamics correspond only to the platform movement. However, the measured dynamics include independent device motion dynamics and vehicle motion dynamics if the device is moved within the platform, such as by user interaction. As described in the following materials, image sensor data may be used to separate motion sensor data corresponding to motion of the platform and motion sensor data corresponding to the identified independent motion of the portable device from the obtained motion sensor data.

The materials above describe the use of an optical flow analysis of sequential sample from image sensor 222 when identifying independent motion dynamics of portable device. Additionally or alternatively, optical flow analysis may be employed when separating the motion sensor data. Notably, the optical flow analysis may be used to estimate the device speed due to independent movement by the user. An appropriate optical flow technique may use images, including a sequence of images from the same source such as a device with one camera as well as images or a sequence of images from multiple image sensors integrated into a single device and further the captured images or sequence of images may be obtained from synchronized image sources, such as multiple portable devices as depicted in FIG. 12.

Pursuant to the above discussion, the optical flow analysis may be used to estimate the speed of portable device from the aggregated pixel translation. Estimating the speed may include deriving a scale factor from a distance to a feature identified in the samples. The distance to the feature may be determined using an inclination angle of the portable device. Alternatively, distance to the feature may be determined from a ratio of periodic displacement of the device to corresponding displacement of a feature identified in the samples.

For example, the optical flow technique may analyze the captured sequential samples to estimate the speed of the device. The flow map F may be used to estimate the 2D velocity by splitting F into a square grid and obtaining the averaged overall movement in each cell divided by the frame rate. A scale factor may be used to translate the pixel translations into real-world velocities. Different techniques may be used to estimate distance to detected objects within the images to derive the scale factor depending on the context of the device. With suitable normalization, a scalar speed of the moved device may be determined from the samples. The estimated speed using samples from image sensor is used to identify the speed of the device vs the speed of the vehicle. The captured images from the device cameras are tested for sufficient information existence or feature availability as noted above. Then, the optical flow is calculated, with the culmination represented by Equations (36) and (37). To estimate the horizontal distance D between the device and a corresponding center point in the image, an inclination angle α of portable device 200 and the average vertical distance L between the device and the ground may be used as indicated by Equation (51):

$$D = L \cdot \tan(\alpha) \tag{51}$$

Using the aggregate translation $dx_{agg,k}$ and $dy_{agg,k}$ obtained from Equations (36) and (37) between images $G_k$ and $G_{k-1}$, the x-components and y-components of the aggregate image translation may be divided by the time interval between images $\Delta t$ to give the relative velocity in units of pixels per unit time (e.g. pixels per second) as indicated by Equations (52) and (53), respectively:

$$vx_{rel,k} = \frac{dx_{agg,k}}{\Delta t} \tag{52}$$

$$vy_{rel,k} = \frac{dy_{agg,k}}{\Delta t} \tag{53}$$

An appropriate scale factor c may be used to translate the velocity from units of pixels per unit time to the desired units (e.g. meters per second) to obtain the absolute velocity according to Equations (54) and (55), respectively.

$$vx_k = c \cdot vx_{rel,k} \tag{54}$$

$$vy_k = c \cdot vy_{rel,k} \tag{55}$$

Correspondingly, the speed of portable device 200 may then be calculated using Equation (56):

$$speed_{deivec} = \sqrt{vx_k^2 + vy_k^2} \tag{56}$$

The scale factor c may be derived from the pixel pitch of the image sensors and the distance to a reference object determined as described above. Setting p as the pixel pitch of the image sensor, $f$ as the effective focal length of the device camera, d as the size of the object in the real-world, r as the real-world range/depth to the object and a as the angular size of the object as viewed from the camera results in the relationship indicated by Equation (57):

$$\alpha = \frac{p}{f} = \frac{d}{r} \tag{57}$$

Another technique for separating the obtained motion sensor data into motion sensor data corresponding to motion of the platform and motion sensor data corresponding to the identified independent motion of the portable device may be based, at least in part, on supplemental sensor data including depth measurement. For example, depth may be measured using ranging sensors, which may be implemented as external sensor 214 or auxiliary sensor 216 depending on the embodiment. Ranging sensors include sensors that require no physical contact with the object being distance measured. Several optical ranging sensors are suitable for distance measuring, including visible or Infrared Light-Based sensors and light detecting and ranging (LIDAR) sensors. Other sensors such as ultrasonic and radar are examples for non-optical ranging sensors. Ranging sensors can detect a one, two, or three dimensional ranges.

Notably, visible or infrared light-based systems project a pulse of radiation and analyze the received reflection. Light-based ranging sensors use multiple methods for detecting obstacles and determining range. The simplest method uses the intensity of the reflected light from an obstacle to estimate distance. A more common method is to use a beam of light projected at an angle and a strip of detectors spaced away from the emitter in a triangulation strategy. LIDAR may refer to a more advanced method to detect range which uses a laser that is swept across the sensor's field of view. The reflected laser light is usually analyzed one of two ways. Units with longer ranges sometimes actually determine distance by measuring the time it takes for the laser pulse to return to the sensor. Ranging IR sensors typically output the actual distance of an object from the sensor through a process of triangulation in which a pulse of light is emitted and then reflected back (or not reflected at all). When the light returns it comes back, its measured angle is dependent on the distance of the reflecting object. Triangulation works by detecting this reflected beam angle and employing known trigonometric relationships to determine distance. Further, non-optical sensors such as ultrasonic sensors may also be used to estimate the range of an object from the device. Ultrasonic sensors use sound pulses to measure distance by emitting an ultrasonic pulse and timing how long it takes to receive the echo to provide an accurate estimation of distance to the reflecting object.

As will be appreciated, any suitable ranging sensor may be used to estimate the distance between portable device 200 and a surrounding surface. The surrounding surface could be a part of the vehicle body such as wheel drive, seats, or dashboard. In other scenarios, the surrounding surface could be a part of the road if the device is pointing to a part of the vehicle glass such as window, front, or rear glass, that allows transmission of the radiation used for detection. The flow map of the ranging sensor may be estimated to evaluate the quality of the collected information and decide whether it can be used to estimate the distance or not. The flow map may also be used to estimate the relative velocity of the moving device, using techniques similar to the optical flow analysis described above.

One or more potential objects may be within the field of view of the ranging/depth sensor being employed. The time rate of change of the ranging signal may correspondingly be calculated for an identified object, while a measurement-based estimation technique may be used to further reduce the effect of noise in the ranging readings. As one representative example, the time rate of change of the measured range (or depth) R of the $i^{th}$ identified object at time k, may be denoted $$\left. \frac{dR_i}{dt} \right|_k$$

and calculates from the different range values from the identified objects numerically by formulas that calculate discrete derivative. Such numerical formulas may be of any order in time (i.e. with any memory length in the discrete domain) to enhance calculation and provide smoother derivatives. Low pass filtering may also be applied to these range (or depth) values before using them to calculate the derivative, as explained earlier; or alternatively any other de-noising techniques can be used.

The time rate of change of the Range R of the $i^{th}$ identified object at time k is related to the velocity of the device and the relative coordinates between the device and the identified object at time k. This relation is similar to the Doppler relation with velocity. The derivative of the Range R is proportional to the velocity projected on the line of sight between the identified object and the moving device. If one or more identified objects are visible to the ranging sensor, then the time rate of change of the range R of each of these identified objects may be calculated, and a measurement-based estimation technique (which does not rely on a system model but rather on measurement only) is used to obtain the relative device velocity as well as their standard deviations. Examples of such measurement-based estimation techniques suitable when practicing the methods of this disclosure are Maximum Likelihood-based techniques (that maximize the likelihood of the observation) or Least Squares-based techniques. The availability of measurements from several identified objects and the use of an estimation technique tackle and further decrease the effect of the noise in the measurements. The relative device velocity can be used in a similar manner to the optical flow components or the relative velocity calculated thereof as explained earlier.

Similarly, both optical flow and distance based techniques may be used to provide a relative velocity for the moving device in combination to help provide an absolute estimation for the moving device. The optical flow technique provides the relative velocity of portable device 200 when moved as a result of user interaction and a ranging sensor provides the depth which is represented by the distance of the device to the closest objects. A proper transformation for the relative velocity and depth may then provide an absolute velocity for the moving device, which in turn allows derivation of speed from the velocity.

As indicated by FIG. 1, the output of either 108 or 112 is motion sensor data that reflects motion of the platform. Analyzing this information may allow evaluation of how the user is operating the platform, as measured by criteria such as safety or legality. In some embodiments, the platform is a motorized vehicle and the assessment of operator performance may be used in when providing insurance for the operator. Generally, the motion sensor data corresponding to motion of the platform may be considered the vehicle dynamics parameters. These parameters may be estimated using the separated motion sensor data when independent device motion dynamics are identified or simply by the motion sensor data when identification indicates there are no independent device motion dynamics. Correspondingly information derived from this motion sensor data, including acceleration, deceleration, and speed, may be employed to provide analytics of the manner in which the user is operating the platform. Other important factors are detection of vehicle swerves, detection of vehicle sideways slide, and detection of driving on rumble strips. Further, the evaluation process may assess vehicle motion during turns to assess how the operator is completing the maneuver and whether sharply or more gradually. Using these and other analytics, performance of the operator of the platform may be evaluated.

In one aspect, navigation components may be estimated from the motion sensor data corresponding to motion of the vehicle. 3D accelerometer and 3D gyroscope data may be used to provide a navigation solution for the vehicle motion, which may involve values such as position, velocity (or speed) and/or orientation. Other sources of information may be used, as desired and dependent on availability, such as absolute navigational information, barometer or pressure sensor, and/or magnetometer. Using techniques known in the art, a navigation filter such as a Kalman filter (KF) or particle filter (PF) may be used to provide the navigation solution components using corresponding integration algorithms.

The dynamic of the vehicle motion can be described using a state-space representation. Mechanization equations are used for this purpose where a system of non-linear first-order differential equations is used and then kinematic measurements are used to provide a solution that may include position, velocity and attitude as noted. The state vector for inertial mechanization is represented in the local frame (l-frame) which is also refers to the navigation frame (n-frame). Gyroscopes and accelerometers measurements represent the angular velocities and specific forces about and along the three axes x, y, and z in the body frame (b-frame), respectively.

As warranted, sensors errors, deterministic and random involved in the raw measurements may be compensated before performing the mechanization equations to calculate the navigation solution. The motion sensor data is measured in the b-frame and integration of the angular velocities from the gyroscope data may be used in transforming the motion sensor data from b-frame to the n-frame. One technique may involve the use of quaternions, but other methods of transformation may employed. The obtained accelerations and angular velocities from the transformation are typically termed "leveled data." Velocity and position in the navigation frame may then be obtained by integrating the leveled accelerations.

The mechanization equations may be performed as a full mechanization to provide the vehicle velocity, position, and attitude including heading. Also, mechanization may provide any sensor errors such as biases values and scale factors. Alternatively, a partial mechanization may be performed to provide information relevant for analyzing operator performance, including values such as the vehicle velocity and heading.

As an illustration, the following materials describe the implementation of a KF estimation of the navigation solution. The dynamic error model used in the navigation filter for the navigation parameters such as position, velocity, and attitude can be determined through the linearization of the sensors mechanization equations and by neglecting insignificant terms in the resultant linear model. A suitable representation of the measured specific force by accelerometers is given by Equation (58), where $f$ is the specific force vectors is the acceleration vector, G is the gravitational acceleration vector and i refers to the inertial frame:

$$\ddot{r}^i = f^i + G^i \qquad (58)$$

Thus, a simple form of the mechanization equations for the moving object in the local level frame may be expressed as first order differential equations as given in Equation (59):

$$\begin{bmatrix} \dot{r}^l \\ \dot{v}^l \\ \dot{R}_b^l \end{bmatrix} = \begin{bmatrix} Dv^l \\ R_b^l f^b - (2\Omega_{ie}^l + \Omega_{el}^l)v^l + g^l \\ R_b^l \Omega_{lb}^b \end{bmatrix} \qquad (59)$$

Further, the position may be represented using Equation (60), in which $\phi$ is the latitude, $\lambda$ is the longitude and h is the altitude:

$$r^l = (\varphi, \lambda, h) \qquad (60)$$

In light of the above, the velocity vector in the l-frame can be expressed as in Equation (61):

$$v^l = ((R_N + h)\dot{\lambda}\cos(\varphi), (R_M + h)\dot{\varphi}, \dot{h}) \qquad (61)$$

D is a square matrix describing the relationship of the velocity and position vector in l-frame according to Equation (62), where $g^l$ is the gravity vector in the l-frame and $\Omega_{ie}^l$ is the skew-symmetric matrix of the angular velocity vector $\omega_{ie}^l$ as given by Equation (63):

$$D = \begin{bmatrix} 0 & 1/(R_M + h) & 0 \\ 1/(R_N + h)\cos(\varphi) & 0 & 0 \\ 0 & 0 & 0 \end{bmatrix} \qquad (62)$$

$$g^l = G^l - \Omega_{ie}^l \Omega_{ie}^l r^l \qquad (63)$$

Next, the Earth rate relative to the inertial space projected in l-frame may be shown through Equation (64), in which $\Omega_{el}^l$ is the skew-symmetric matrix of the angular velocity vector $\omega_{el}^l$ as indicated by Equation (65) and $\omega_{el}^l$ is the angular velocity vector of the l-frame relative to the e-frame:

$$\omega_{ie}^l = [0, \omega_e\cos(\varphi), \omega_e\sin(\varphi)]^T \qquad (64)$$

$$\omega_{el}^l = \left[-\frac{v_n}{R_M}, \frac{v_e}{R_N}, \frac{v_e\tan(\varphi)}{RN}\right]^T \qquad (65)$$

Further, $\Omega_{lb}^b$ is the skew-symmetric matrix of the angular velocity vector $\omega_{lb}^b$ as represented by Equations (66) and (67), wherein $\tilde{\omega}_{ib}^b$ is the gyro sensed angular velocity vector, $d_{ib}^b$ is the gyro drift vector, $\omega_{ib}^b$ is the corrected angular velocity vector in body frame, and $R_b^l$ is the transformation matrix from body frame to local level frame as a function of attitude components:

$$\omega_{lb}^b = \omega_{ib}^b - R_l^b \omega_{il}^l \qquad (66)$$

$$\omega_{ib}^b = \tilde{\omega}_{ib}^b - d_{ib}^b \qquad (67)$$

As a result, acceleration may be evaluated using Equation (68), in which $\tilde{f}^b$ is the accelerometer sensed acceleration in body frame, $b^b$ is the accelerometer bias vector, $v_n$, $v_e$ are the north and east velocity respectively, and $R_M$, $R_N$ are the radii of the meridian and prime vertical respectively:

$$f^b = \tilde{f}^b - b^b \qquad (68)$$

Following the above discussion, parameters estimated for the vehicle motion dynamics may be used when deriving information used to evaluate operator performance. The acceleration and deceleration status can be evaluated directly from the acceleration data from the 3D accelerometer that represent vehicle dynamics (after the separation). Also, they can be evaluated based on the estimated speed information. The speed may be calculated based on the estimated velocity components. Estimating the vehicle speed or position (by using delta position) with the knowledge about the speed limit in certain area indicates whether the operator is driving over speed limit or not. Heading information indicates the vehicle direction and can be used to detect turns and the rate at which a turning maneuver is performed. For example, turn information with the speed information may be used to evaluate whether the operator is turning slowly, quickly or at an average rate for any given maneuver.

In addition, heading information may be used to detect vehicle swerves and sudden lane changes as a change in the heading with linear acceleration. Sideways sliding may be detected from heading change and change in the velocity components. In normal operation when the vehicle is moving forward on a flat road, the velocity components in both sideway (lateral) and vertical directions may be expected to be zero. However, a vehicle sliding sideways generates a nonzero lateral velocity component value. The combination of change in the heading and change in the lateral velocity component may thus be used to indicate sideways sliding. Further, position components when available may be used to detect swerving or the sideways sliding by calculating the change in vehicle position and detect any sudden change in the position values towards the sideway of the road.

Certain important evaluation parameters include accelerating, decelerating, harsh turns, swerving, and sideways sliding as per the above discussion. An exemplary assessment technique may use any one or combination of these parameters, each parameter being assigned a weight proportional to its risk to the vehicle, or to other surrounding vehicles. Consequently, the operator's performance may be evaluated using the detection of any of these evaluation parameters. During a driving event, a suitable evaluation algorithm may track the occurrence of each evaluation parameter, allowing a total evaluation score to be calculated based on the number of occurrences of each evaluation parameter multiplied by its weight. This score level then may be output to indicate operator performance.

Contemplated Embodiments

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS); the forward integrated navigation solution in the device integrating the available sensors with the absolute navigational information (e.g. GNSS) and possibly with the optional speed or velocity readings; or a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or WiMax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different levels of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processer enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for characterizing motion of a platform, the method comprising:
    obtaining motion sensor data from a portable device having a sensor assembly, wherein the portable device is within the platform and may be tethered or untethered and wherein mobility of the portable device may be constrained or unconstrained within the platform;
    determining the platform is moving based at least in part on processing the obtained motion sensor data;
    identifying motion dynamics of the portable device that are independent from motion dynamics of the platform and the lack thereof when it is determined the platform is moving;
    when independent motion dynamics of the portable device are identified, separating motion sensor data corresponding to motion of the platform and motion sensor data corresponding to the identified independent motion of the portable device from the obtained motion sensor data; and
    outputting motion sensor data corresponding to motion of the platform that is independent of motion of the portable device.

2. The method of claim 1, further comprising processing the motion sensor data corresponding to motion of the platform that is independent of motion of the portable device to derive operator analytics for an operator of the platform.

3. The method of claim 2, further comprising providing a navigation solution for the platform by using the motion sensor data corresponding to motion of the platform that is independent of motion of the portable device, wherein the operator analytics are based at least in part on the navigation solution.

4. The method of claim 2, wherein the operator analytics are based on at least one of acceleration change, heading change, and speed.

5. The method of claim 4, wherein the operator analytics include adjusting for detection of events comprising at least one of large acceleration, large deceleration, sharp turns, a vehicle swerve, a vehicle sideways slide and vehicle interaction with rumble strips.

6. The method of anyone of claim 4 or 5, further comprising scoring operator performance by comparing the operator analytics to local conditions determined to exist during operation of the platform.

7. The method of claim 1, wherein processing the motion sensor data comprises applying a signal analysis technique.

8. The method of claim 7, wherein the signal analysis technique comprises at least one of: (i) a statistical analysis; (ii) a frequency-domain analysis; and (iii) a time-domain analysis.

9. The method of claim 1, wherein processing the motion sensor data comprises applying a machine learning technique.

10. The method of claim 9, further comprising inputting features extracted from the processed motion sensor data to at least one stored classification model to determine whether the platform is moving.

11. The method of claim 10, wherein the at least one stored classification model comprises extracted features developed during a training phase.

12. The method of claim 1, further comprising providing a source of absolute navigational information, wherein determining the platform is moving is based at least in part on absolute navigational information.

13. The method of claim 1, further comprising obtaining image sensor data from the portable device, wherein determining the platform is moving comprises processing the image sensor data.

14. The method of claim 13, wherein processing the image sensor data comprises comparing similarity between successive samples.

15. The method of claim 1, wherein identifying motion dynamics of the portable device that are independent from motion dynamics of the platform comprises processing the motion sensor data from the portable device.

16. The method of claim 15, wherein processing the motion sensor data comprises at least one of:
   (i) calculating radius of rotation;
   (ii) assessing change in orientation of the portable device;
   (iii) determining heading misalignment between the portable device and the platform; and
   (iv) fusing extracted features from different sensor types.

17. The method of claim 15, further comprising obtaining motion sensor data from at least one auxiliary portable device, wherein processing the motion sensor data comprises comparing motion sensor data from the portable device with motion sensor data from the auxiliary portable device.

18. The method of claim 1, further comprising providing a source of absolute navigational information, wherein identifying motion dynamics of the portable device that are independent from motion dynamics of the platform is based at least in part on absolute navigational information.

19. The method of claim 15, further comprising obtaining supplemental sensor data from the portable device, wherein identifying motion dynamics of the portable device that are independent from motion dynamics of the platform comprises processing the supplemental sensor data.

20. The method of claim 1, further comprising obtaining image sensor data from the portable device, wherein identifying motion dynamics of the portable device that are independent from motion dynamics of the platform comprises processing the image sensor data.

21. The method of claim 20, wherein the image sensor data comprises a sequence of images and processing the image sensor data comprises calculating a frame related parameter.

22. The method of claim 21, wherein the frame related parameter is derived from at least one of:
   (i) a comparison of pixels between sequential images;
   (ii) a comparison of histograms of sequential images; and
   (iii) a comparison of frame entropy of sequential images.

23. The method of claim 20, wherein the image sensor data comprises a sequence of images and processing the image sensor data comprises performing an optical flow analysis.

24. The method of claim 20, wherein the image sensor data comprises a sequence of images and processing the image sensor data comprises correlating regions between sequential images using at least one of: (i) edge change rate detection; (ii) statistical analysis; (iii) frequency domain analysis; and (iv) multi-resolution analysis.

25. The method of claim 20, further comprising obtaining image sensor data from at least one auxiliary device, wherein processing the image sensor data comprises comparing image sensor data from the portable device with image sensor data from the auxiliary device.

26. The method of claim 20, further comprising obtaining supplemental sensor data from the portable device, wherein identifying motion dynamics of the portable device that are independent from motion dynamics of the platform comprises processing the supplemental sensor data.

27. The method of claim 1, further comprising obtaining ranging sensor data from the portable device, wherein identifying motion dynamics of the portable device that are independent from motion dynamics of the platform comprises processing the ranging sensor data.

28. The method of claim 1, wherein separating motion sensor data corresponding to motion of the platform and motion sensor data corresponding to the identified independent motion of the portable device from the obtained motion sensor data comprises processing the motion sensor data from the portable device.

29. The method of claim 28, wherein processing the motion sensor data comprises at least one of:
   (i) performing a wavelet analysis;
   (ii) performing a blind source separation technique;
   (iii) performing a Fast Fourier Transform (FFT) analysis;
   (iv) performing a Weighted Frequency Fourier Linear Combiner; and
   (v) calculating radius of rotation.

30. The method of claim 28, further comprising obtaining motion sensor data from at least one auxiliary portable device, wherein processing the motion sensor data comprises comparing motion sensor data from the portable device with motion sensor data from the auxiliary device.

31. The method of claim 1, further comprising providing a source of absolute navigational information, wherein separating motion sensor data corresponding to motion of the platform and motion sensor data corresponding to the identified independent motion of the portable device from the obtained motion sensor data is based at least in part on the absolute navigational information.

32. The method of claim 1, further comprising obtaining image sensor data from the portable device, wherein separating motion sensor data corresponding to motion of the platform and motion sensor data corresponding to the identified independent motion of the portable device from the obtained motion sensor data comprises processing the image sensor data.

33. The method of claim 32, wherein the image sensor data comprises a sequence of images and processing the image sensor data comprises performing an optical flow analysis.

34. The method of claim 1, further comprising obtaining ranging sensor data from the portable device, wherein separating motion sensor data corresponding to motion of the platform and motion sensor data corresponding to the identified independent motion of the portable device from the obtained motion sensor data comprises processing the ranging sensor data.

35. The method of claim 34, further comprising obtaining image sensor data from the portable device, wherein the image sensor data comprises a sequence of images and wherein processing the image sensor data comprises performing an optical flow analysis, and wherein separating motion sensor data corresponding to motion of the platform and motion sensor data corresponding to the identified independent motion of the portable device from the obtained motion sensor data is based at least in part on the processed ranging sensor data and the optical flow analysis.

36. A portable device for characterizing motion of a platform, wherein the portable device is within the platform and may be tethered or untethered and wherein mobility of the portable device may be constrained or unconstrained within the platform, comprising:
  a sensor assembly integrated with the portable device, including at least one sensor configured to output data representing motion of the portable device;
  a processor configured to obtain the motion sensor data; and
  a motion characterization module implemented with the processor configured to:
  determine whether the platform is moving based at least in part on processing the obtained motion sensor data;
  identify motion dynamics of the portable device that are independent from motion dynamics of the platform and the lack thereof when it is determined the platform is moving;
  when independent motion dynamics of the portable device are identified, separate motion sensor data corresponding to motion of the platform and motion sensor data corresponding to the identified independent motion of the portable device from the obtained motion sensor data; and
  output motion sensor data corresponding to motion of the platform that is independent of motion of the portable device.

37. The portable device of claim 36, wherein the motion characterization module is configured to determine whether the platform is moving, and to perform at least one of: (i) identifying motion dynamics of the portable device that are independent from motion dynamics of the platform; and (ii) separating motion sensor data corresponding to motion of the platform and motion sensor data corresponding to the identified independent motion of the portable device from the obtained motion sensor data using the obtained motion sensor data.

38. The portable device of claim 36, further comprising providing a source of absolute navigational information, wherein the processor is configured to obtain the absolute navigational information and the motion characterization module is configured to perform at least one of: (i) determining whether the platform is moving; (ii) identifying motion dynamics of the portable device that are independent from motion dynamics of the platform; and (iii) separating motion sensor data corresponding to motion of the platform and motion sensor data corresponding to the identified independent motion of the portable device from the obtained motion sensor data using the obtained absolute navigational information.

39. The portable device of claim 38, wherein the source of absolute navigational information is at least one of the following: (i) a global navigation satellite system (GNSS); (ii) cell-based positioning; (iii) WiFi-based positioning; (iv) Bluetooth-based positioning; (v) Bluetooth low energy-based positioning; (vi) other wireless-based positioning; and (vii) visual light communication-based positioning.

40. The portable device of claim 36, further comprising an image sensor, wherein the processor is configured to obtain image sensor data and the motion characterization module is configured to perform at least one of: (i) determining whether the platform is moving; (ii) identifying motion dynamics of the portable device that are independent from motion dynamics of the platform; and (iii) separating motion sensor data corresponding to motion of the platform and motion sensor data corresponding to the identified independent motion of the portable device from the obtained motion sensor data using the obtained image sensor data.

41. The portable device of claim 36, further comprising a supplemental sensor, wherein the processor is configured to obtain supplemental sensor data and the motion characterization module is configured to perform at least one of: (i) identifying motion dynamics of the portable device that are independent from motion dynamics of the platform; and (ii) separating motion sensor data corresponding to motion of the platform and motion sensor data corresponding to the identified independent motion of the portable device from the obtained motion sensor data using the obtained supplemental sensor data.

42. The portable device of claim 40, wherein the supplemental sensor is selected from the group consisting of an ambient light sensor and a proximity sensor.

43. The portable device of claim 36, further comprising a ranging sensor, wherein the processor is configured to obtain ranging sensor data and the motion characterization module is configured to perform at least one of: (i) identifying motion dynamics of the portable device that are independent from motion dynamics of the platform; and (ii) separating motion sensor data corresponding to motion of the platform and motion sensor data corresponding to the identified independent motion of the portable device from the obtained motion sensor data using the obtained ranging sensor data.

44. The portable device of claim 36, wherein the sensor assembly comprises an inertial sensor.

45. The portable device of claim 44, wherein the sensor assembly includes an accelerometer and a gyroscope.

46. The device of claim 44, wherein the inertial sensor is implemented as a Micro Electro Mechanical System (MEMS).

* * * * *